(12) United States Patent
Gates et al.

(10) Patent No.: US 11,137,337 B2
(45) Date of Patent: Oct. 5, 2021

(54) FLOW CYTOMETRY WITH DATA ANALYSIS FOR OPTIMIZED DILUTION OF FLUID SAMPLES FOR FLOW CYTOMETRY INVESTIGATION

(71) Applicant: Essen Instruments, Inc., Ann Arbor, MI (US)

(72) Inventors: Tyler Gates, Longmont, CO (US); Jeffrey Steaffens, Broomfield, CO (US)

(73) Assignee: Essen Instruments, Inc., Ann Arbor, MI (US)

( * ) Notice: Subject to any disclaimer, the term of this patent is extended or adjusted under 35 U.S.C. 154(b) by 414 days.

(21) Appl. No.: 16/253,060

(22) Filed: Jan. 21, 2019

(65) Prior Publication Data
US 2020/0232900 A1 Jul. 23, 2020

(51) Int. Cl.
| | | |
|---|---|---|
| *G01N 15/14* | (2006.01) | |
| *G01N 1/38* | (2006.01) | |
| *G01N 15/00* | (2006.01) | |
| *G01N 15/10* | (2006.01) | |

(52) U.S. Cl.
CPC .......... *G01N 15/1425* (2013.01); *G01N 1/38* (2013.01); *G01N 2015/0065* (2013.01); *G01N 2015/1006* (2013.01)

(58) Field of Classification Search
None
See application file for complete search history.

(56) References Cited

U.S. PATENT DOCUMENTS

| | | |
|---|---|---|
| 4,857,451 A | 8/1989 | Schwartz |
| 5,040,890 A | 8/1991 | North, Jr. |
| 5,245,318 A | 9/1993 | Tohge et al. |
| 5,306,467 A | 4/1994 | Douglas-Hamilton et al. |
| 5,351,118 A | 9/1994 | Spinell |

(Continued)

FOREIGN PATENT DOCUMENTS

| | | |
|---|---|---|
| CA | 2796489 A1 | 5/2014 |
| EP | 0822404 A2 | 2/1998 |

(Continued)

OTHER PUBLICATIONS

U.S. Appl. No. 15/315,698 entitled "Automated Alignment of Optics Within a Flow Cytometer".

(Continued)

*Primary Examiner* — Matthew D Krcha
*Assistant Examiner* — Brittany I Fisher
(74) *Attorney, Agent, or Firm* — Snell & Wilmer LLP

(57) ABSTRACT

Flow cytometry investigation and flow cytometry result analysis to determine an optimized dilution factor range for flow cytometry investigation of a target sample fluid stock using a flow cytometer. The optimized dilution factor range may be determined using a screening assay module of a flow cytometry system to analyze flow cytometry results determined to fall within a dynamic range of a flow cytometer to determine the optimized dilution factor range for a given flow cytometer to investigate a given target sample fluid stock. In turn, a titer assay module may be executed to prepare particle titer results based on optimized target fluid samples provided within the optimized dilution factor range. The screening assay module and/or the titer assay module may provide automated data processing with data notifications and confirmations to provide robust data analysis.

25 Claims, 21 Drawing Sheets

(56) References Cited

U.S. PATENT DOCUMENTS

| | | |
|---|---|---|
| 5,374,398 A | 12/1994 | Isami et al. |
| 5,395,588 A | 3/1995 | North, Jr. et al. |
| 5,483,469 A | 1/1996 | Van den Engh et al. |
| 5,602,039 A | 2/1997 | Van den Engh |
| 5,690,895 A | 11/1997 | Matsumoto et al. |
| 5,736,105 A | 4/1998 | Astle |
| 5,895,764 A | 4/1999 | Sklar et al. |
| 6,110,427 A | 8/2000 | Uffenheimer |
| 6,183,697 B1 | 2/2001 | Tanaka et al. |
| 6,248,590 B1 | 6/2001 | Malachowski |
| 6,256,096 B1 | 7/2001 | Johnson |
| 6,432,630 B1 | 8/2002 | Blankenstein |
| 6,550,324 B1 | 4/2003 | Mayer et al. |
| 6,589,792 B1 | 7/2003 | Malachowski |
| 6,592,822 B1 | 7/2003 | Chandler |
| 6,597,438 B1 | 7/2003 | Cabuz et al. |
| 6,813,944 B2 | 11/2004 | Mayer et al. |
| 6,878,556 B2 | 4/2005 | Sklar et al. |
| 6,880,414 B2 | 4/2005 | Norton |
| 6,890,487 B1 | 5/2005 | Sklar et al. |
| 7,016,022 B2 | 3/2006 | Fritz et al. |
| 7,061,595 B2 | 6/2006 | Cabuz et al. |
| 7,069,191 B1 | 6/2006 | Moore |
| 7,277,166 B2 | 10/2007 | Padmanabhan et al. |
| 7,307,721 B2 | 12/2007 | King |
| 7,318,336 B2 | 1/2008 | Roth et al. |
| 7,355,696 B2 | 4/2008 | Mueth et al. |
| 7,368,084 B2 | 5/2008 | Sklar et al. |
| 7,420,659 B1 | 9/2008 | Cabuz et al. |
| 7,452,725 B2 | 11/2008 | Leary et al. |
| 7,471,394 B2 | 12/2008 | Padmanabhan et al. |
| 7,485,153 B2 | 2/2009 | Padmanabhan et al. |
| 7,553,453 B2 | 6/2009 | Gu et al. |
| 7,671,987 B2 | 3/2010 | Padmanabhan et al. |
| 7,688,427 B2 | 3/2010 | Cox et al. |
| 7,691,636 B2 | 4/2010 | Frazier et al. |
| 7,758,811 B2 | 7/2010 | Durack et al. |
| 7,776,268 B2 | 8/2010 | Rich |
| 7,780,916 B2 | 8/2010 | Bair et al. |
| 7,817,276 B2 | 10/2010 | Kiesel et al. |
| 7,978,329 B2 | 7/2011 | Padmanabhan et al. |
| 7,981,661 B2 | 7/2011 | Rich |
| 8,017,402 B2 | 9/2011 | Rich |
| 8,071,051 B2 | 12/2011 | Padmanabhan et al. |
| 8,134,705 B2 | 3/2012 | Kaduchak et al. |
| 8,182,767 B2 | 5/2012 | Padmanabhan et al. |
| 8,187,888 B2 | 5/2012 | Rich |
| 8,202,733 B1 | 6/2012 | Javadi |
| 8,262,990 B2 | 9/2012 | Bair et al. |
| 8,263,955 B2 | 9/2012 | Kiesel et al. |
| 8,273,294 B2 | 9/2012 | Padmanabhan et al. |
| 8,283,177 B2 | 10/2012 | Ball et al. |
| 8,482,731 B2 | 7/2013 | Muraki |
| 9,546,936 B2 | 1/2017 | Rowlen et al. |
| 9,816,912 B2 | 11/2017 | Artinger et al. |
| 9,850,979 B2 | 12/2017 | Rowlen et al. |
| 9,880,085 B2 | 1/2018 | Wilson et al. |
| 9,903,803 B2 | 2/2018 | Smolak et al. |
| 9,927,346 B2 | 3/2018 | Wilson et al. |
| 10,031,061 B2 | 7/2018 | Rowlen et al. |
| 10,101,262 B2 | 10/2018 | Artinger et al. |
| 10,161,850 B2 | 12/2018 | Artinger et al. |
| 10,184,878 B2 | 1/2019 | Smolak et al. |
| 10,408,734 B2 | 9/2019 | Artinger et al. |
| 10,520,420 B2 | 12/2019 | Smolak et al. |
| 10,539,497 B2 | 1/2020 | Smolak et al. |
| 10,545,084 B2 | 1/2020 | Artinger et al. |
| 10,585,030 B2 | 3/2020 | Artinger et al. |
| 10,705,007 B2 | 7/2020 | Rowlen et al. |
| 2003/0235919 A1 | 12/2003 | Chandler |
| 2005/0105077 A1 | 5/2005 | Padmanabhan et al. |
| 2006/0038989 A1 | 2/2006 | Domack et al. |
| 2006/0134002 A1 | 6/2006 | Lin |
| 2006/0163119 A1 | 7/2006 | Hirano et al. |
| 2006/0195268 A1 | 8/2006 | Vega |
| 2006/0259253 A1 | 11/2006 | Ellison et al. |
| 2008/0021674 A1 | 1/2008 | Puskas |
| 2008/0100840 A1 | 5/2008 | Oma et al. |
| 2008/0152542 A1 | 6/2008 | Ball et al. |
| 2008/0252884 A1 | 10/2008 | Carr |
| 2009/0023132 A1 | 1/2009 | Champseix |
| 2009/0029870 A1 | 1/2009 | Ward et al. |
| 2009/0104075 A1 | 4/2009 | Rich |
| 2009/0105963 A1 | 4/2009 | Laursen et al. |
| 2010/0284016 A1 | 11/2010 | Teitell et al. |
| 2010/0319469 A1 | 12/2010 | Rich |
| 2011/0024615 A1 | 2/2011 | Tanner et al. |
| 2011/0089328 A1 | 4/2011 | Li |
| 2012/0077260 A1 | 3/2012 | Sharon et al. |
| 2012/0140205 A1 | 6/2012 | Kaduchak et al. |
| 2013/0050782 A1 | 2/2013 | Heng et al. |
| 2013/0080082 A1 | 3/2013 | Howes et al. |
| 2013/0171683 A1 | 7/2013 | Durack et al. |
| 2013/0252237 A1 | 9/2013 | Wagner |
| 2013/0327957 A1 | 12/2013 | Ayliffe |
| 2013/0338968 A1 | 12/2013 | Hanashi et al. |
| 2015/0132766 A1 | 5/2015 | Yasuda et al. |
| 2017/0023570 A1 | 1/2017 | Reyes |

FOREIGN PATENT DOCUMENTS

| | | |
|---|---|---|
| EP | 1176412 A2 | 1/2002 |
| WO | 2007103969 A2 | 9/2007 |
| WO | 2008010120 A2 | 1/2008 |
| WO | 2009093017 A1 | 7/2009 |
| WO | 2010132053 A1 | 11/2010 |
| WO | 2013147114 A1 | 10/2013 |
| WO | 2014062719 A2 | 4/2014 |
| WO | 2014210370 A1 | 12/2014 |
| WO | 2015142658 A1 | 9/2015 |
| WO | 2015187700 A2 | 12/2015 |
| WO | 2015187708 A2 | 12/2015 |
| WO | 2015187783 A1 | 12/2015 |
| WO | 2016048872 A1 | 3/2016 |
| WO | 2016154283 A1 | 9/2016 |
| WO | 2016154286 A1 | 9/2016 |

OTHER PUBLICATIONS

U.S. Appl. No. 15/713,314 entitled "Evaluating Biological Material for Unassociated Virus-Like Particles."
U.S. Appl. No. 16/216,535 entitled "Flow Cytometry Evaluation of Biological Material for Exosomes".
U.S. Appl. No. 16/040,168 entitled "Flow Measurement and Control for Improved Quantification of Particles in Flow Cytometry".
U.S. Appl. No. 16/029,240 entitled "Flow Cytometer System Including Flow Cytometer, Autosampler and System Integration Structure".
U.S. Appl. No. 16/138,407 entitled "Flow Cytometry Evaluation for Unassociated Virus-Size Particles Having an Adenovirus Epitope".
U.S. Appl. No. 16/215,153 entitled "Flow Cytometry Evaluation of Biological Material for Unassociated Virus-Size Particles in Presence of Unbound Flourescent Antibody Stain".
U.S. Appl. No. 16/206,350 entitled "Flow Cytometer Signal Peak Identification Employing Dynamic Thresholding".
"Virus Counter(R), Hardware Model: 3100, Software Version 3.0, Operation Manual"; Sartorius; Rev B; Mar. 2018.
Rossi et al.; "Evaluation of ViroCyt Virus Counter for Rapid Filovirus Quantification"; Viruses; Feb. 20, 2015; 7; pp. 857-872.
Stoffel et al.; "Rapid Determination of Baculovirus Titer by a Dual-Channel Virus Counter"; American Biotechnology Laboratory; Nov. 2005; pp. 24-25.
Wikipedia; "Virus Quantification"; http://en.wikipedia.org/wiki/Virus_quantification; 8 pgs.
Automation.com; "Honeywell Introduces High-Performance, Liquid Nano-Flow Sensor"; Jul. 30, 2004; 5 pgs.
Hercher et al.; "Detection and Discrimination of Individual Viruses by Flow Cytometry"; Journal of Histochemistry & Cytochemistry; Jan. 1, 1979; pp. 350-352.

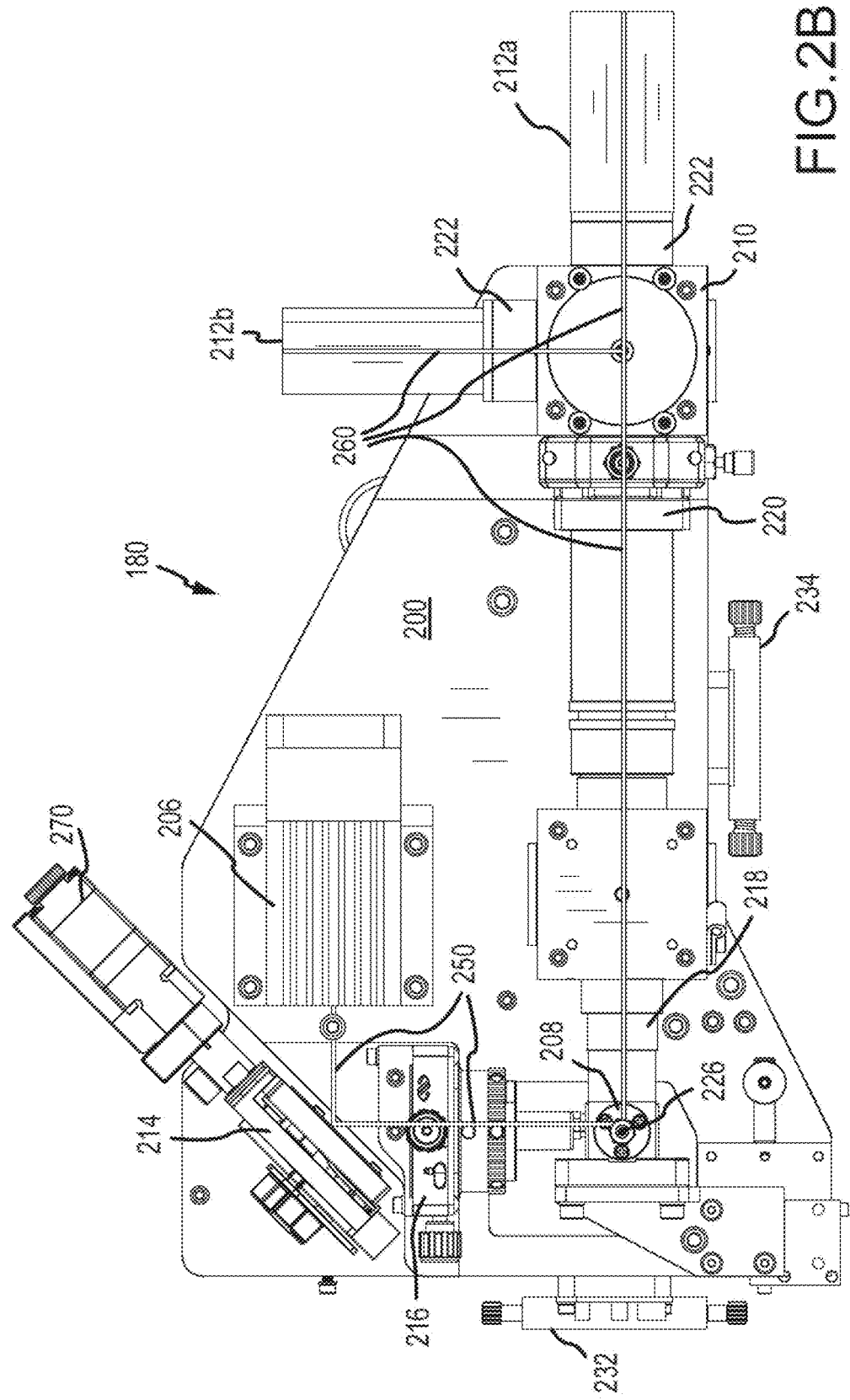

FLOW CYTOMETRY WITH DATA ANALYSIS FOR OPTIMIZED DILUTION OF FLUID SAMPLES FOR FLOW CYTOMETRY INVESTIGATION

FIELD

This disclosure relates to flow cytometry, including systems and methods for data analysis of flow cytometry results.

BACKGROUND

Flow cytometry is an analytical technique used in a number of applications to measure physical and/or chemical properties of biological or non-biological particles as they flow in a sample fluid through an investigation zone in an investigation cell, commonly referred to as a flow cell. Flow through the flow cell may be investigated in the investigation zone by a variety of techniques, including subjecting the flow to excitation radiation including, for example, electrical, acoustic, and/or optical signals and measuring and analyzing responses to detect and evaluate particles in a sample fluid. Although the sample fluid may be investigated by subjecting the sample fluid to a variety of stimuli, exposure of the sample to light is one common stimulus technique. Scattered light or a fluorescent emission exiting from the flow cell may be detected and analyzed to provide information on the characteristics of particles present in the sample fluid. Light stimulation and light detection techniques may be tailored to identification of particular characteristics indicative of the presence of particular types of particles. For example, one technique is to stain a sample fluid with one or more stains (also referred to as dyes) that associate with a particular biological component of interest. The stains may have fluorescent activity that provides a fluorescent emission about a particular wavelength, the detection of which provides an indication of the presence of that biological component.

Devices for performing flow cytometry are generally referred to as flow cytometers. Flow cytometers are often designed to optimize detection of a specific type of particle, for example, specific cells, bacteria, virus, or virus-like particles. A complicating issue for flow cytometer robustness and durability over a prolonged period is that flow cytometers tend to be very sensitive instruments that require very precise control over a number of factors that affect instrument performance. Error may be introduced into analysis of flow cytometry results from instrument-related errors (such as alignment of optical elements for optimal performance), chemistry-related errors (e.g., mixing of dyes, binding efficiency of dyes and samples, etc.), and operator-related errors. In turn, any of these three general sources of errors may induce noise or other errors that may degrade the accuracy and/or precision of the flow cytometry results for a given flow cytometry investigation.

In relation to instrument-related errors, a flow cytometer may experience a degradation in performance in relation to detection of particles in sample fluids containing very low particle concentrations and very high particle concentrations. For instance, in sample fluids with very low particle concentrations, individual particle signals are difficult to distinguish from background signals. At very high particle concentrations, particles have increased tendency to aggregate and pass though the investigation zone as aggregates rather than one at a time. As such, a flow cytometer may have a dynamic range relative to the concentration of particles in a sample fluid in which the flow cytometer provides acceptable particle identification and counting accuracy. However, such a dynamic range may be particular to a given instrument and/or the investigation of a particular sample fluid stock to identify particles of a particular type and with particular particle attributes. In this regard, even in a flow cytometer of known instrument performance characteristics, the dynamic range for a given investigation for a particular particle type in a particular fluid medium may not be accurately known prior to initiating an investigation. These problems become even more pronounced for flow cytometry investigations directed to quantification of very small particles such as those in the size range of individual virus particles (virions), which may be as small as tens of nanometers in size. Distinguishing fluorescent signals from particles relative to background signals becomes more difficult with smaller particles, and the applicability of light scatter detection for particle identification and gating purposes becomes less viable. An example of a flow cytometer designed for detection and counting of virus-size particles through the use of fluorescent stains is the Virus Counter® 3100 flow cytometer (Sartorius Stedim Biotech), which operates with a very low fluid sample flow rate through a flow cell investigation zone, and including through use of non-specific fluorogenic stains for non-specific binding to protein or nucleic acid content or fluorescent antibody stains for binding to a specific binding-site (epitope).

Previously proposed solutions to address potential degradation of accuracy due to samples outside of an instrument's dynamic range and to address the various sources of error discussed above have included performing flow cytometry investigation of multiple sample replicates at each of a plurality of different dilutions, over a wide range of dilutions, of a sample fluid stock to be investigated. This technique has been particularly applicable in flow cytometry evaluations to quantify particles in a size range of virus particles. Performing multiple sample replicates at each dilution is important to assess for intra-sample consistency at each level of dilution. Sampling at multiple different dilutions is important for spanning a particle concentration range likely to be within the dynamic range of the flow cytometry instrument for the investigation. In turn, the flow cytometry results from the multiple sample replicates over the wide range of dilution factors for a given sample stock result in a very large number of flow cytometry investigations that must be performed. Also, in this approach a correspondingly large set of data is produced. Statistical approaches may be applied to this data to provide results related to the sample fluid stock, such as to determine the concentration of the particles in the sample fluid stock. Such statistical approaches for large data sets may require increased processing capacity and/or time. For example, three fluid sample replicates may be prepared at dilution factors of 10, 100, 1000 and 10,000 relative to the sample fluid stock under investigation, resulting in preparation and flow cytometry of 12 fluid samples, and subsequent data analysis and computer storage of flow cytometry results for all of the fluid samples to ensure a reasonable evaluation for a single sample fluid stock. As may be appreciated, such processing requires significant time and cost. Furthermore, such a process often requires there be relatively large amounts of sample fluid stock available to allow for preparation of the multiple sample replicates over the wide range of dilution factors. Moreover, this approach also introduces opportunity for the increase in errors as conditions may be variable over the many required flow cytometry investigations. In turn, the precision and/or accuracy of the results may be negatively affected. Moreover, such data analysis has largely been performed in processing environments separate from the flow cytometry instrument such that no standardized or consistent application of data processing techniques is applied to such results. Rather, individual operators of a flow cytometer may each process data uniquely, thus presenting further opportunity for the introduction of operator-related error in the processing.

SUMMARY

In view of the foregoing, the present disclosure generally relates to flow cytometry methods and flow cytometry systems that provide data analysis of flow cytometry results to provide improved precision and/or accuracy of an investigation of a target sample fluid stock by a flow cytometer. Specifically, the present disclosure generally relates to flow cytometry methods and flow cytometry systems that are capable of efficiently determining an optimized dilution factor range for flow cytometry investigation of a target sample fluid stock. In turn, a titer of a target sample fluid stock may be performed by investigation of optimized target fluid samples in the optimized dilution factor range. The approaches described herein may facilitate a reduction in error with respect to instrument-related errors, chemistry-related errors, and operator-related errors in the flow cytometry investigation. Accordingly, a more accurate and precise flow cytometry investigation may be facilitated, thus improving the functionality of a flow cytometry system employing the data analysis approaches described herein.

Generally, the present disclosure includes a flow cytometry system that includes a screening assay module and a titer assay module. The screening assay module is operative to determine an optimized dilution factor range in which a flow cytometer of the flow cytometry system is most accurate based on an analysis of flow cytometry results from a plurality of screening target fluid samples. The screening assay module may provide assistance (e.g., automated assistance) in relation to the data processing to determine the optimized dilution factor range such as by providing operator guidance and/or data confirmation capabilities in relation to the processing of flow cytometry results for the determination of the optimized dilution factor range. As used herein, the optimized dilution factor range is one or more sample dilution factors within a dilution factor upper limit and lower limit. The optimized dilution factor range is inclusive of the upper and lower limits, and includes situations in which the upper limit and the lower limit are the same, that is when an optimized sample dilution factor range is identified as a single dilution factor value.

In turn, the titer assay module may determine particle titer results (e.g., particle concentration in a sample fluid stock under investigation) based on flow cytometry results from a plurality of optimized target fluid samples that are diluted to within the optimized dilution factor range. The titer assay module may also provide assistance (e.g., automated assistance) in relation to processing optimized target fluid samples in the optimized dilution factor range to determine particle titer results for a target sample stock. Again, the assistance provided by the titer assay module may include operator guidance and/or data confirmation capabilities.

As utilized herein, certain processes related to the operation of the screening assay module and/or titer assay module provide confirmation of parameters as belonging to acceptable values for a given parameter. Furthermore, in instances where a given parameter is not found to be an acceptable value, a data notification may be presented to a user. As may be appreciated in the discussion to follow, such notifications may provide a warning to a user to allow a user to confirm calculations or determinations based on a given parameter providing the source of the notification. In certain embodiments, such a notification may preclude further operation of a module until and unless a parameter or condition generating the notification is addressed. In this regard, such data notifications may provide certain confirmations or checks in relation to parameters or conditions related to the operation of the screening assay module and/or titer assay module. Any such confirmation or check on data described herein is intended to relate to the specific operation of the screening assay module and/or titer assay module and is not reflective of confirmations or checks on the accuracy of the underlying flow cytometry results used in the processing of the screening assay module and/or titer assay module. That is, by providing an instrument confirmation of acceptability of a parameter or condition, even if related to flow cytometry results selected by a user for use in determining an optimized dilution factor range, the embodiments presented herein are not intended to provide any qualitative evaluation of the absolute accuracy of the flow cytometry results used in connection with the screening assay module and/or titer assay module.

The foregoing approach to determining an optimized dilution factor range with flow cytometry investigation of a plurality of optimized target fluid samples that are diluted to within the optimized dilution factor range may provide a number of specific technical advantages in relation to operation of a flow cytometry system. Notably, the determination of the optimized dilution factor range as described above facilitates a more efficient system and resulting process in a number of ways. Initially, a screening assay module may be provided that may access flow cytometry results for a plurality of screening target fluid samples. The screening target fluid samples may include a dilution series of a screening sample stock that is diluted at a plurality of dilution factors. In at least an embodiment of the present disclosure, a limited number of screening target fluid samples (e.g., a single sample at each dilution factor) may be provided for analysis by the screening assay module. In turn, fewer screening target fluid samples (e.g., relative to previously proposed approaches using multiple sample replicates at each of the multiple dilution factors) may be required to be subjected to flow cytometry investigation in order to determine the optimized dilution factor range for operation within a dynamic range for a given flow cytometry instrument and a given target sample stock to be analyzed by the flow cytometer. A set of multiple fluid sample replicates prepared within the identified optimized dilution range may then be subjected to flow cytometry and results analyzed to provide the particle titer results for a target sample stock with a reasonable degree of confidence, as having been performed in a high performance portion of the dynamic range for the particular instrument and sample situation.

This may provide a number of advantages relative to prior flow cytometry instruments and methods. Initially, as fewer sample replicates at each dilution factor may be required, the total volume of screening sample fluid stock needed to determine the optimized dilution factor range may be reduced. This may be of particular advantage in contexts with limited supply of screening sample fluid stock that may otherwise preclude performing analysis of a large number of replicates at each dilution factor. Furthermore, the opportunity for operator-related errors may be reduced as the total operator involvement in preparing and running screening target fluid samples may be reduced.

Moreover, the time required to perform the flow cytometry investigation on the reduced number of screening target fluid samples may be correspondingly reduced. Not only does this provide efficiencies in relation to the time required to perform the analysis, but also allows more compact analysis that reduces the potential for introduction of error in the course of performing flow cytometry investigation of each of the fluid samples. It may be understood that the flow cytometry process may be subject to time dependent variables that introduce error into the flow cytometry investigation such that the amount of error or variability in the process increases with time. As such, providing a more temporally compact analysis may reduce such time dependent error or variability.

Further still, the reduced number of screening target fluid samples required to determine the optimized dilution factor range may also reduce the computational resources required to provide flow cytometry results. As may be appreciated, performing data analysis for a large number of flow cytometry investigations may require substantial processing resources and/or memory resources of a computational environment in which the analysis is performed. By limiting the number of screening target fluid samples used, a corresponding reduction in the computational resources may be achieved. Moreover, as the modules described herein to may directly access flow cytometry results stored in memory, the efficiency of processing of the more limited results may be further heightened, thus providing an overall more efficient computational processing environment in which the flow cytometer is operated.

Additionally, even when considering the optimized target fluid samples, a completed flow cytometry evaluation with acceptable confidence of accuracy may be performed for a target sample stock with a reduced total number of target fluid samples. This may include a reduction in data analysis processing and computer storage consumed, which may also provide a corresponding reduction in electrical power consumption for instrument operation and data analysis. For example, in the prior technique example noted in the Background section above using three target fluid sample replicates prepared at each dilution factor of 10, 100, 1000 and 10,000, a total of 12 target fluid samples are prepared and processed for a complete evaluation of a target sample fluid stock. However, with an implementation of a technique of this disclosure, an evaluation of comparable confidence in terms of accuracy of result for the target sample stock may be obtained with processing of significantly fewer target fluid samples. For example, efficiency may be realized by preparing and processing one screening target fluid sample at each of the noted dilution factors to obtain an optimized dilution factor range with operation of the screening assay module. In turn, a total of four screening target fluid samples may be prepared and subjected to investigation, followed by preparing and processing three optimized target fluid samples at a single dilution factor within the optimized dilution factor range to obtain particle titer results with operation of the titer assay module. As a consequence, a comparable evaluation of the target sample stock is performed in this example of the present disclosure with preparation and processing of only seven target fluid samples (four screening target fluid samples plus three optimized target fluid samples) rather than 12 target fluid samples for the corresponding prior technique example. Also as a consequence, less target sample stock is consumed, less time is required to prepare target fluid samples and subject those target fluid samples to flow cytometry, less flow cytometer throughput capacity is consumed, less computer processing capacity is used for data analysis, less computer storage is used for storage of a smaller number of flow cytometry results, and less power is consumed for operation of the flow cytometer and for data processing. Further, flow cytometry instrument throughput capacity is increased for the number of target sample stocks that may be evaluated by the flow cytometry instrument and less instrument wear and tear is consumed for each such evaluation of a target sample stock.

The flow cytometry methods and flow cytometry systems of the present disclosure may beneficially be employed for quantification of target particles of any particular type by flow cytometry evaluation. Such target particles may be cells, which may for example be of a size of several to tens of microns in size, or other similarly sized particles of biological material. However, in some preferred implementations, the methods and systems are particularly beneficial for quantification of target particles that are very small, and particularly that are of a virus size. Such target particles of a virus size may in some implementations be of particle size at or smaller than 2 microns, 1 micron, 600 nanometers, 300 nanometers or an even smaller maximum particle size. Such target particles of a virus size may in some implementations have a particle size of at least 10 nanometers, 20 nanometers, 30 nanometers or an even larger minimum particle size. Particle size as identified above refers to a maximum cross-dimension of the particles. Such target particles of a virus size may for example be virions (free virus particles not part of a larger unit such as an infected cell), virus-like particles, exosomes or microvesicles. Virions or virus-like particles may be of an enveloped or non-enveloped type. Such virions or virus-like particles may be or have attributes of viruses of any family of viruses. Some example viruses are influenza virus, baculovirus, adenovirus, adeno-associated virus, enterovirus, lentivirus, minute virus of mice, rotavirus, parvovirus and feline leukemia virus.

References to particles herein are generally in reference to such particles in an unassociated state, that is not part of a substantially larger particle unit. By a particle being of virus size and being unassociated, it is meant that the particle is not part of a larger particle structure that is larger than virus size, for example the unassociated particle is not within a host cell or bound to an immunoassay bead or microsphere or part of an agglomerate that is larger than virus size. It will be appreciated that target particles that are labeled with a fluorescent stain for flow cytometry detection by fluorescent emission response may be somewhat larger than the unlabeled target particle due to the added mass of the fluorescent label. However, references herein to particle size, and in particular references to particles being of a virus size, may be in reference to the size of unassociated target particles prior to staining and/or to stained target particles including the added mass of a fluorescent stain that attaches to the target particles. When a fluorescent stain is provided by fluorogenic dye molecules that attach to a particle of virus size (e.g., virion, exosome, virus-like particle or microvesicle), the added size from the attached dye molecules generally does not appreciably increase the size magnitude of the resulting unassociated stained particle, such that the unassociated stained particle is also of a virus size, even if slightly larger than the unstained particle. Similarly for a fluorescent antibody stain, the stained particle will be larger than the unstained particle but still of a virus size. Some typical example fluorescent antibody stains may be on the order of about 7 nanometers in size and may therefore add on the order of about 14 nanometers to the size relative to the unstained particle when the fluorescent antibody stain binds directly to the target particle. The particle size increase with staining may be somewhat larger for indirect binding of a fluorescent antibody stain, where a primary antibody binds to the target particle and a secondary antibody with fluorophore binds to the primary antibody to provide a fluorescent label on a particle.

Various aspects and example implementation embodiments of the methods and systems of the disclosure are presented in the following description, including the claims, and in the drawings.

BRIEF DESCRIPTION OF THE DRAWINGS

FIGS. 2A-2D are perspective, top and end views of one embodiment of a flow cytometer internal assembly that may be included within the flow cytometer instrument of FIGS. 1A-1B.

DETAILED DESCRIPTION

Figure 1A:
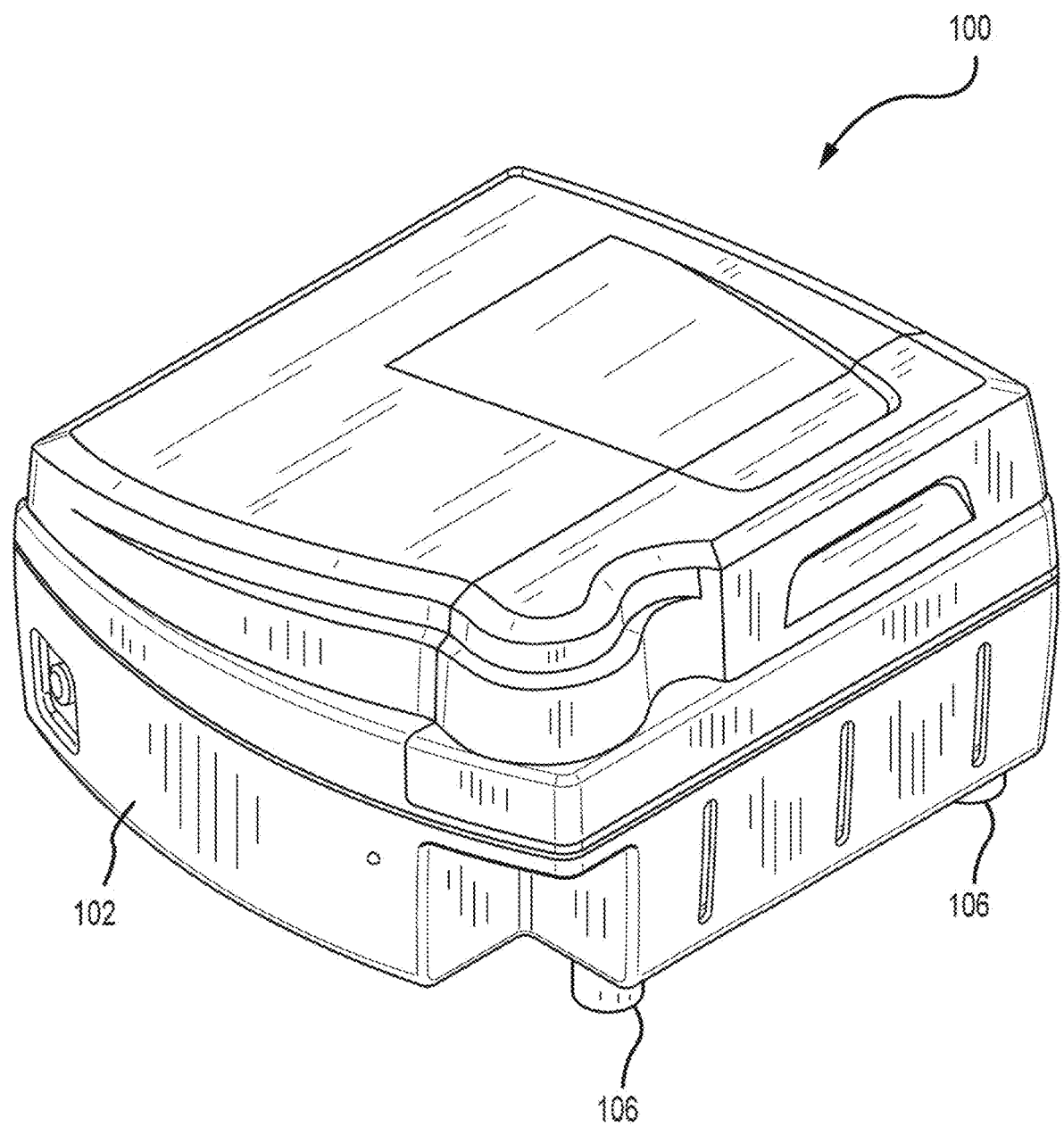
FIGS. 1A-1B are perspective and side views of one embodiment of a flow cytometer instrument.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

As used herein, a sample stock, or sample fluid stock, refers to a batch of material with a fluid medium and which is an object of investigation by flow cytometry investigation for presence of particles with particular particle attributes, or properties, and such particles that are the object of investigation are referred to herein as target particles. Such a sample stock may, for example, be a sample batch collected from a biological process or that results from further processing of such a collected sample batch, for example purification processing. Multiple fluid samples for flow cytometry processing are prepared using portions of such a sample stock, for example to prepare fluid samples at different dilutions or to prepare multiple fluid sample replicates at the same level of dilution. Target sample stock refers to such a sample stock that is an ultimate object of quantification for target particles, and which is used to prepare an optimized target set with multiple optimized target fluid samples each diluted to within an optimized sample dilution factor range. Screening sample stock refers to sample stock that is used to prepare a screening target set with multiple screening target fluid samples used to determine the optimized dilution factor range through execution of the screening assay module. In preferred implementations the target sample stock and the screening target sample stock are the same sample stock, which is used both to prepare screening target fluid samples, for processing to determine the optimized dilution factor range with execution of the screening assay module, and to prepare optimized target fluid samples for processing to determine the particle titer results with execution of the titer assay module. However, in some alternative implementations the screening sample stock may be a different sample stock than the target sample stock, although in such implementations, the screening sample stock and target sample stock should preferably be sourced under conditions at which the screening sample stock and target sample stock are expected to have generally equivalent compositional characteristics, including in relation to target particle content, such that a determination of an optimized dilution factor range using the screening sample stock will reasonably translate for flow cytometry evaluation of optimized fluid samples prepared using the target sample stock. For example, a target sample stock may be or be prepared from a collected sample batch of material collected from a biological manufacture process on one day and the screening sample stock may be or be prepared from an equivalently collected sample batch of material collected from the same biological manufacture process under similar conditions at a different time, such as at a different time on the same day or on a different day at an equivalent operating state. However as noted, in preferred implementations the target sample stock and the screening target sample stock are the same sample stock (e.g., a single collected sample batch).

The particular particle attributes of target particles may include any one or more than one of properties of a target particle, for example relating to size, composition, morphology or conformation properties. In some preferred implementations, a particular attribute of a target particle may include one or more particular biological features of interest that are susceptible to identification through the use of one or more fluorescent stains. Such a biological feature may include protein content and/or nucleic acid content (e.g., presence of genome material) that is generally susceptible to non-specific staining by non-specific fluorogenic stains. Such a biological feature may include the presence of a particular epitope that may be identified through specific antigenic binding activity, such as specific binding by an antibody stain to a particle feature of interest, for identification through use of fluorescent antibody stains. Implementations may use a single fluorescent stain identifying the presence or absence of a single particle feature or multiple fluorescent stains may be used identifying multiple particle features. Use of multiple fluorescent stains may include flow cytometry evaluation to identify target particles with multiple particle attributes through identification of coincident fluorescent responses from two or more than two such fluorescent stains, or the presence of one factor and the absence of another factor through identification of a fluorescent response of one fluorescent stain that does not coincide with a fluorescent response of a second fluorescent stain. One example of such an application includes use of a non-specific, fluorogenic stain for identifying the presence generally of protein content together with another non-specific fluorogenic stain for identifying the presence generally of nucleic acid content. Identification of coincidental occurrences of fluorescent responses of the two non-specific stains during flow cytometry may indicate the presence of a target particle including both protein content and nucleic acid content, such as may be the case for example for a complete, in-tact virion including envelope or capsid protein and genome material. Another example of such an application includes using an epitope-specific fluorescent antibody stain together with a non-specific fluorogenic stain for nucleic acid content. The fluorescent antibody stain may be specific for binding with an epitope on a viral envelope, viral capsid, exosome or microvesicle, and identification of coincidental occurrences of fluorescent responses of such a fluorescent antibody stain and non-specific nucleic acid stain during flow cytometry may indicate the presence of a target particle including the epitope and genome material, such as in the case of a complete, in-tact virion of a viral type (e.g., specific virus) represented by the presence of such an epitope, whereas identification of one fluorescent response of one fluorescent stain not coincident another fluorescent response of another fluorescent stain may indicated the presence of a particle positively having one particle feature and not having the other particle feature corresponding to the different fluorescent stains (e.g., a virus-like particle having a viral epitope and without genome). Additional information concerning fluorescent staining and stain detection with flow cytometry that may be used with the present disclosure is disclosed in U.S. Pat. Nos. 10,161,850 B2; 10,031,061 B2; 9,546,936 B2; 9,903,803 B2, and in U.S. provisional patent application No. 62/713,377, the entire contents of each of which are incorporated herein by reference for all purposes. In contrast to target fluid samples (e.g., screening target fluid samples and optimized target fluid samples) that are a subject of investigation for target particles, blank control fluid samples (e.g., screening blank control fluid samples and optimized blank control fluid samples) are fluid samples intentionally prepared to be in the absence of the target particles. The blank control fluid samples may be provided for flow cytometry evaluation to generate blank control flow cytometry results with background particle counts that may be used to correct flow cytometry results from flow cytometry evaluation of target fluid samples that are being investigated for presence of target particles (e.g., screening target fluid samples or optimized target fluid samples). By being in the absence of the target particles it is meant that the fluid sample is substantially free of the target particles for all practical purposes in relation to flow cytometry quantification, and not that such a blank target sample may include even a single such target particle, although that would generally be preferred. Preferably, blank control fluid samples closely correspond in composition to corresponding target fluid samples, other than not including any or any significant quantity of the target particles. In some more preferred implementations, blank control fluid samples are prepared using blank sample fluid matrix of the corresponding sample stock for which the blank control fluid samples will be used for correction purposes. By fluid matrix it is meant the basic composition of the fluid medium of a sample stock, which together with added reagent liquids form the liquid medium of target fluid samples prepared from the sample stock. Such added reagent liquids may include for example sample dilution buffer used to prepare diluted fluid samples relative to sample stock, as well as liquids that may be added in connection with fluorescent staining of target fluid samples. Each such blank control fluid sample should preferably be made with the same fluorescent stain or stains as used in a corresponding target fluid sample and at the same concentrations. Preferably, at least one, and more preferably just one, such blank control screening fluid sample made with corresponding fluid matrix is prepared for each screening target fluid sample of a screening target set. Preferably, at least one, and more preferably just one, optimized blank control fluid sample made with corresponding fluid matrix is prepared for each optimized target fluid sample of an optimized target set.

When fluid matrix of a sample stock is not available to prepare a corresponding blank control fluid sample, then an approximation liquid formulation may be used to prepare a corresponding blank control fluid sample. For example, a blank control fluid sample may be made using one or more of the reagent liquids used to prepare target fluid samples (e.g., a mixture of a buffer solution used for dilution of sample stock and liquids added in connection with sample staining). In such a case, a single blank control fluid sample composition made using such a reagent liquid formulation, and containing fluorescent stain or stains at the same concentrations as the screening target fluid samples, may be used as a corresponding screening blank control fluid sample or corresponding optimized blank control fluid sample for a screening control set or optimized control set, as the case may be.

A flow cytometer may be used to perform flow cytometry investigation of a fluid sample. The fluid sample may include target particles with particular particle attributes. The flow cytometry investigation of the fluid sample may provide a flow cytometry result for the fluid sample. The flow cytometry result may include a quantification indication of particles for the fluid sample. In one example, the quantification indication may be expressed as a concentration of particles, or particles per unit volume, (e.g., particles/mL). In another example, the quantification indication may be expressed as a particle count (number of particles) in a standard volume of fluid sample, from which particle concentration is determinable. The fluid sample may be exposed to a stain or dye that provides response radiation when exposed to investigation excitation radiation that may be measured by the radiation detection system of the flow cytometer. As described above, and especially in applications where the particles to be measured are of a virus size, flow cytometer instruments are very sensitive and accurate determination of flow cytometer results and with reasonable precision may be difficult. Specifically, flow cytometry results may be subject to errors for a number of sources as described above.

Accordingly, when designing a flow cytometry investigation to achieve suitably and demonstrably accurate results, it has been a traditional practice to process many replicates of fluid samples to calculate measures of the accuracy and/or precision of the resulting flow cytometry results. This may be required to demonstrate the flow cytometry results are sufficiently accurate and/or precise for a given analysis to be conducted and that the results are statistically robust. For instance, at least three replicates of a target sample fluid may be each subjected to flow cytometry to obtain results for each of the three replicates. In turn, the flow cytometry results for the replicates may be processed using data analysis techniques to provide a measure of the accuracy and/or precision of the results.

Furthermore, in many investigation designs, a control may also be subjected to flow cytometry investigation to provide enhanced accuracy of the investigation. A blank control fluid sample may be provided that replicates or mimics to a reasonable degree the composition of the fluid medium in which the target particles of the target fluid sample are provided. Blank control fluid samples may also be referred to herein simply as control fluid samples or blank fluid samples, for brevity. As a flow cytometry investigation of a fluid sample may be susceptible to false detection events, performing flow cytometry investigation of a corresponding control fluid sample may allow for false detection events to be accounted and corrected for in the resulting flow cytometry results for a target fluid sample. Specifically, the flow cytometry results of the control fluid sample may be subtracted from the flow cytometry results of the target fluid sample.

In one embodiment of an investigation design, a blank control fluid sample may be prepared using fluid matrix of the corresponding sample stock, but in the absence of the target particles of the target fluid sample. In this regard, the blank control fluid sample may be the same composition as the target fluid sample matrix plus added reagents, such as dilution buffer solution and staining liquid, and dyes or stains used in the target fluid sample. In an alternative approach, a sample buffer solution including a mixture of such reagent liquids may be used that may also be provided with the dye or stain of the target fluid sample also in the absence of the target particles. In any regard, any particles detected in the blank control fluid sample are assumed to represent an error associated with false detections such that the subtraction of the flow cytometry results for a control fluid sample provide a corrected measure of the actual quantification of particles in the target fluid sample. However, as is the case with the target fluid sample, a plurality of replicates of the control fluid sample are preferably subjected to flow cytometry investigation to provide accurate results for the control fluid sample.

Accordingly, it may be appreciated that subjecting each of many target fluid samples and control fluid samples to flow cytometry investigation may provide a number of challenges. Initially, to provide a desired number of replicates of both target fluid samples and control fluid samples, a sufficient supply of sample stock and control stock with corresponding fluid matrix is needed. In certain contexts where limited stock supplies are present or when blank fluid matrix of the sample stock is not available, the resulting design of the flow cytometry investigation may be limited in view of the limited stock fluid supply. Furthermore, the time and expense required to process each of the target and control sample fluids may be prohibitive. In addition, as the flow cytometry instrument may be sensitive to a number of variables, some of which may be operation dependent or time dependent, the larger the number of investigations over a longer time period introduces the susceptibility to increased error in relation to the investigation of each fluid sample. That is, in the context of many fluid sample investigations, conditions associated with the first fluid sample investigation may be different to conditions for the last fluid sample, such that the change in conditions represents an increasing error in the results to be collectively processed. As such, efficiency of investigation not only provides the simple benefit of reduced time and expense, but also achieves inherently more accurate results by reducing the potential for error to be introduced in the course of determining the flow cytometry results for a given invitation design.

Figure 1B:
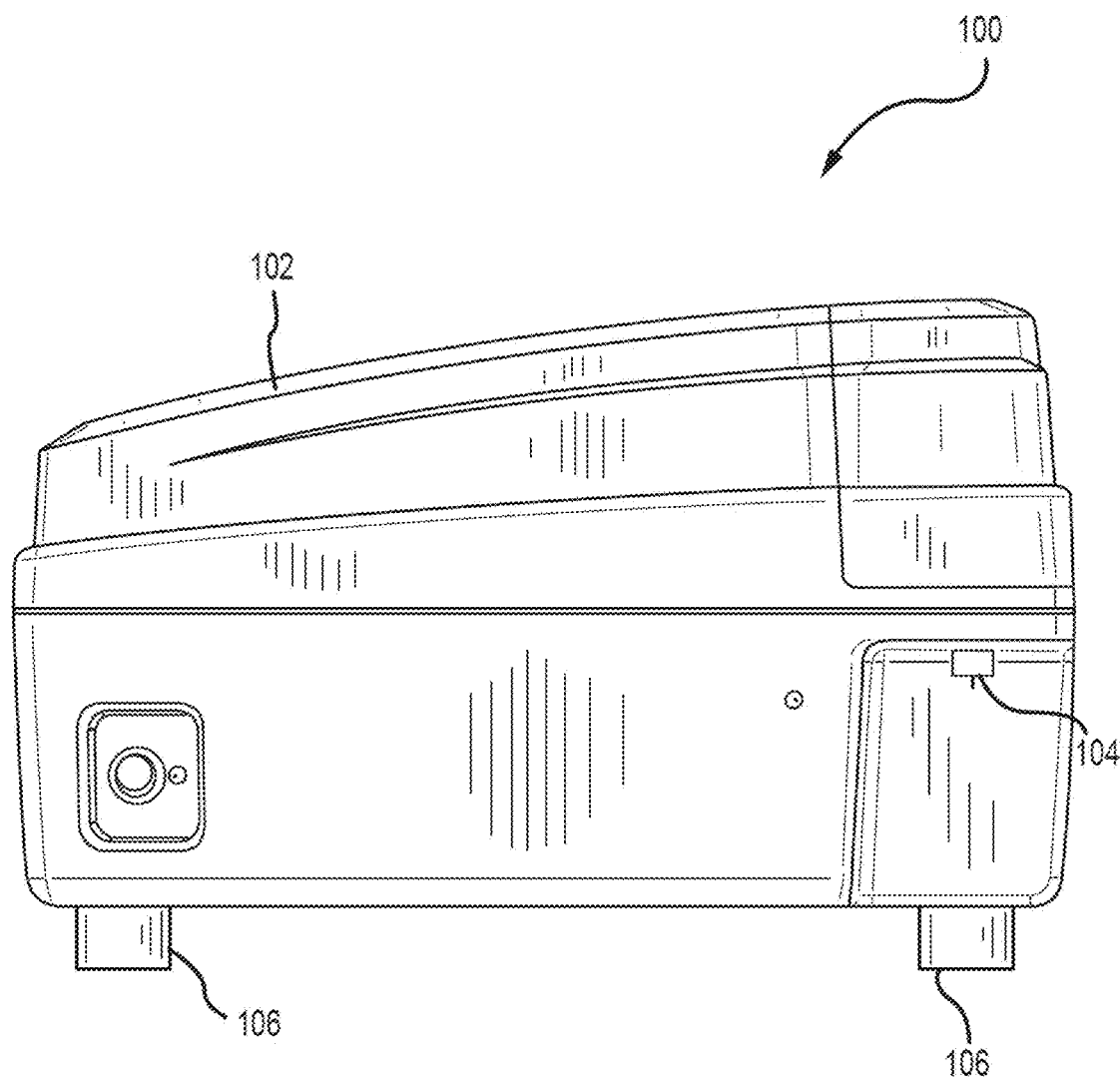

FIGS. 1A-1B show an embodiment of a flow cytometer 100 that includes flow cytometry componentry contained within a protective enclosure 102 that may be used to perform a flow cytometry investigation on a fluid sample, for generation of flow cytometry results. Fluid samples may be introduced into the flow cytometer 100 for flow cytometry investigation through a sample inlet 104. The flow cytometer 100 includes support pads 106 on which the weight of the enclosure 102 and contents within the enclosure 102 are supported. Advantageously, the support pads 106 may be of a material that provides significant vibration isolation to the enclosure 102, and to contents within the enclosure 102, from ambient environment vibrations that may be transmitted through a shelf, table or other surface on which the flow cytometer 100 may be situated during use. The support pads 106 may, therefore, provide a vibration isolation structure that provides a vibration propagation barrier to the enclosure 102 and contents within the enclosure 102. For example, the support pads 106 may be of a polymeric composition that provides a vibration decomposing effect. Example polymeric compositions include thermoplastic and thermoset polymer compositions.

Figure 2A:
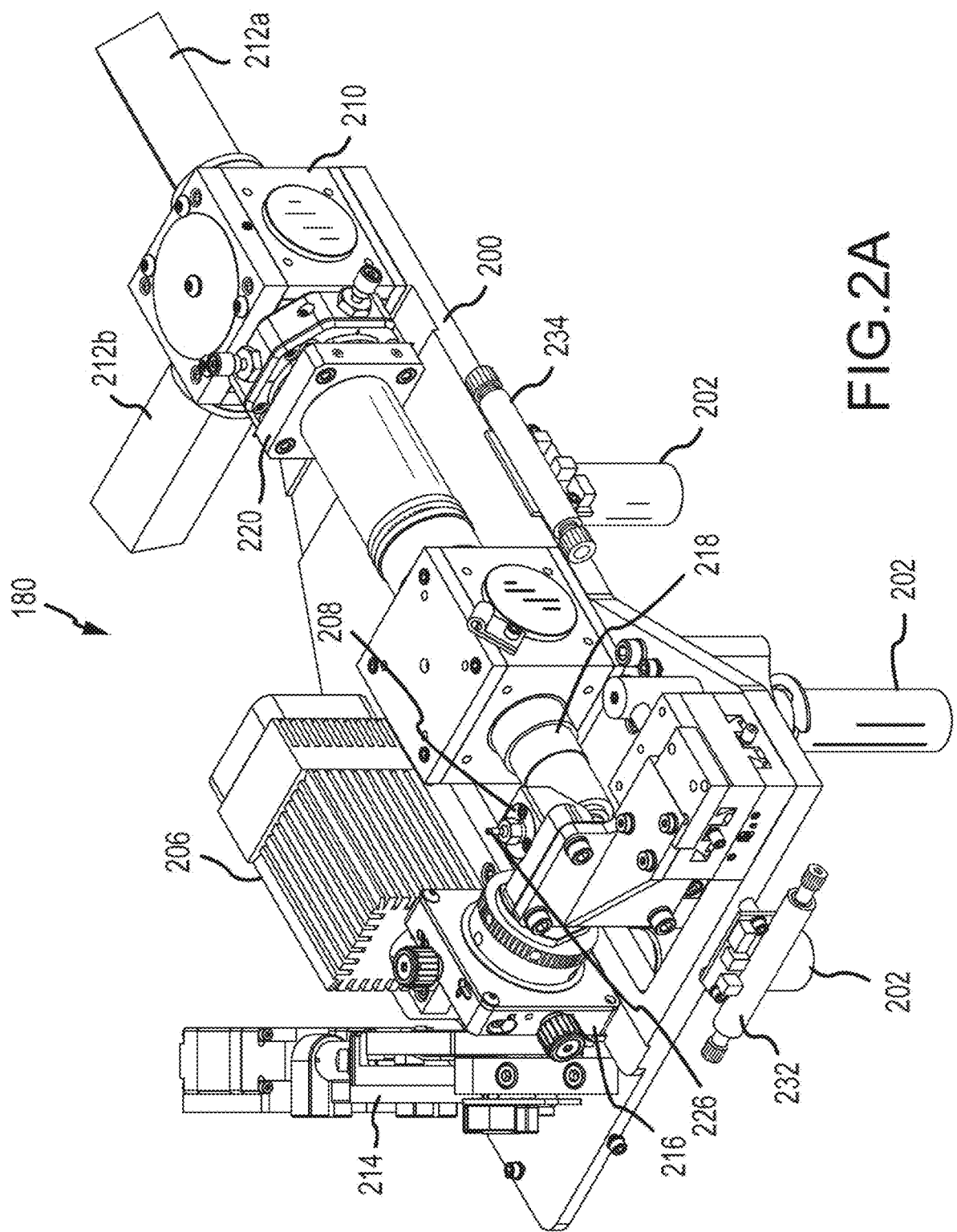
Figure 2C:
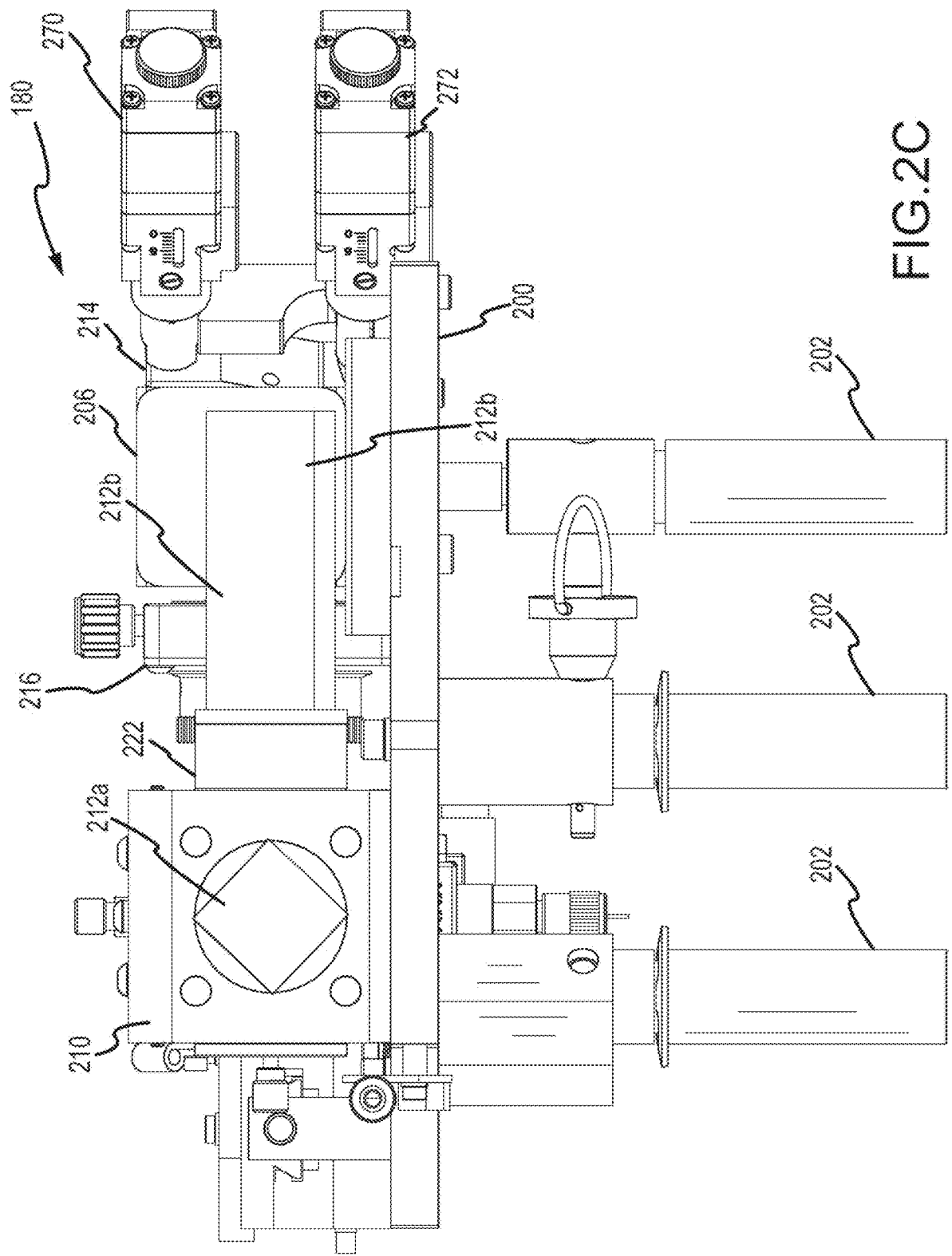
Figure 2D:
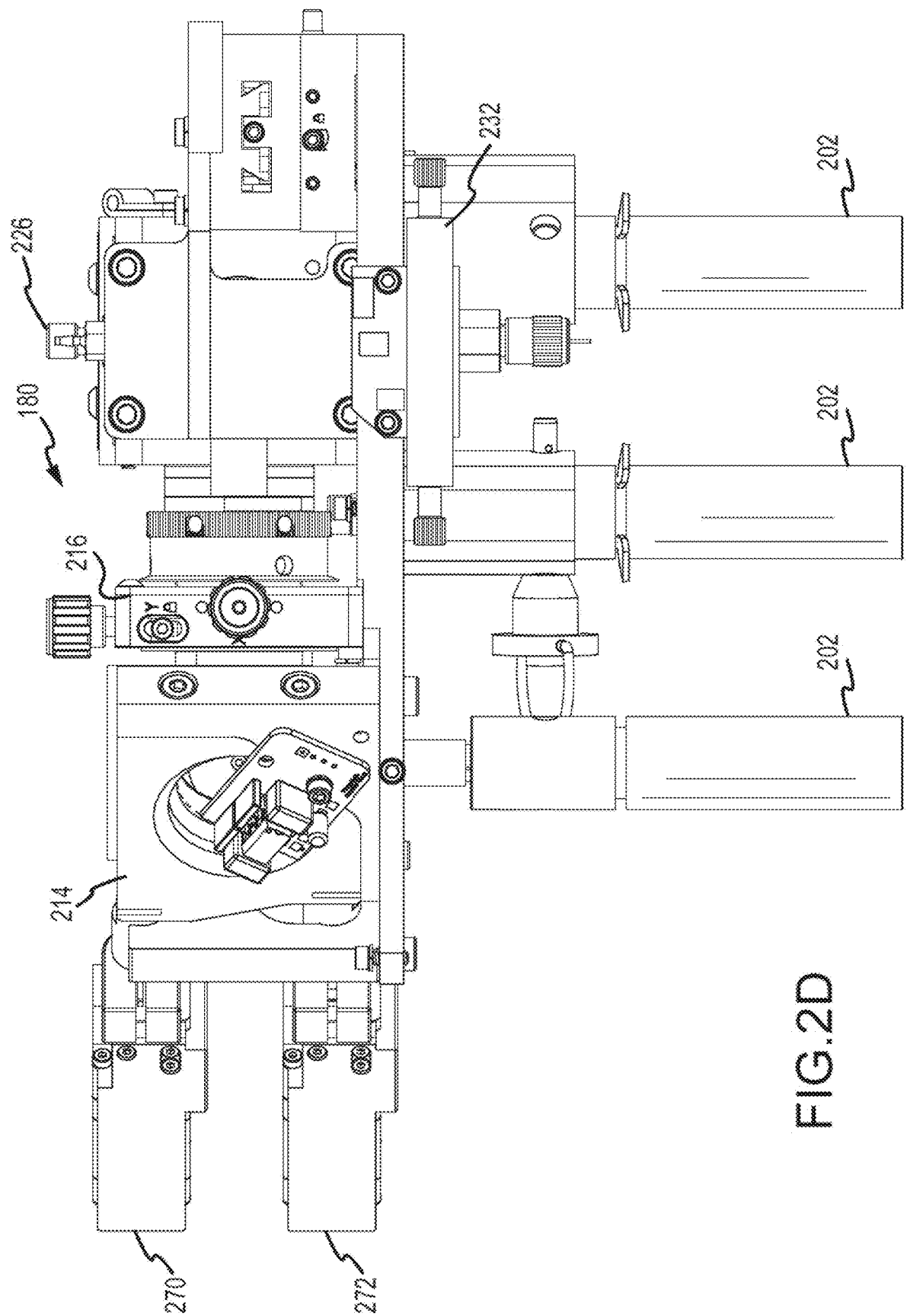

FIGS. 2A-2B show an example flow cytometer internal assembly 180 that may be disposed within the enclosure 102 of the flow cytometer 100. The internal assembly 180 includes a flow optical system assembly including support platform 200 and a number of flow cytometry optical components supported by the support platform 200, with the optical components having fixed relative positioning configured for performing flow cytometry investigations of sample fluids. The flow cytometry optical system assembly is supported by a support structure including three rigid support members 202 and vibration isolation mounts (not shown in FIGS. 2A-2B) that are supported by the support members 202, and on which the entire weight of the support platform 200 and components supported by the support platform 200 are supported during flow cytometry investigation operations.

The flow cytometry optical components supported by the support platform 200 include a light source in the form of a laser unit 206, a flow cell unit 208 and a light detection system including a dichroic mirror unit 210 and two light detector units 212, for example which may include photomultiplier tubes. During operation of a flow cytometry investigation of sample fluid flowing through an investigatory flow path of a flow cell of the flow cell unit 208, light from the laser unit 206 travels along a first optical path 250 to the flow cell. The first optical path 250 includes a mirror unit 214 that includes an orientable mirror that reflects light from the laser unit 206 to direct that light through a focusing lens 216 to focus light in the vicinity of the investigatory flow path within the flow cell of the flow cell unit 208. Orientation of the mirror of the mirror unit 214 may be controlled by operating one or both of a pair of motors 270, 272 coupled to the mirror. Light from the investigatory flow path of the flow cell is directed along a second optical path 260 from the flow cell to the dichroic mirror unit 210 for detection by the light detectors 212. The second optical path 260 includes a focusing lens unit 218 and a spatial lens unit 220 between the flow cell unit 208 and the dichroic mirror unit 210. A dichroic mirror within the dichroic mirror unit 210 splits the light between light that passes through the dichroic mirror and is directed toward light detector 212a and light that is reflected by the dichroic mirror and is directed toward light detector 212b. Band-pass filters 222 may be disposed in the optical paths to the light detectors 212 to pass a narrow light including a wavelength or band of wavelengths targeted for detection by the respective light detectors 212a, 212b.

During operation of the flow cytometer 100 to perform a flow cytometry investigation of a fluid sample, the fluid sample to be investigated may be introduced into the flow cytometer through the sample inlet 104. The sample fluid is conducted to an inlet (not shown in FIGS. 2A-2B) to the flow cell unit 208. The sample fluid flows through the investigatory fluid path also referred to herein as a flow cytometer investigation zone in the flow cell unit 208 and exits the flow cell unit 208 through a sample exit 226. Sample fluid introduced into the flow cell unit 208 through the sample fluid inlet 104 flows through a transparent section of the flow cell unit 208 where it is subjected to incident investigation radiation (e.g., light from the laser unit 206) and exits through the sample exit 226. The investigatory flow path passes through the transparent section. The transparent section may, for example, be made of a quartz crystal material. Between the sample inlet 104 of the flow cytometer 100 and the inlet to the flow cell unit 208, the fluid sample passes through a fluid path (not shown) that includes a flow meter 232 where the flow rate of the fluid sample may be measured for data collection purposes as part of a feedback control mechanism for controlling the fluid sample flow rate to the flow cell unit 208. In the flow cell unit 208, a sheath fluid is introduced around the fluid sample flow before the fluid sample flows through the transparent section for investigation. The sheath fluid is introduced into the flow cell unit 208 through a sheath fluid inlet (not shown in FIGS. 2A-2B). Prior to introduction of the sheath fluid into the flow cell unit 208, the sheath fluid passes through a fluid path (not shown in FIGS. 2A-2B) that includes a flow sensor 234 for monitoring of the sheath fluid flow rate to the flow cell unit 208 and for use for feedback control to control the flow rate of the sheath fluid to the flow cell unit 208. The flow sensors 232 and 234 are conveniently supported on the support platform 200.

Figure 3:
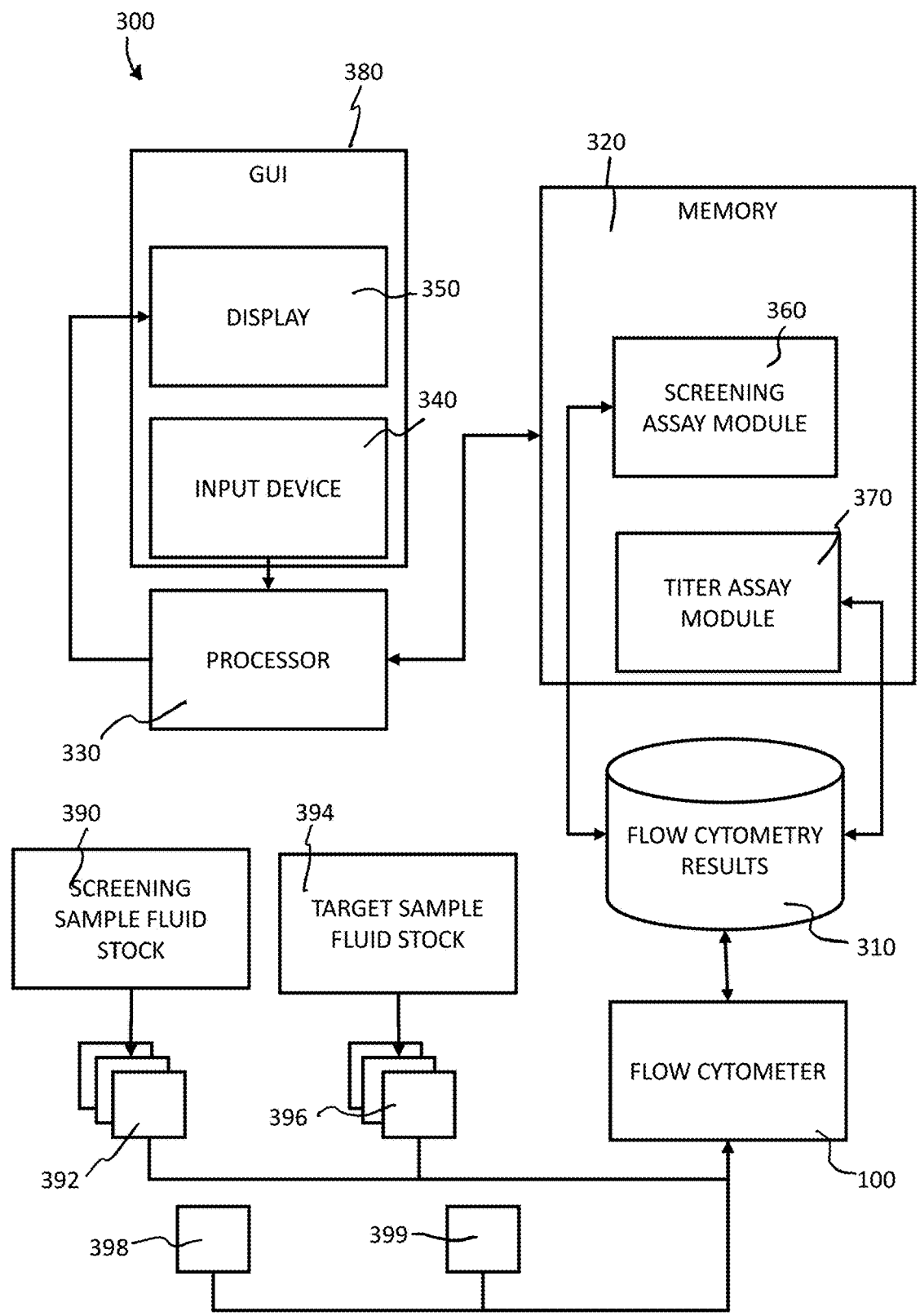
FIG. 3 is a schematic view of an embodiment of a flow cytometry system that includes a screening assay module and a titer assay module.

With additional reference to FIG. 3, a schematic representation of an embodiment of a flow cytometry system 300 is depicted. The flow cytometry system 300 may include a flow cytometer 100 such as one described above. The flow cytometer 100 may be operative to generate a flow cytometry result for a fluid sample subjected to flow cytometry investigation using the flow cytometer 100. The flow cytometry result generated by the flow cytometer 100 may include a quantification indication of particles (e.g., particle count or particle concentration) of a given fluid sample. The flow cytometry results may also include other information regarding the flow cytometry investigation including, but not limited to, a sample name for identification purposes, a dilution factor of a sample, a date/time tag corresponding to the date/time of the flow cytometry investigation, individual results for respective investigation channels for multichannel investigation (e.g., including combination dyes that employ different targeted particle attributes for investigation on the respective channels), and radiation detection data such as detector baseline, peak, and widths.

The flow cytometer 100 may be in operative communication with a flow cytometry results database 310. The flow cytometer 100 may provide flow cytometry results for each fluid sample subjected to flow cytometry investigation by the flow cytometer 100 to the flow cytometry results database 310 where the flow cytometer results may be stored in computer memory. Flow cytometry results database 310 may include any appropriate database structure for storage of database entries corresponding to flow cytometer results for different respective fluid samples subjected to flow cytometry investigation. One specific example implementation may be a SQL database for storage of the flow cytometry results. The flow cytometry results database 310 may be local to the flow cytometry system 300 (e.g., on a common device with one or more other elements of the flow cytometry system 300) or may be provided remotely. In the event that the flow cytometry results database 310 is provided remotely, access to the flow cytometer results database 310 may be provided by way of network communication such as a local area network or wide area network such as the Internet.

The flow cytometry system 300 further includes a computer memory 320. The computer memory 320 may have stored therein a screening assay module 360 and a titer assay module 370. The screening assay module 360 and the titer assay module 370 may comprise machine-readable instructions stored in the computer memory 320. In this regard, the screening assay module 360 and a titer assay module 370 may be accessed by one or more processors 330 in operative communication with the computer memory 320. The processor 330 may access and execute the screening assay module 360 and the titer assay module 370 to provide functionality of the modules as described in greater detail below. In other embodiments, the screening assay module 360 and/or the titer assay module 370 may comprise any appropriate hardware, software, firmware, or combinations thereof to provide functionality associated with the screening assay module 360 and/or titer assay module 370 described below. Furthermore, multiple processors 330 may be provided that may individually or collectively access and execute the screening assay module 360 and titer assay module 370 to provide the functionality of the flow cytometry system 300 described more fully below. In other embodiments, the screening assay module 360 and/or titer assay module 370 may comprise any appropriate processor and/or memory combination, application-specific integrated circuits, field programmable gate arrays, or other computer hardware or software that may be executed to achieve the functionality described in more detail below.

The flow cytometry system 300 may also include an input device 340 and a display 350 that are each in operative communication with the processor 330. In this regard, the processor 330 may receive user inputs from the input device 340 for use in interaction with or control of the flow cytometry system 300. In addition, the processor 330 may configure the display 350 to present to a user in a user-perceivable manner information regarding the operation of the flow cytometry system 300. The display 350 and input device 340 may collectively provide a graphical user interface 380 through which interaction between a user and the flow cytometry system 300 may be facilitated. For instance, the graphical user interface 380 may facilitate control over the operation of one or more of the flow cytometer 100, the screening assay module 360, titer assay module 370, and/or flow cytometry results database 310. There are discussed below a number of graphical user interface screens that may correspond to execution of the screening assay module 360 and/or titer assay module 370 that may be provided for interactivity with the user using the graphical user interface 380 by presentation of the screens on the display 350 and receipt of corresponding inputs regarding the screens from the user input device 340.

In general, the flow cytometry system 300 may be executed such that the screening assay module 360 is operative to access flow cytometry results in the flow cytometer results database 310 for use in determination of an optimized dilution factor range. In connection therewith, a screening sample fluid stock 390 may be used to prepare a plurality of screening target fluid samples 392 that may each be subjected to flow cytometry investigation by the flow cytometer 100. Flow cytometry results for each of the screening target fluid samples 392 may be stored in the flow cytometry results database 310. Additionally, one or more screening blank control fluid samples 398 may be prepared and subjected to flow cytometry investigation by the flow cytometer 100 such that flow cytometry results for the one or more screening blank control fluid samples 398 may be stored in the flow cytometry results database 100. Accordingly, the screening assay module 360 may access the flow cytometry results database 310 for retrieval of the flow cytometry results for the screening target fluid samples 392 and/or screening blank control fluid sample 398 for use in determining the optimized dilution factor range as will be discussed in greater detail below.

In turn, a plurality of optimized target fluid samples 396 may be prepared from a target sample fluid stock 394. The plurality of optimized target fluid samples 396 may each be within the optimized dilution factor range (e.g., as determined by the screening assay module 360), and may optionally all be at the same dilution factor within the optimized dilution factor range. In an embodiment, the screening sample fluid stock 390 and the target sample fluid stock 394 may be the same fluid stock. In alternative embodiments, the screening sample fluid stock 390 may be an equivalent approximation of the target sample fluid stock 394 as described above. For instance, the screening sample fluid stock 390 and the target sample fluid stock 394 may have the same target particles and may have sufficiently similar properties (e.g., including fluid medium composition and target particle concentration) such that flow cytometry results for the screening target fluid samples 392 accurately model the performance of the flow cytometer 100 relative to the optimized target fluid samples 396. One contemplated example may be in relation to a predictable processing environment in which the target sample fluid stock 394 is to be analyzed. In such a predictable processing environment, the target sample fluid stock 394 may have relatively consistent properties such that an optimized dilution factor range determined by analysis of flow cytometry results for the screening target fluid samples 392 may be applicable to a number of target sample fluid stocks 394. For instance, a given instance of a plurality of target sample fluids tocks 394 may be used as the screening sample fluid stock 390 such that the analysis to determine the optimized dilution factor range may be applied to the remaining plurality of the target sample fluid stocks 394. As such, the results obtained using results from a given screening sample fluid sock 390 may be used for other target sample fluid stocks 394 prepared in the predictable processing environment for a given time or number of fluid stocks instances.

In any regard, the optimized target set of optimized target fluid samples 396 that are within the optimized dilution factor range may be subjected to flow cytometry investigation by the flow cytometer 100 and the corresponding flow cytometry results for the optimized target fluid samples 396 may be analyzed by the titer assay module 370 to provide particle titer results for a target sample stock 394. In addition, an optimized blank control fluid sample 399 may also be prepared and subjected to flow cytometry investigation by the flow cytometer 100. In turn, flow cytometry results for the optimized blank control fluid sample 399 may be stored by the flow cytometry results database 310 and may be used by the titer assay module 370 as a control for analysis in determining particle titer results.

Determination of the optimized dilution factor range and subsequent flow cytometry investigation of optimized target fluid samples 396 within the optimized dilution factor range may provide increased accuracy and precision of the particle titer results produced by the titer assay module 370. For instance, a reduced number of screening target fluid samples and/or screening control fluid samples may be required for operation of the flow cytometry system 300. In turn, reduction in error by reducing the number of required investigations may be realized. Moreover, by determining an optimized dilution factor range, the resulting accuracy of the investigation of optimized target fluid samples 396 may be achieved as the optimized dilution factor range may be particular to a given flow cytometer 100 investigating particular target particles of a target sample fluid stock 394.

In relation to the optimized target dilution factor range, the improved accuracy in this range may be achieved by performing flow cytometry investigation of optimized target fluid samples 396 that are in a dilution range over which a flow cytometer 100 demonstrates increased accuracy. A flow cytometer may demonstrate an operation range relative to a concentration of particles in a fluid sample. That is, a flow cytometer may be unable to produce sufficiently accurate results for fluid samples having extremely high concentrations of particles are extremely low concentration of particles as noted above. In this regard, the range of concentrations of particles in a fluid sample over which the flow cytometer may produce sufficiently accurate results may be limited. The range of an instrument may have an absolute range over which the flow cytometer 100 is operative and a dynamic range that is dependent on the instrument and the particular fluid sample being investigated. An instrument's dynamic range may refer to a range of particle concentrations over which fluid samples at various dilution factors demonstrate linear flow cytometry results (in a logarithmic analysis regime as discussed below). Analysis relative to determining a flow cytometer's dynamic range is illustrated in relation to FIGS. 4-8. This analysis may be referred to as a screening analysis, and such analysis may be performed by the screening assay module 360 as described in greater detail below.

Figure 4:
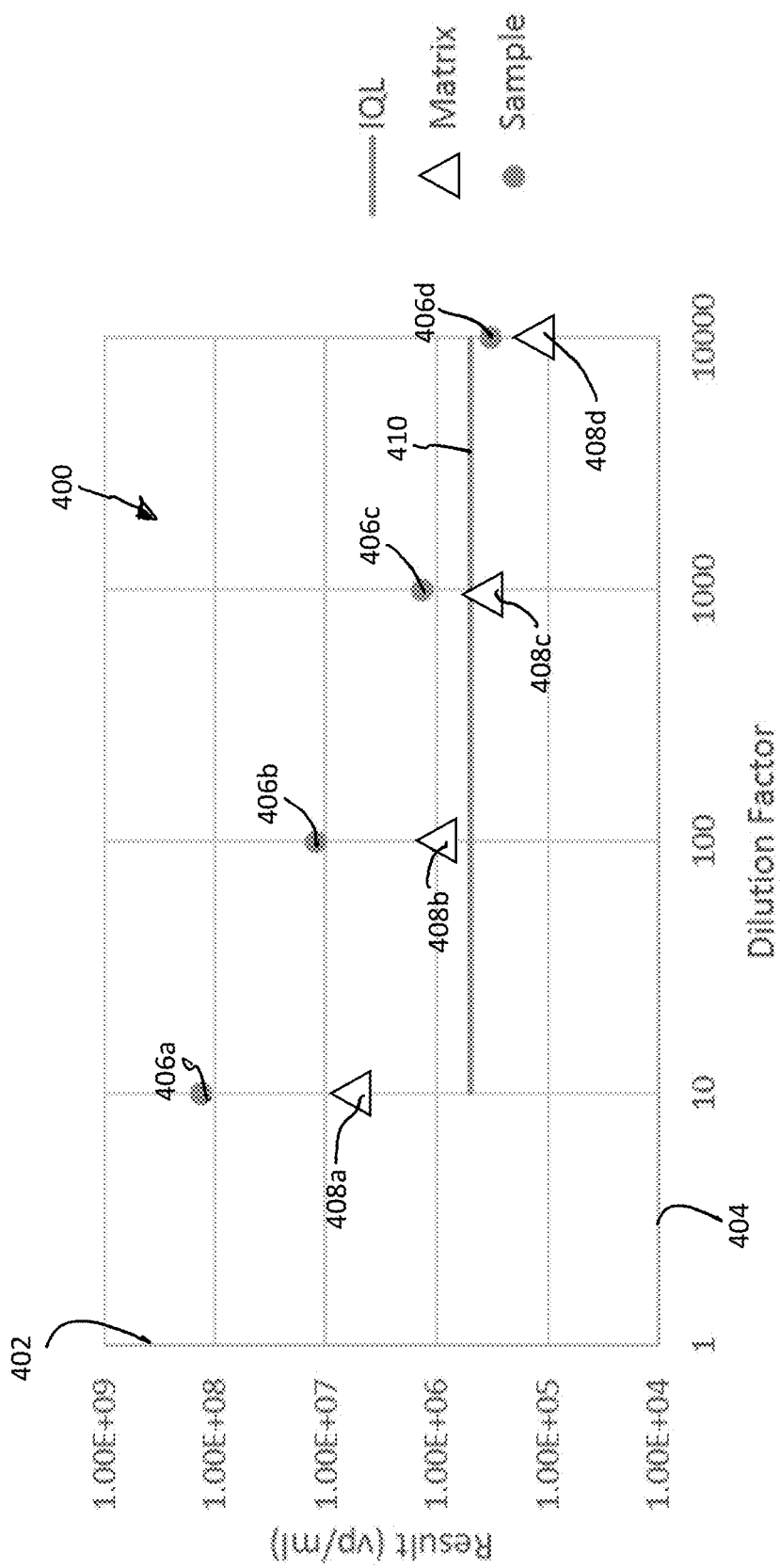
FIGS. 4-8 are plots depicting flow cytometry results presented for analysis to determine a dynamic range of an instrument for processing a target sample fluid stock and to determine an optimized dilution factor range for the same.

FIG. 4 includes a log-log plot 400 of flow cytometry results for a screening target set 406 of screening target fluid samples 406a, 406b, 406c, and 406d. The plot 400 also includes flow cytometry results for a screening control set 408 of screening blank control fluid samples 408a, 408b, 408c, and 408d. The vertical axis of the plot 400 represents a log scale of particle concentration values 402 and the horizontal axis represents a log scale of sample dilution factor values 404. In turn, the target screening set 406 and the screening control set 408 are plotted relative to particle concentration 402 and dilution factor 404.

Also shown in the plot 400 is an instrument qualification limit (IQL) 410. The IQL 410 represents the minimum concentration of particles in a fluid sample for which the flow cytometer 100 provides sufficiently accurate results and may define a lower bound on particle concentrations related to the absolute range of the flow cytometry instrument. Accordingly, any flow cytometry result for a screening target fluid sample 406 that is below the IQL 410 may be disregarded from any analysis due to the fact that the screening target fluid sample 406 is a concentration below the IQL 410 for the given instrument. For example, in FIG. 4 the flow cytometry result for the screening target fluid sample 406d is below the IQL 410 and may therefore be disregarded from any analysis of the flow cytometry data.

As can be appreciated from the plot 400, the particle concentration 402 for each respective fluid sample depicted in the plot 400 reduces with increased dilution factor 404 as expected theoretically. That is, in theory the relationship between particle concentration 402 and dilution factor 404 on a log-log plot should be linear reflecting a commensurate reduction in particle concentration in fluid samples as the samples are increasingly diluted. However, due to instrument limitations and errors, practical flow cytometry results may not abide by the linear relationship of the idealized theoretical scenario. Specifically, fluid samples at high particle concentrations may have underreported particles counts and fluid samples at low particle concentrations may have overreported particle counts, thus resulting in a "flattening" of data at high and low particle concentrations. In turn, the quality of linearity of the flow cytometry results obtained over a plurality of dilution factors may be evaluated as will be described in greater detail below. As will be appreciated, the log-log relationship of FIG. 4 could be equivalently plotted in a transformed linear plot form of logarithm values of particle concentration versus logarithm values of dilution factor.

Figure 5:
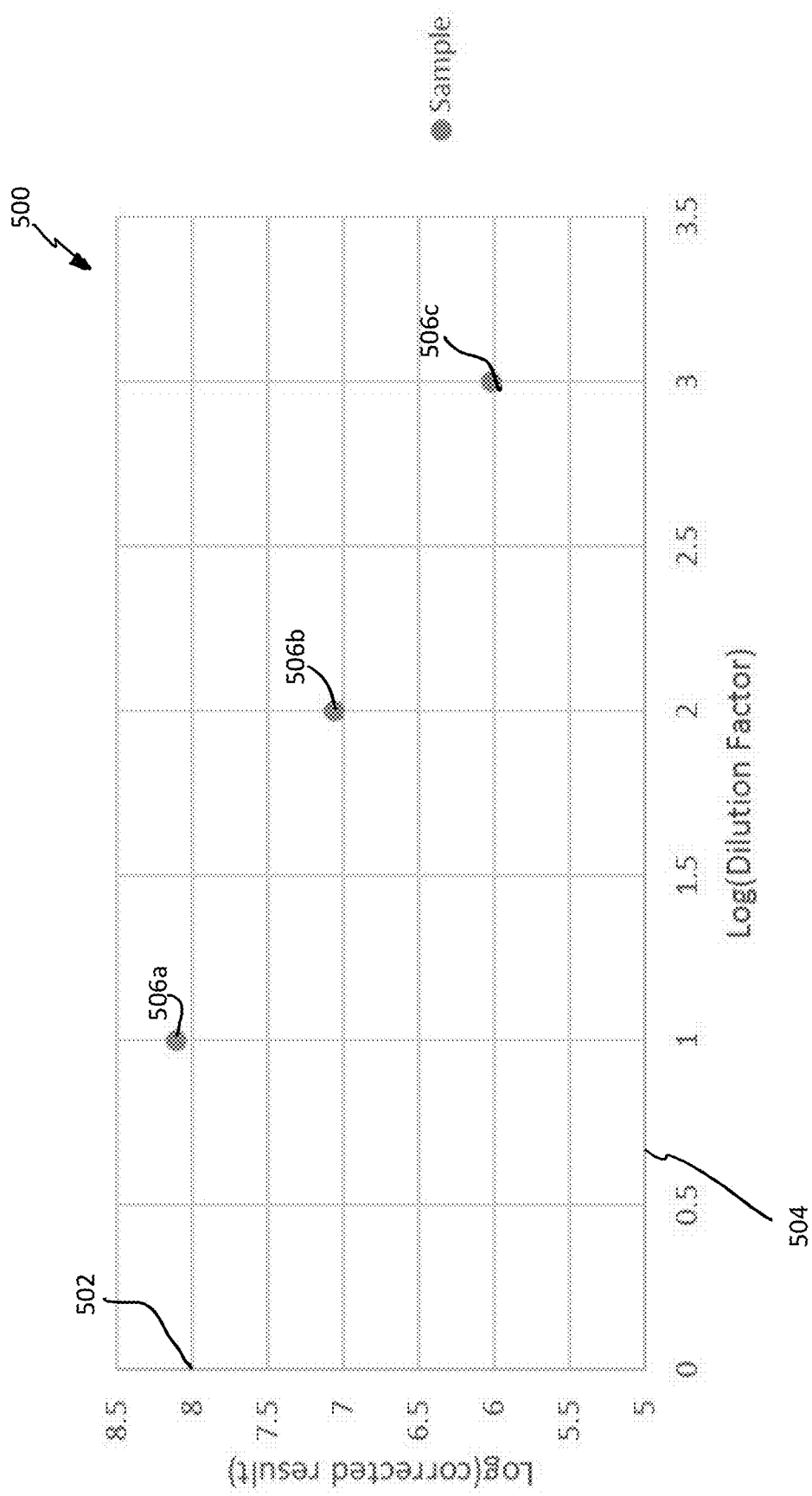

With further reference to FIG. 5, a plot 500 in such a linear transformation form is provided having a vertical axis representative of a linear scale of the logarithm value of particle concentration 502 and a horizontal axis representative of a linear scale of the logarithm value of dilution factor 504. The plot 500 shows a plurality of corrected quantification indications 506 for a plurality of screening target fluid samples. As described above, the corrected quantification indications 506 may correspond to a flow cytometry result for a screening target fluid sample as corrected by a flow cytometry result of a corresponding screening blank control fluid sample. After the corrected quantification indications 506 have been plotted, a fit of the corrected quantification indications 506 may be calculated. The fit may provide a quantitative measure or characterization of the corrected quantification indications 506. For instance, the fit may provide dilution quality parameters that may be analyzed to determine whether the corrected quantification indications 506 represent a sufficiently linear result, thus indicating that the flow cytometry results of the screening target fluid samples were of a concentration that fell within the dynamic range of the flow cytometer 100 in which accuracy is increased.

Figure 6:
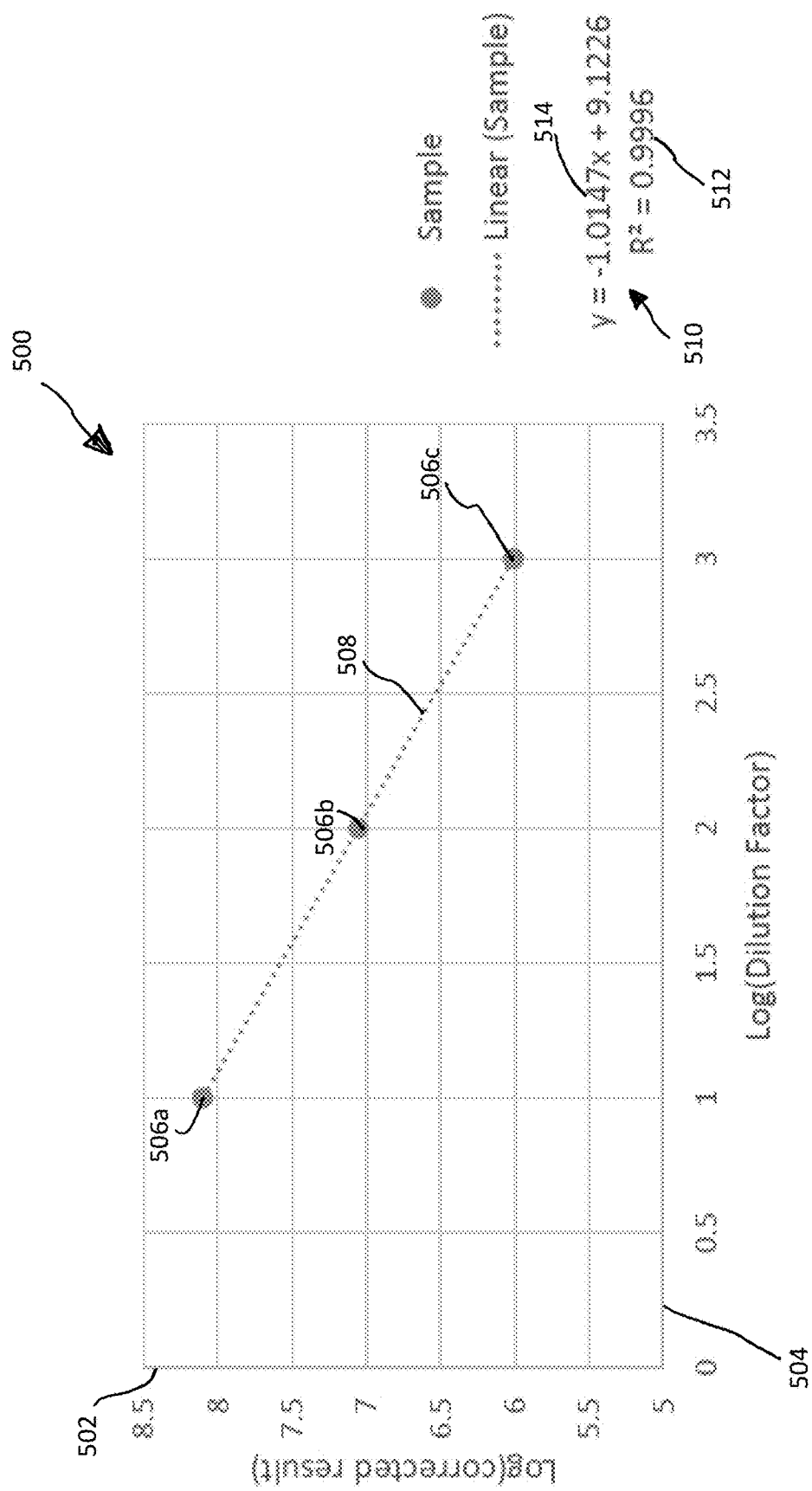

With further reference to FIG. 6, a fit may be calculated for the corrected quantification indications 506. For instance, a linear regression may be calculated based on the corrected quantification indications 506 such that a resulting trendline 508 may be generated. The resulting trendline 508 may provide the quantitative characterization of one or more dilution quality parameters for use in evaluation of whether the corrected quantification indications 506 for which the fit is calculated are within a dynamic range of the flow cytometer 100. That is, the trendline 508 may provide a means for evaluation of the corrected quantification indications 506a, 506b, and 506c to determine whether the corrected quantification indications 506 on the plot 500 demonstrate a level of anticipated behavior corresponding to characteristics of results within a dynamic range of the flow cytometer 100 corresponding to increased accuracy of the flow cytometer 100. One quantitative characterization of the fit that provides a dilution quality parameter may be a slope of the trendline 508 with respect to the such a linear transformation plot as shown for plot 500. In this scenario, idealized performance (i.e., all corrected quantification indications 506 falling in the linear dynamic range of the flow cytometer 100) may be represented as a slope value of −1. Such a linear equation may be in the form of y=mx+b, wherein m is the slope and b is the vertical axis intercept at a logarithm value of zero for the dilution factor. In this regard, a linear equation 510 that characterizes the trendline 508 may be provided on the plot 500, as illustrated in FIG. 6. The linear equation 510 provides a slope value 514 that may be evaluated to determine if the corrected quantification indications 506 fall within a sufficiently linear dynamic range (that is linear in terms of the logarithm values plot 500 of FIG. 5) of the flow cytometer 100. That is, the fit of the corrected quantification indications 506 may be compared to acceptable dilution quality parameters at least in part by comparison of a computed slope value 514 of the trendline 508 relative to the idealized slope value of −1. Specifically, a range of acceptable slope values may be defined or may be definable by a user. Accordingly, a slope value 514 falling within the range of acceptable slope values may indicate an acceptable dilution quality parameter for the corrected quantification indications 506 indicating the corrected quantification indications used to generate the fit fall within the dynamic range of the instrument. However, a calculated slope value 514 that falls outside the range of acceptable slope values may result in a dilution fit notification as described in greater detail below.

Also, a coefficient of determination (or $R^2$ value) 512 for the trendline 508 relative to the plotted points of corrected quantification indications may also be provided. The $R^2$ value 512 may also comprise a dilution quality parameter that may be used to analyze the trendline 508. The $R^2$ value 512 may provide a quantitative characterization of the amount of variance of the corrected quantitative indications 506 relative to the trendline 508. Stated in other words, the $R^2$ value 512 may provide an indication of how well the fit describes the corrected quantitative indications 506. The closer that $R^2$ is to 1, the better the fit of the trendline 508 is to the plotted corrected dilution factors 506. In this regard, the $R^2$ value 512 may also provide a dilution quality parameter that may be used to evaluate acceptability of the fit. That is, a range of acceptable $R^2$ values may be provided. In turn, a computed $R^2$ value 512 falling within the range of acceptable $R^2$ values may indicate acceptable dilution quality parameter for the corrected quantification indications 506 indicating the corrected quantification indications used to generate the fit fall within the dynamic range of the instrument. However, a calculated $R^2$ value 514 that falls outside the range of acceptable $R^2$ values may result in a fit notification as described in greater detail below.

Figure 7:
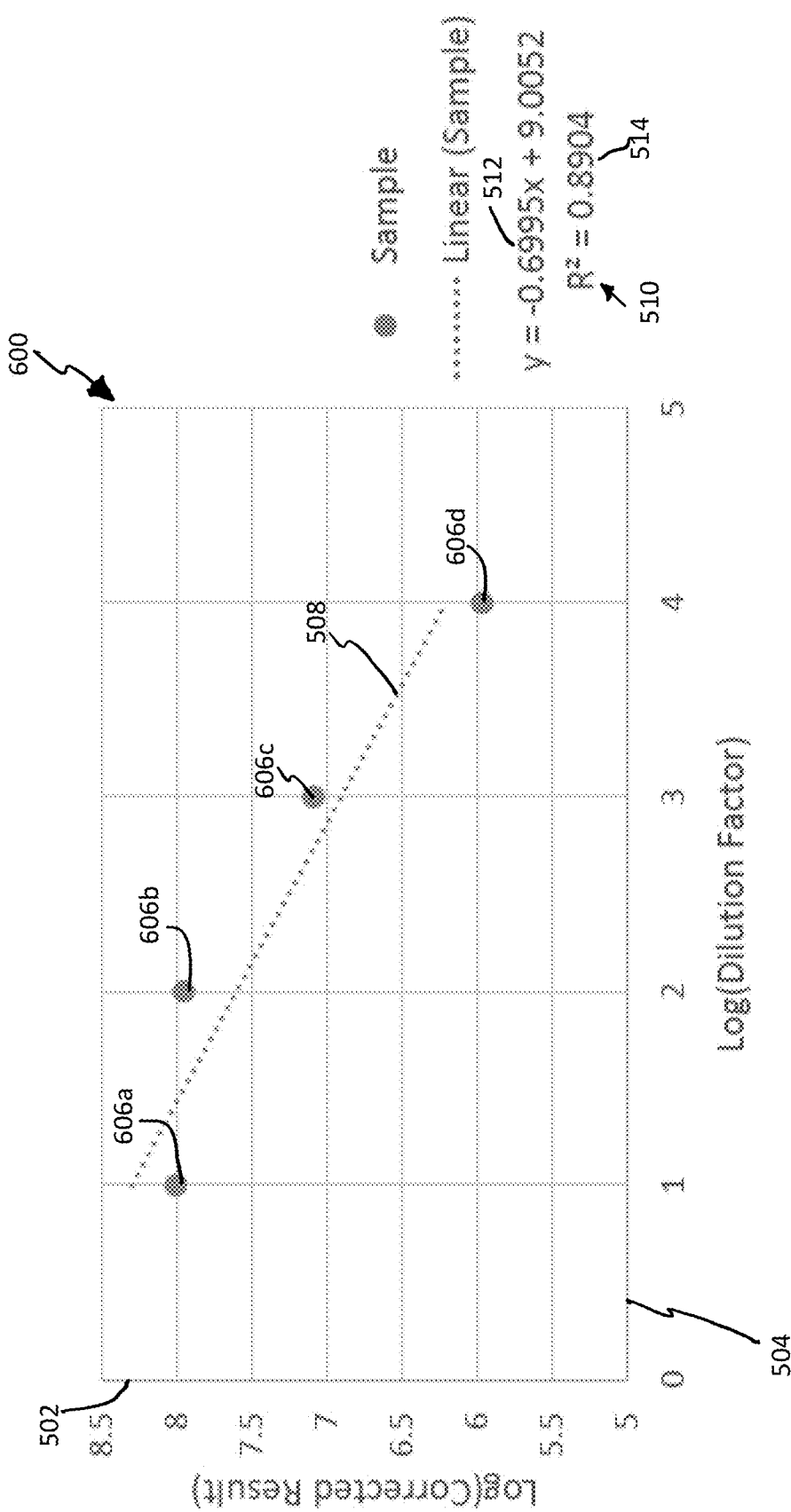

In further relation to evaluation of acceptability of a fit calculated for corrected quantification indications 506, FIG. 7 illustrates a plot 600 of another example set of corrected quantification indications 606a, 606b, 606c, and 606d. Again, trendline 508 has been calculated corresponding to a fit of the corrected quantification indications 606. As may be appreciated, the calculated slope value 514 for the trendline 508 is approximately −0.7, indicating a departure from the idealized value of −1. In the example scenario presented in FIG. 7, this slope value 514 is considered to fall outside the range of acceptable slope values, thus resulting in a fit notification as the dilution quality parameter of the slope is not an acceptable dilution quality parameter for purposes of this example. Furthermore, the $R^2$ value 512 is reduced from the idealized plot 500 in which the $R^2$ value was near an idealized value of 1. Accordingly, the $R^2$ value 512 in this scenario also falls outside the range of acceptable $R^2$ values, such that the $R^2$ value 512 results in a fit notification as well.

In turn, dilution quality parameters for the fit for the corrected quantification indications 606a, 606b, 606c, and 606d that do not have acceptable dilution quality parameters may indicate that at least one of the flow cytometry results corresponding to the corrected quantification indications 600 falls outside of the dynamic range of the flow cytometer 100 such that the results do not demonstrate sufficient linearity. Specifically, the fit of the corrected quantification indications 606 may indicate the accuracy of at least one corresponding flow cytometer result is compromised due to instrument error in the results due to one of the fluid samples being at a concentration outside the dynamic range of the flow cytometer 100 for the fluid sample characteristics under investigation. As may be appreciated, such error is likely to occur for a flow cytometry result (and in turn, a corresponding corrected quantification indication 606) corresponding to the maximum dilution or the minimum dilution in the provided data set as these values are most likely to be at the margin of or outside the dynamic range of the instrument. In the plot 600, this corresponds to corrected quantification indication 606a that represents the minimum dilution of the data set or corrected quantification indication 606d that represents the maximum dilution of the data set. Accordingly, one or both of the corrected quantification indication 606a corresponding to the maximum dilution and/or corrected quantification indication 606d corresponding to a minimum dilution of the data set may be removed from the calculation of the trendline 508 to determine if the resulting dilution quality parameters for the remaining corrected quantification indications 606 correspond to acceptable dilution quality parameters.

Figure 8:
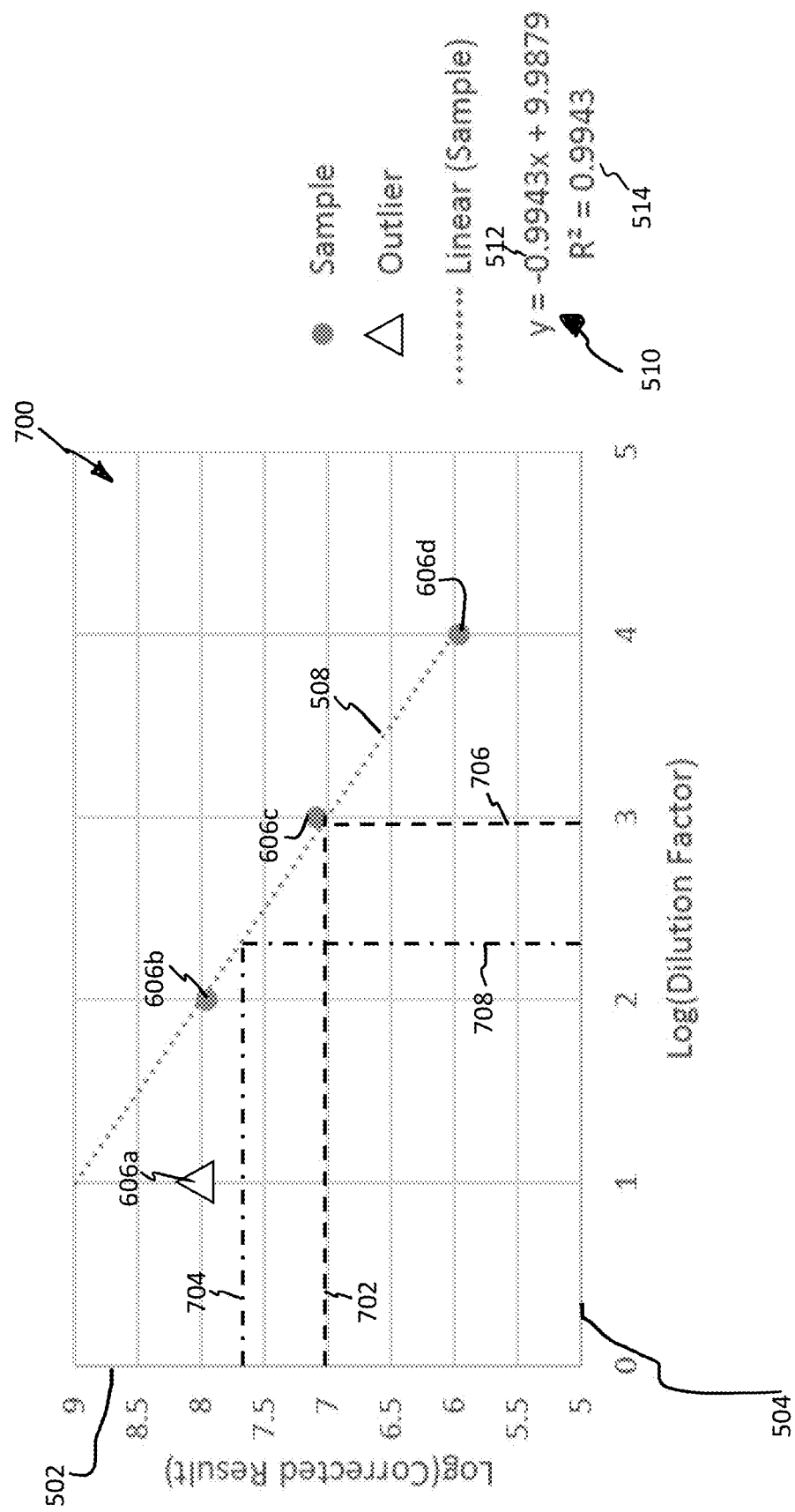

With further reference to FIG. 8, a plot 700 is presented in which corrected quantification indication 606a has been removed from the calculation of the fit (e.g., as an outlier), such that an updated calculation of the trendline 508 is provided. As can be appreciated, after removal of corrected quantification indication 606a, the slope value 514 for the trendline 508 returns to near ideal and the $R^2$ value 512 also increases to near ideal. In this scenario, both the slope value 514 and the $R^2$ value 512 may correspond to acceptable dilution quality parameters such that the fit for the remaining corrected quantification indications 606b, 606c, and 606d may be confirmed (or validated for data analysis purposes) as representing a sufficiently linear result indicative that the corrected quantification indications are acceptably within the dynamic range of the flow cytometry instrument.

While the foregoing contemplates evaluation of corrected quantification indications 606 to determine whether the corrected quantification indications 606 are within the dynamic range of an instrument, determination of an optimized dilution range for a given screening sample stock may relate to a further isolation of a range of concentrations in which the flow cytometer 100 demonstrates further accuracy. That is, a flow cytometer may demonstrate an absolute range over which results may be generated, which may not result in a linear relationship of the flow cytometry results across the entirety of the absolute range (i.e., there may be error for samples in the absolute range at high and/or low dilutions). The flow cytometer may also have a dynamic range for a given sample set in which the results (or corrected results) demonstrate sufficient linearity so as to fall in the dynamic range of the instrument as determined above. Further still, a flow cytometer may generally provide more accurate results within an optimal performance band defined relative to the concentration of particles in a fluid sample being investigated. Such an optimal performance band may represent a higher performance sub-range within the dynamic range. In view of the extreme sensitivity of flow cytometers, performing flow cytometry investigations fluid samples having a concentration within the optimal performance band may provide further enhanced accurate and precise results for a given flow cytometer investigating a given target sample stock.

As such, with returned reference to FIG. 8, the trendline 508 for the corrected quantification indications 606 in which the trendline 508 reflects sufficient linearity in the data such that the corrected quantification indications 606 are within the dynamic range of the instrument may be further used to determine an optimized dilution factor range for the screening sample stock. Specifically, a lower performance concentration bound 702 and an upper performance concentration bound 704 may be defined for a flow cytometer 100 as reflected in the plot 700. The lower performance concentration bound 702 and the upper performance concentration bound 704 may be determined empirically for a given flow cytometer 100 or may be definable by a user. In any regard, the lower performance concentration bound 702 and the upper performance concentration bound 704 may define a concentration sub-range within the dynamic range over which the performance the flow cytometer 100 demonstrates heightened accuracy. In turn, the lower performance concentration bound 702 may be used to determine the point at which the trendline 508 for data in the dynamic range of the instrument corresponds to the lower performance concentration bound 702. The dilution factor at which the lower performance concentration bound 702 intersects the trendline 508 for data in the dynamic range of the instrument may define an upper optimized dilution factor bound 706 of an optimized dilution factor range. Likewise, a dilution factor in which the upper performance concentration bound 704 intersects the trendline 508 may define a lower optimized dilution factor bound 708 of the optimized dilution factor range. As such, the optimized dilution factor range may correspond to the range between the lower optimized dilution factor bound 708 and the upper optimized dilution factor bound 706 as determined by analysis of the upper performance concentration bound 704 and the low performance concentration bound 702 in relation to the trendline 508 for data determined to be in the dynamic range of the instrument.

In turn, and with reference also to FIG. 3, the foregoing analysis may be utilized to determine an optimized dilution factor range for a given screening sample fluid stock 390. Such analysis may be performed by the screening assay module 360 of the flow cytometry system 300 in conjunction with the graphical user interface screens depicted in FIGS. 9-16. The graphical user interface 380 may include a number of screens that may be presented to a user generally in relation to: selection of flow cytometry results or use by the screening assay module 360 for screening analysis or use by the titer assay module 370 for titer analysis in a result listing screen 800 show in FIGS. 9-10; control and interaction with the screening assay module 360 in relation to the screening analysis in a screening assay screen 900 shown in FIGS. 11-14; and control and interaction with the titer assay module 370 in relation to the titer analysis in a titer assay screen 1000 shown in FIGS. 15-16. Additionally, each screen of the graphical user interface 380 may display a screen selection portion 820. The screen selection portion 820 may provide tabs corresponding to different respective screens that may be utilized to select a given screen of the graphical user interface 380. In this regard, the screen selection bar 820 may include an analysis tab 822, a results tab 824, a screening tab 826, and a titer tab 828. The analysis tab 822 may be manipulated by the user in connection with operation of the flow cytometer during a flow cytometry investigation to monitor operations of the flow cytometer 100 and will not be discussed in detail herein. The graphical user interface 380 may also include an instrument control panel 810 that may include various interfaces for use in controlling the operation of the flow cytometer 100.

Figure 9:
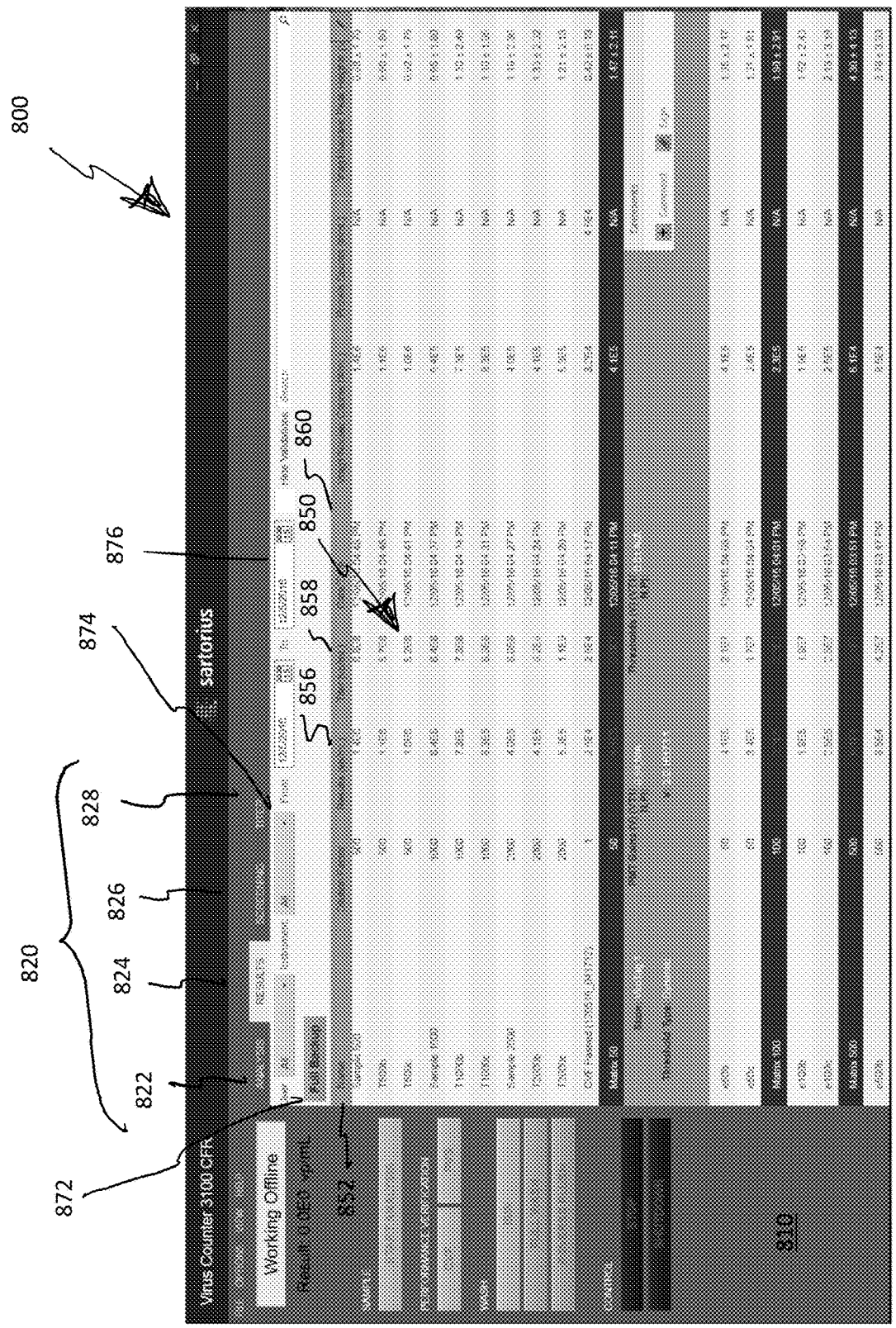
FIG. 9 is an embodiment of a screen of a graphical user interface that provides a results listing corresponding to flow cytometry results.

FIG. 9 depicts a result listing screen 800 of the graphical user interface 380. The results listing screen 800 may include a results listing 850 that includes a listing of flow cytometry results from the flow cytometry results database 310. As described above, a screening target fluid sample 392 may be prepared at each of multiple dilutions of the screening sample fluid stock 390. In addition, dyes or stains may be added to each screening target fluid sample 392 that may be use in detection of target particles having particular particle attributes. In an embodiment, the plurality of screening target fluid samples 392 may comprise a dilution series of the screening sample fluid stock 390 that is diluted to a plurality of dilution factors (e.g., a plurality of different dilution factors). In an embodiment, the dilution series may include a ten-fold dilution series of the screening sample fluid stock 390 such that a screening target fluid sample 392 is provided at dilutions increasing at a factor of ten (e.g., 10:1, 100:1, 1,000:1, etc.). In at least one embodiment, a single screening target fluid sample 392 may be prepared for each of the plurality of dilution factors. That is, in at least one embodiment multiple replicates of a screening target fluid sample 392 at a given dilution may not be required to be subjected to flow cytometry investigation, thus reducing the number of fluid samples required to be investigated and providing the noted benefits discussed above. The flow cytometry results for the plurality of screening target fluid samples 392 may be provided to and saved in the flow cytometer results database 310 such that they are reflected in the results listing 850. As can be appreciated in FIG. 9, selection of a given result from the results listing 850 may expand the given result to provide additional information and/or options for the given result. For instance, an option may be provided to allow a user to comment on the result or provide an electronic signature.

In addition, one or more screening blank control fluid samples 398 may be prepared and subjected to flow cytometry investigation using the flow cytometer 100. The one or more screening blank control fluid samples 398 may include one or more fluid samples that correspond to the plurality of screening target fluid samples 392. As such, the one or more screening blank control fluid samples 398 may have properties similar to the plurality of screening target fluid samples but may be substantially or wholly free of the target particles of interest to be investigated. A flow cytometry results generated for the screening blank control fluid sample 398 may reflect background noise detected by the flow cytometer 100 rather than actual particle counts such that the screening blank control fluid sample 398 may be used to prepare corrected quantification indications as described above. In an embodiment, the one or more screening blank control fluid samples 398 may be blank sample matrix of the same type of the plurality of screening target fluid samples 392 in the absence of the target particle of interest being investigated the flow cytometry investigation, but otherwise having similar properties and preparation such as inclusion of the dye or stain used in the flow cytometry investigation. A plurality of screening blank control fluid samples 398 may be provided at corresponding dilutions to each of the multiple dilutions provided in the plurality of screen target fluid samples 392. In this regard, the correspondence between the plurality of screening target fluid samples 392 and screening blank control fluid samples 398 may relate to common dilutions of each sample. In another embodiment, the one or more screening blank control fluid samples 398 may include solution buffer and/or other reagent fluids in place of blank sample stock matrix fluid (e.g., in the event that blank stock sample matrix fluid is unavailable). In this regard, corresponding dilutions may not be provided and a single screening blank control fluid sample 398 may be subjected to flow cytometry investigation to determine the background noise associated with the solution buffer and/or any dyes or stains utilized in the testing. Upon flow cytometry investigation of the one or more screening blank control fluid samples 398, the flow cytometer results for the screening blank control fluid samples 398 may be provided to the flow cytometer results database 310 and may be reflected in the results listing 850.

The results listing 850 may include a number of data columns related to data parameters of the flow cytometry results provided as row entries in the results listing 850. For instance, the columns may reflect any of the information for a flow cytometry result included in the flow cytometry results database as described above, including but not limited to, a sample name column 852, a dilution factor column 854, a particle count result column 856, a titer result column 858 (showing particle concentration), an acquisition date/time column 860, an instrument identifier column (not shown), an operator column (not shown), and other data columns that may relate to the flow cytometry investigation such as individual detection channel counts and radiation detection data such as detector baseline, peaks, and widths. The results listing 850 may be sortable according to any one of the columns presented in the results listing 850. Furthermore, additional sort functionality may be provided by way of a user sort option 872, an instrument sort option 874, or a date sort option 876. Further still, options to hide certain types of flow cytometry results may be provided.

Figure 10:
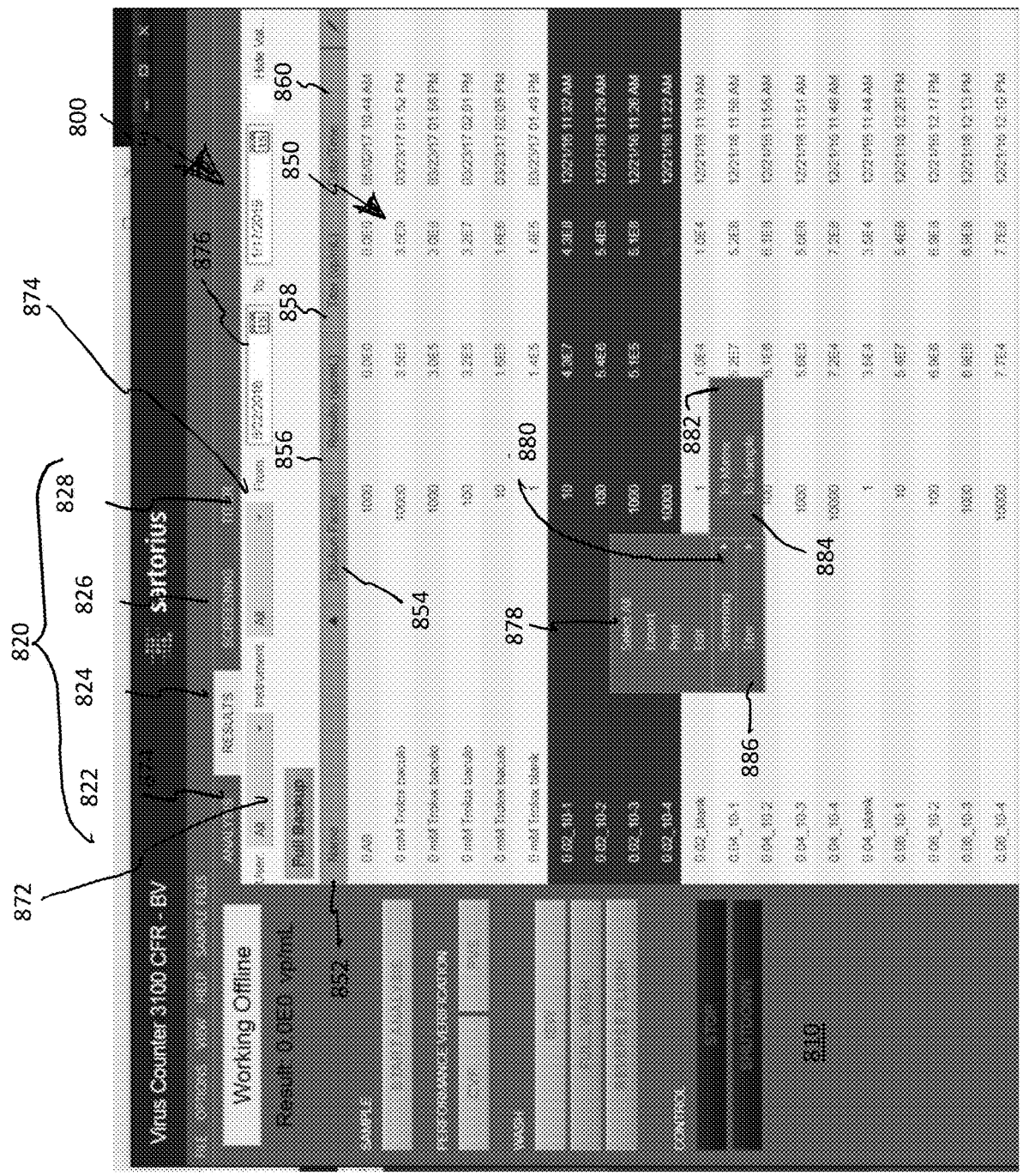
FIG. 10 is an embodiment of a screen of a graphical user interface for use in selection of flow cytometry results for data processing.

With further reference to FIG. 10, a user may select flow cytometry results from the results listing 850 for designation of specific flow cytometry results for utilization in either screening analysis performed by the screening assay module 360 or titer analysis performed by the titer assay module 370. In relation to selection of flow cytometry results for use by the screening assay module 360, a user may select one or more flow cytometry result entries from the results listing 850 by navigation to a results designation menu 878 that includes a screening selection submenu 880 that allows for selection of a screening control set selection 882 or a screening target set selection 884. That is, results selected from the results listing 850 may be selected by the user as belonging to a screening control set by selection of the flow cytometry results and selection of the screening control set selection 882. Similarly, results selected from the results listing 850 may be selected by the user as belonging to a screening target set by selection of the flow cytometry results and selection of the screening target set selection 884.

Figure 11:
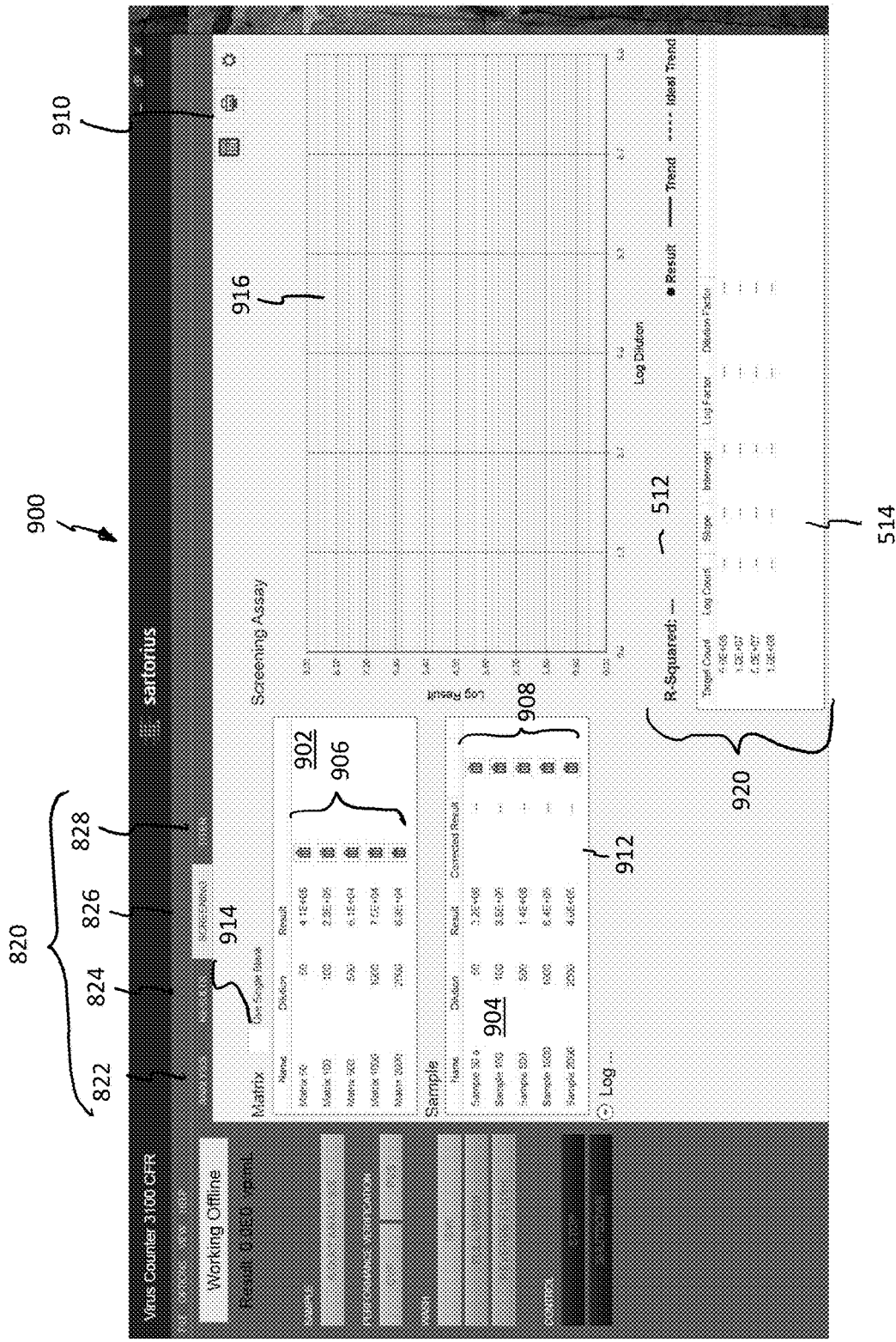
FIG. 11 is an embodiment of a screen of a graphical user interface for control and interaction of a screening assay module to determine an optimized dilution factor range.

With further reference to FIG. 11, a screening assay screen 900 is depicted that may be presented to the user upon selection of the screening tab 826 from the screen selection bar 820. The screening assay screen 900 may include a screening control set listing 902 that is populated with the screening control set 906 as selected by the user using the screening control set selection 884. The screening assay screen 900 may further include a screening target set listing 904 that is populated with flow cytometry results comprising the screening target set 908 as selected using the target screening set selection 884 from the results listing 850 in the results screen 800.

Figure 12:
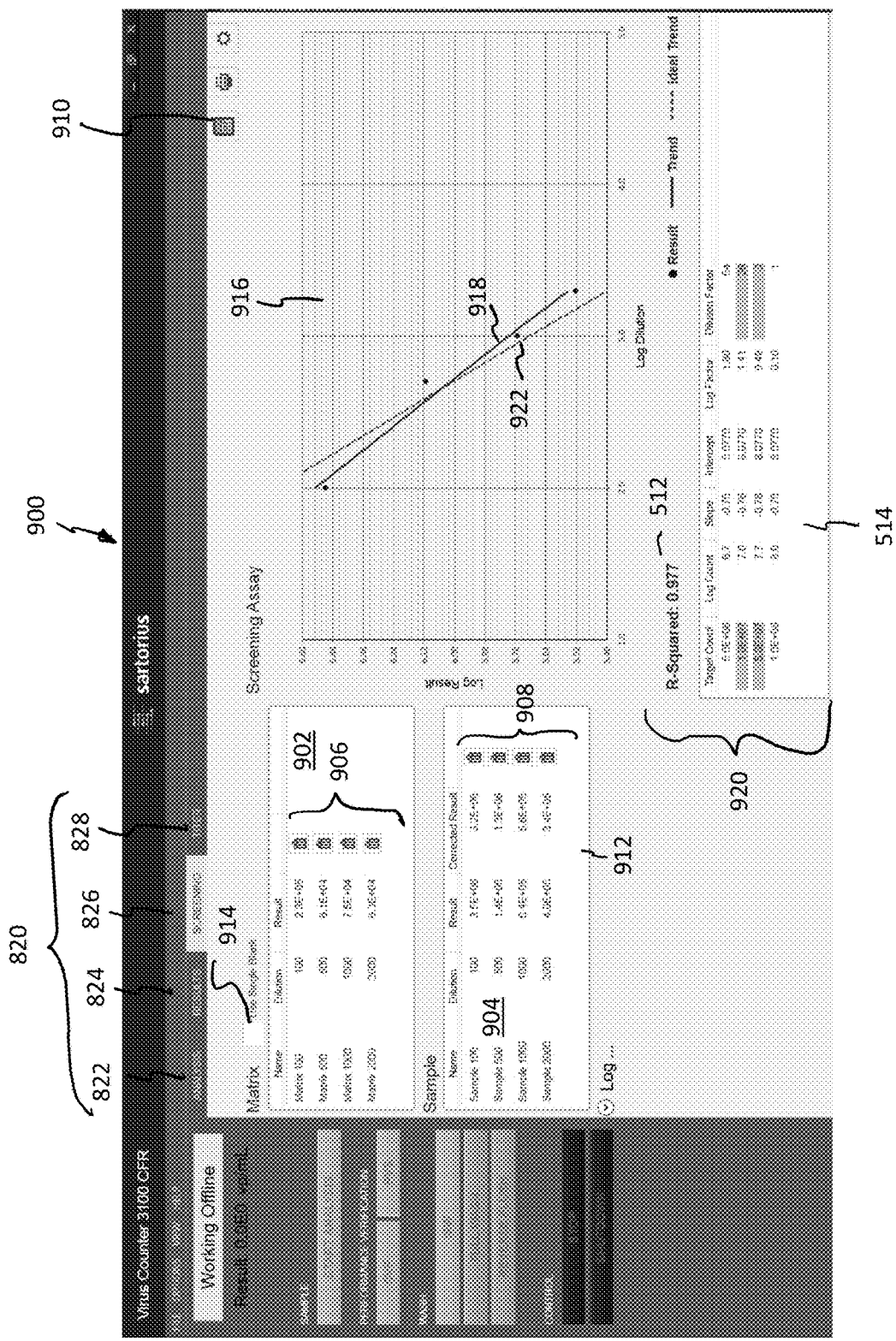
FIG. 12 is an embodiment of the screen of FIG. 11 in which a determination of the optimized dilution factor range has been determined and is displayed to a user.

Upon selection of the screening control set 906 and the screening target set 908, one or more determinations or calculations described above in relation to determination of the dynamic range for the instrument relative to the selected screen target set 908 may be performed using the screening control set 906 and the screening target set 908. Such calculations may be performed automatically upon population of the screening target set 904 and screening control set 906 or may require the user to initiate calculations by selection of calculation button 910. In this regard, FIG. 11 depicts an example of the screening assay screen 900 in which the screening control set 906 and the screening target set 908 have been selected, but calculations of the optimized dilution factor range have not yet been calculated. With further reference to FIG. 12, a screening assay screen 900 in which the optimized dilution factor range calculations have been performed (e.g., automatically or by selection of the calculation button 910) is depicted. The selection of automatic calculation or user-initiated calculation may be configured in a settings menu of the graphical user interface 380.

With continued reference to FIG. 12, in connection with the calculations and analysis described above to determine the optimal dilution factor range, the screening assay screen 900 may also include a plot area 916 in which corrected quantification indications based on the screening target set 908 and the screening control set 906 are displayed to the user. That is, the screening assay module 360 may be operative to calculate a corrected quantification indication of particles for each of the screening target fluid samples of the screening target set 908 based on corresponding ones of the screening control set 906. The corrected quantification indication may also be displayed for each one of the screening target set 908 in a corrected quantification of particles column 912 in the screen target set listing 904.

Figure 13:
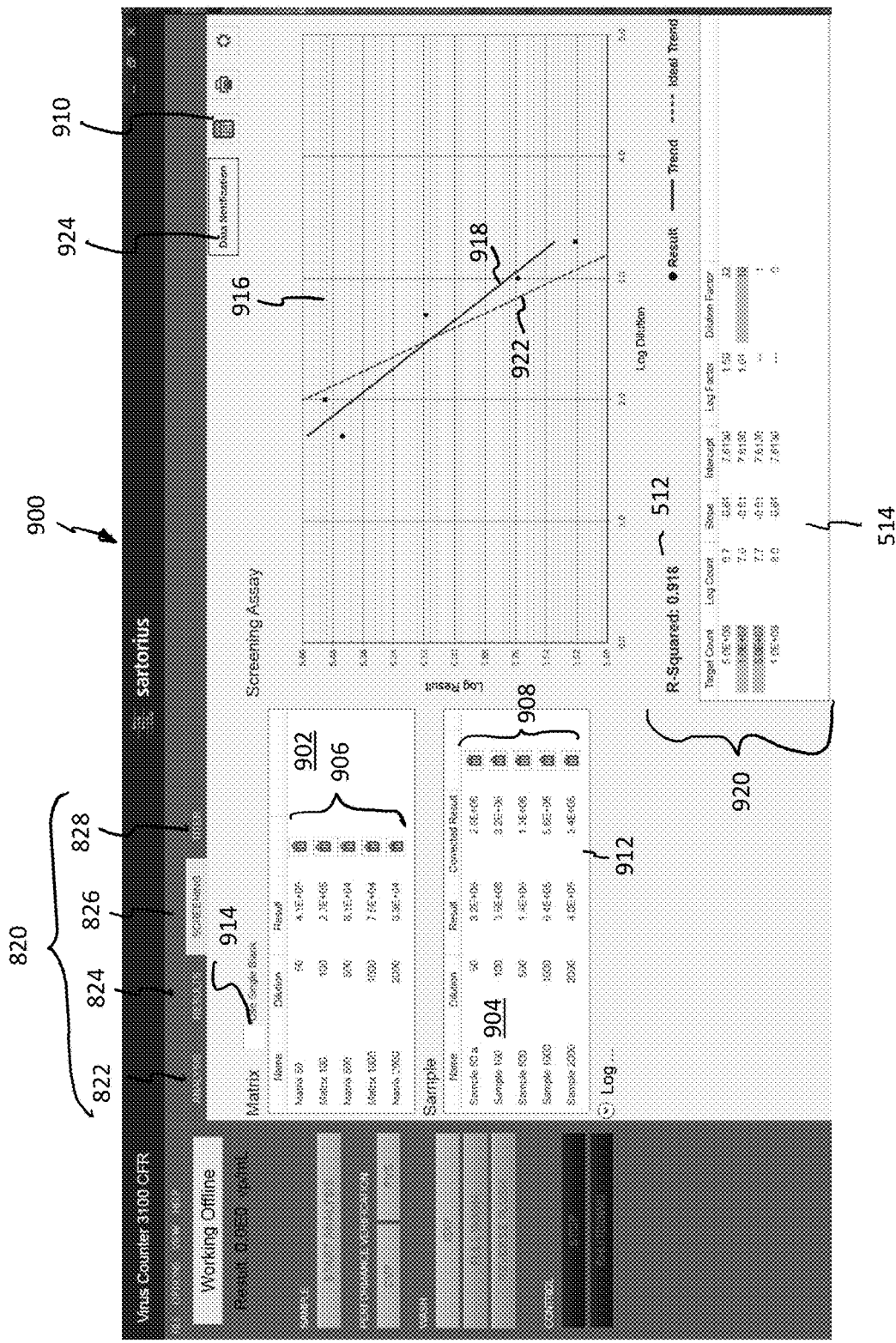
FIG. 13 is an embodiment of the screen of FIG. 11 in which a determination of the optimized dilution factor range has been determined and is displayed to a user, and in which a data notification indication is present.
Figure 14:
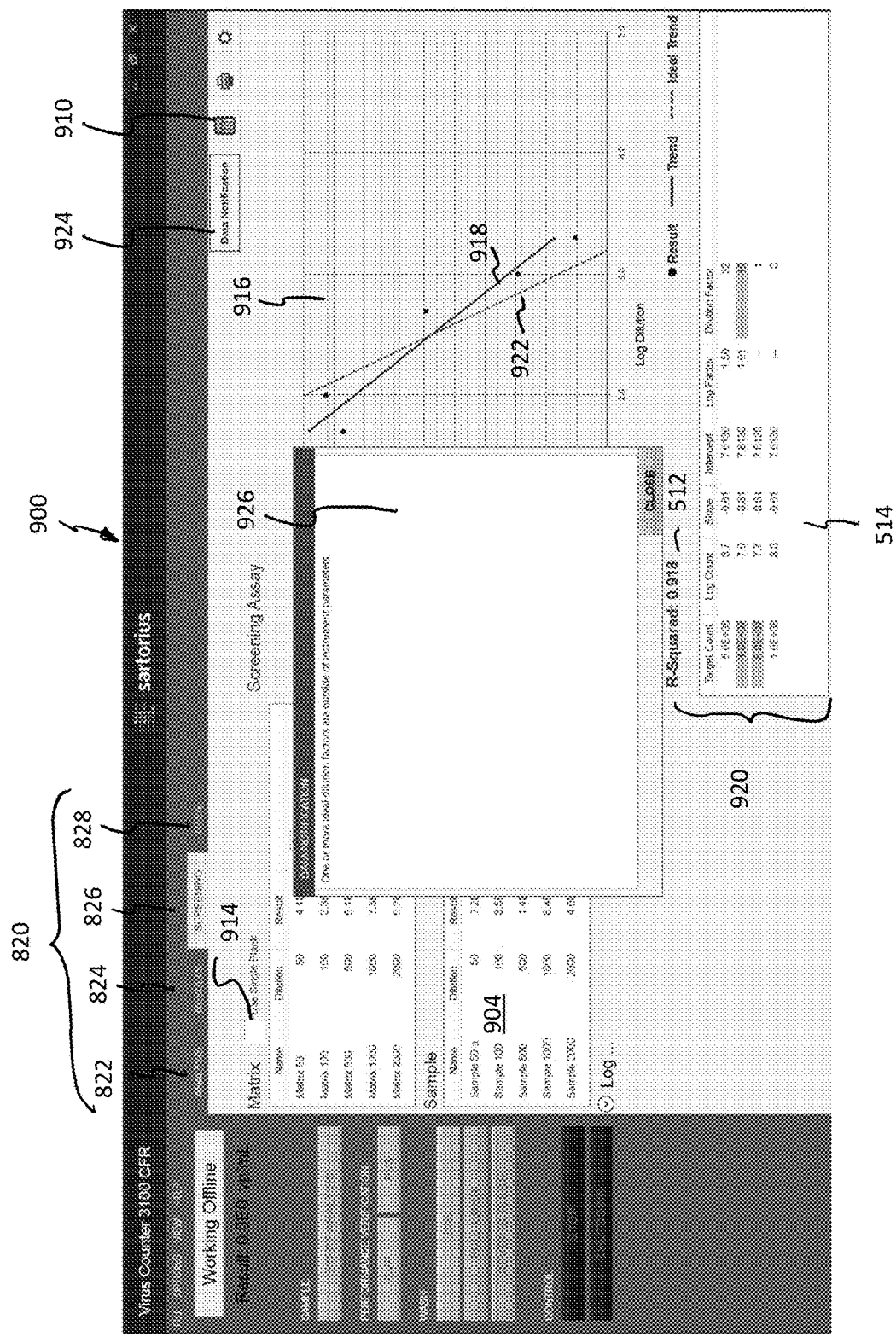
FIG. 14 is an embodiment of a screen showing a data notification detailed listing in relation to the data notification indication presented in FIG. 13.

In addition, the screening assay module 360 may determine whether the selected screening control set 906 includes corresponding results to the screening target set 908. That is, the screening assay module 360 may check that a control sample is provided at a dilution corresponding to each dilution of the target fluid samples of the screen target set 908. If there is no correspondence (e.g. a screening control fluid sample is selected for which there is no corresponding screening target fluid sample or a screening target fluid samples selected for which there is no screening control fluid sample) a correspondence notification may be generated by the screening assay module 360, which may trigger a data notification indicator 924 to be displayed as shown in FIG. 13. That is, the data notification indicator 924 may be provided in the case of any data notification being present in relation to the operation of the screening assay module 360. In turn, selection of the data notification indicator 924 may result in display of a data notification detailed listing 926 as shown in FIG. 14. The data notification detailed listing 926 may include a detailed listing of all data notifications present, such as the correspondence notification discussed above or any further data notifications described in the following description. The correspondence notification may be provided as a cautionary notification or warning provided to the user indicating the lack of correspondence. This may allow the user to address the lack of correspondence by review and/or revision of the selected screening control set 906 and/or screening target set 908. For instance, one of either a screening control fluid sample in the screening control set 906 or a screen target fluid sample in the screening target set 908 may be highlighted (e.g., by an offset background color or change in font color, size, or other formatting) in the screening control set listing 902 or target set listing 904 indicating that no corresponding result is provided. The data notification may be informational or may require action on the part of the user address the issue causing the notification prior to determination of an optimal dilution factor range. For example, the user may be required to return to the results listing 850 and select an appropriate corresponding value that is missing. In the event that the correspondence notification may be cautionary, a user may also elect to proceed without addressing the issue causing the notification. Alternatively, the correspondence notification may result in a fault in the screening assay module 360 that precludes further calculation of the optimized dilution factor range until and unless the condition creating the correspondence notification is resolved by the user.

In certain embodiments as described above, one or more screening blank control fluid samples may be made using sample dilution buffer and/or other reagent liquids and not using sample stock matrix. In this case, direct correspondence between the screening control set 906 and the screening target set 908 may not be needed as the screening blank control fluid sample may not have a corresponding dilution to the plurality of screening target fluid samples. In this regard, a control correspondence override selection 914 may be selected by the user that would override any correspondence notification and cause the screening assay module 360 to utilize the given control sample results from the screening control set 908 for use in correction of each of the plurality of screening target fluid samples of the screen target set 908.

The screening assay module 360 may also calculate corrected quantification indications 912 for each of the screening target set 908. This may include subtraction of the flow cytometry results of the screening control set 906 from corresponding ones of the screening target set 908. In turn, the screening assay module 360 may determine if any resulting corrected quantification indication 912 is negative and may provide a corrected quantification indication notification in the event any negative corrected quantification indications 912 are calculated. For instance, the corrected quantification indication notification may result in a data notification indication 924. Details of the corrected quantification indication notification may also be provided in the data notification detailed listing 926 if present. The corrected quantification indication notification may be a cautionary notification in which an indication of the notification is presented to the user for informational purposes or may result in a fault that precludes further processing by the screening assay module 360. Further still, a negative corrected quantification indication 912 may be highlighted in the target set listing 904 by way of highlighted values and/or values provided in a particular text color, size, format, or the like.

Once the corrected quantification indications 912 have been calculated for each of the screening target set 908, the corrected quantification indications 912 may be plotted in the plot area 916. Also, a trendline 918 corresponding to a linear regression fit of the corrected quantification indications 912 may be displayed. An optimized dilution factor range display 920 may be provided that reflects the slope 514 of the trendline 918 as described above in relation to the analysis to determine an optimized dilution factor range. Furthermore, an $R^2$ value 512 may also be provided in the optimized dilution factor range display 920. A user may be prompted to review the plot area 916 and/or optimized dilution factor range display 920 to verify the dilution quality parameters or other values displayed therein. This may include the user being prompted to check the slope value 514 or the $R^2$ value 512 to determine whether the resulting fit of the corrected quantification indications is within an acceptable range. The acceptable range may be displayed in the optimized dilution factor range display 920 or the values for the optimized dilution factor range themselves may be highlighted or otherwise indicated as being acceptable or unacceptable for a given acceptable range that is defined for the dilution quality parameters of the fit. For instance, the values for the optimized dilution factor range displayed in the optimized dilution factor range display 920 may be highlighted in a particular color to designate whether the value us acceptable or unacceptable. For example, the values may be highlighted in green for acceptable values or may be highlighted in red for unacceptable values. Additionally or alternatively, text color may be used as an indication of acceptable or unacceptable values in any of the screens described herein. The screening assay module 360 may define or allow the user to define (e.g., via an input of the graphical user interface 380) a definition of an acceptable range for the dilution quality parameters (e.g., an acceptable range for the slope and/or an acceptable range for the $R^2$ value). Alternatively or additionally, a trendline 918 may not be generated within the plot area 916 if the dilution quality parameters for the corrected quantification indications 912 are not within a corresponding acceptable range. Moreover, if the dilution quality parameters are not within the acceptable range, a fit notification may be presented to the user. The fit notification may include a display to the user such as highlighting or other indication that a dilution quality parameter is out of an acceptable range. The fit notification may also result in a data notification indicator 924 and a listing of the fit notification in the data notification detailed listing 926. In this regard, the fit notification may be a cautionary notification that allows the user to override the notification and continue to calculate the optimized dilution range. Alternatively, an optional dilution range may not be displayed until and unless dilution quality parameters are determined to be within an acceptable range (e.g., by deletion of one or more of the corrected quantification indications 912 from use in the calculation of the trendline 918). Also, an idealized trendline 922 may be provided in the plot area 916 to help assist a user in review of the trendline 918.

Once the trendline 918 has been confirmed as being reflective of the dynamic range of the instrument, the optimized dilution factor range may be presented to the user in the optimized dilution factor range display 920. As described above, the optimized dilution factor range may extend between a lower dilution factor bound corresponding to the upper performance concentration bound and an upper dilution factor bound corresponding to the lower performance concentration bound. The upper performance concentration bound and the lower performance concentration bound may be provided in the optimized dilution factor range display 920 along with a corresponding dilution factor listed in relation thereto. Alternatively, a rounded dilution factor comprising a convenient dilution for a user may be presented in the optimized dilution factor range display 920. That is, the lower dilution factor bound and the upper dilution factor bound of an optimized dilution factor range may correspond to dilution factors that are relatively inconvenient to prepare. As such, the screening assay module 360 may select one or more convenient dilution factors within the dilution factor range for presentation to the user for use as an optimized dilution factor. This may include rounded dilution factors within the optimized dilution factor range. As an example, if the optimized dilution factor range is between 88 and 242, rounded dilution factors of 100 or 200 may be suggested to the user as convenient dilution factors that allow for easier optimized target fluid sample preparation. In this regard, the optimized dilution factor range need not span between an upper and lower bound, but could be provided as a single dilution factor value as described above.

Once the optimized dilution factor range has been presented to the user, a titer analysis may be performed using the titer assay module 370. This may include preparation of optimized target fluid samples 396 having a dilution within the target dilution range as determined by the screening assay module 360. In this regard, the optimized target fluid samples 396 may have a dilution factor the falls within the optimized dilution factor range. In an embodiment, the screening assay module 360 may present instructions to a user in relation to preparation of the optimized target fluid samples 396 such that the optimized target fluid samples 396 fall within the optimized dilution factor range. In any regard, the optimized target fluid samples 396 may be subjected flow cytometry investigation by the flow cytometry 100 and the flow cytometry results for the optimized target fluid samples 396 may be provided to the flow cytometry results database 310. In addition, one or more optimized blank control fluid samples 399 may also be prepared and subjected flow cytometry investigation. The optimized blank control fluid samples 399 may be similar to the screening blank control fluid samples may be made using blank fluid matrix of the corresponding sample stock and in the absence of the target particles at a corresponding dilution factor as used for the optimized target fluid samples (e.g., at a dilution within the optimized target dilution range). An optimized blank control fluid sample 399 may be made not using corresponding sample stock fluid matrix and may alternatively include sample dilution buffer and/or other reagent liquids instead and with corresponding dyes or stain provided therewith to provide a blank control fluid sample in relation to the optimized target fluid samples 396.

In turn, the user may use the results screen 800 as shown in FIG. 10 by selection of the results tab 824 to select an optimized target set and an optimized control set from the results listing 850. A titer selection submenu 886 of the results designation menu 878 may be used for designating flow cytometry results from the results listing 850 as either members of an optimized target set of optimized target fluid samples or members of an optimized control set comprising one or more optimized blank control fluid samples in a similar manner as discussed above in relation to selection of the screening target set and the screening control set for the screening assay module 360 operation. That is, the titer selection submenu 886 may also have an optimized control set selection and an optimized target set selection in the titer selection submenu 886 that may be used to designate an optimized control set and an optimized target set, respectively, from the results listing 850.

Figure 15:
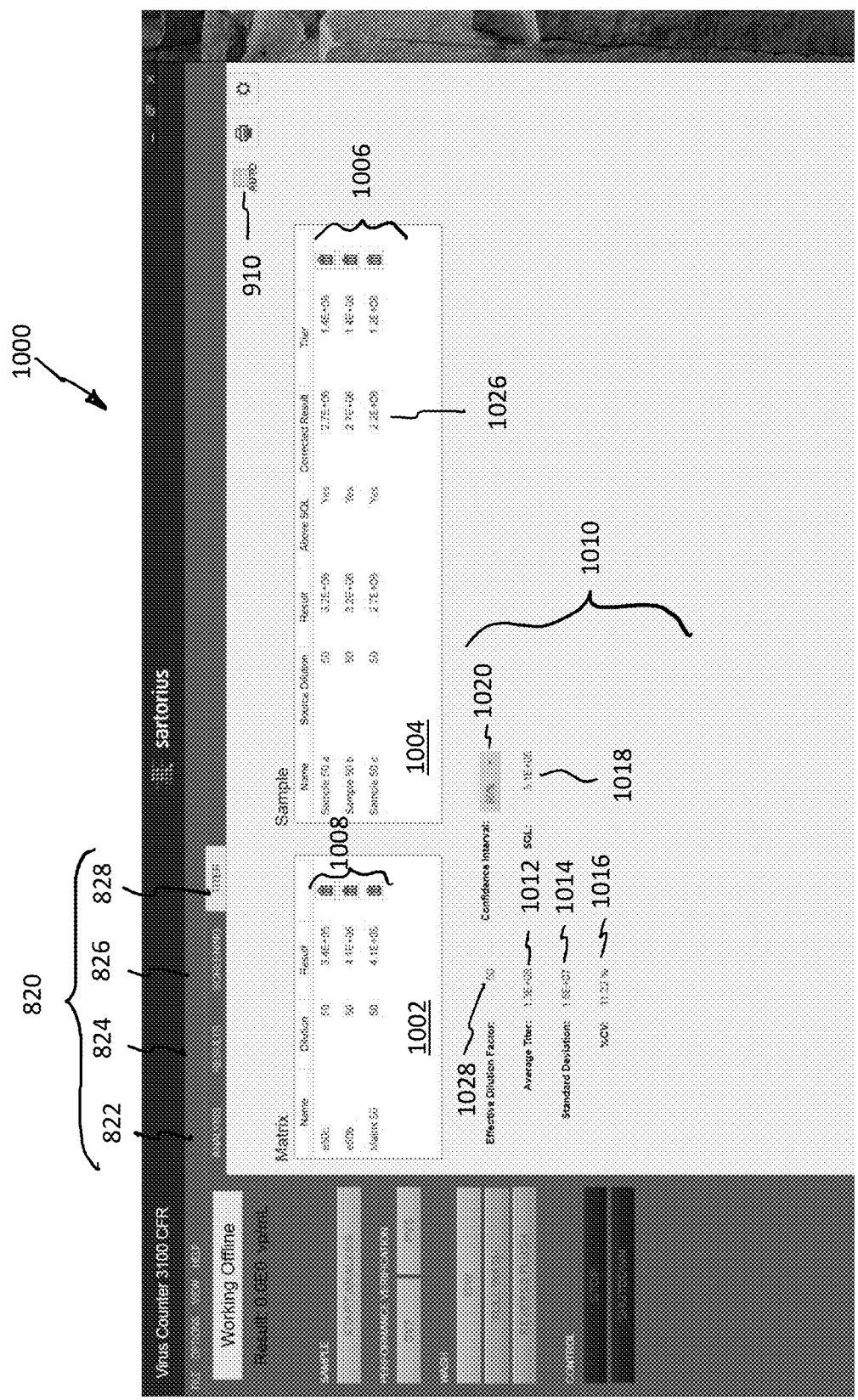
FIG. 15 is an embodiment of a screen of a graphical user interface for control and interaction of a titer assay module to determine particle titer results for optimized target fluid samples in the optimized dilution factor range.
Figure 16:
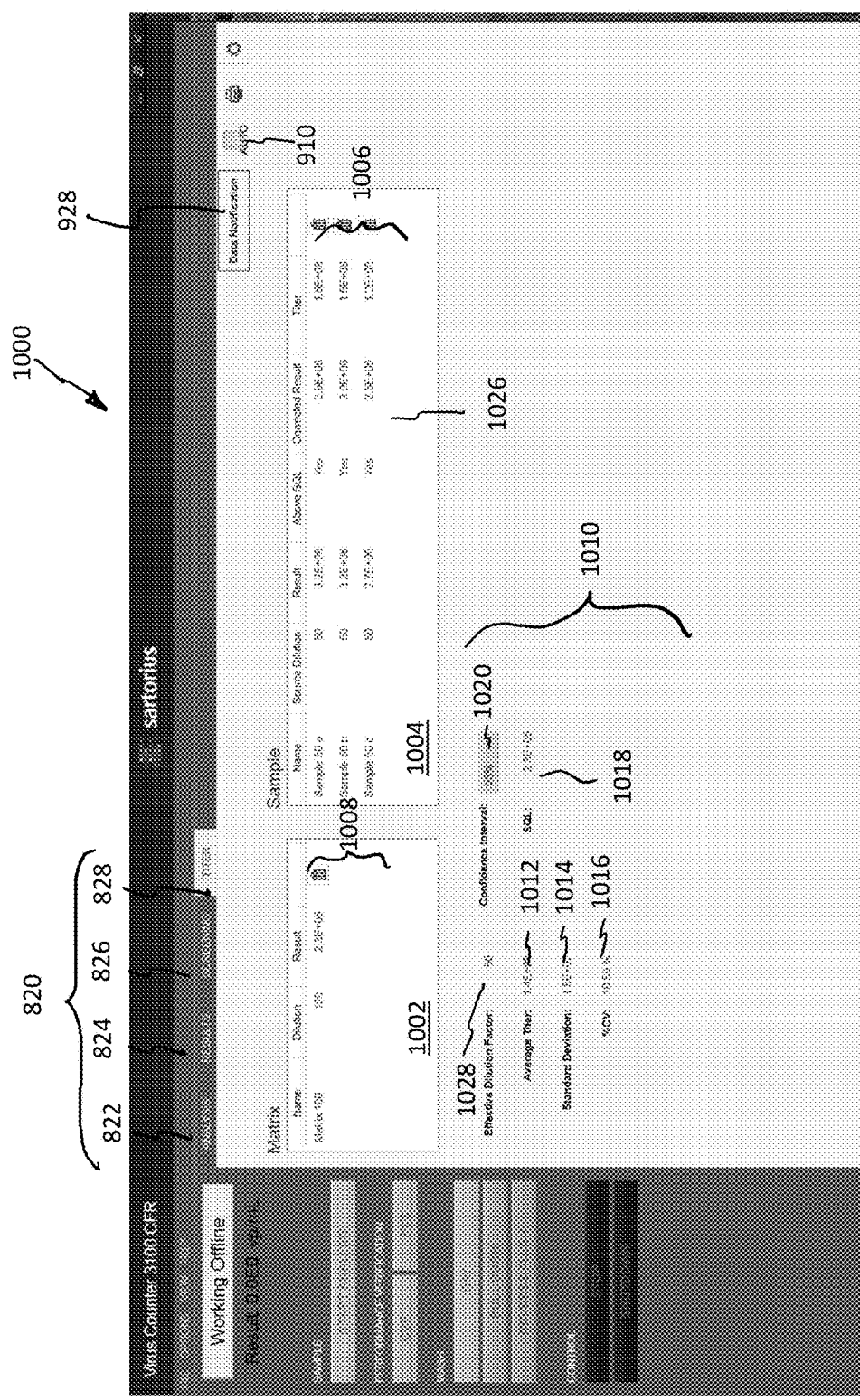
FIG. 16 is an embodiment of the screen of FIG. 15 in which a particle titer results have been determined and a data notification indication is present.

With further reference to FIGS. 15-16 the titer assay screen 1000 is depicted. The titer assay screen 1000 may be accessed by selection of the titer tab 828 in the screen selection bar 820. The titer assay screen 1000 may include an optimized control set listing 1002 that reflects an optimized control set 1008 as selected by the user from the results listing 850 and an optimized target set listing 1004 that reflects an optimized target set as selected by the user from the results listing 850. The titer assay module 370 may be operative to calculate particle titer results for the target sample stock based on the optimized target set 1006 and the optimized control set 1008 as selected by the user. The particle titer results may be displayed in a titer results portion 1010 of the titer assay screen 1000. The particle titer results may include an average titer 1012 of the target sample stock 394, a standard deviation 1014 of the flow cytometry results of the optimized target set 1006, and a coefficient of variation 1016 for the particle titer results. The average titer 1012 may be an average concentration of target particles in the target sample stock as determined from the optimized target set 1006.

In connection with the determination of particle titer results 1010, the titer assay module 370 may calculate corrected quantification indications 1026 for the optimized target set 1006 based on the optimized control set 1002. This may include subtraction of an average result of the optimized control set 1002 from the flow cytometry results of the optimized target set 1004. As with the screening assay module 360 operation, if the titer assay module 370 determines that any corrected quantification indications 1026 for the optimized target set 1006 are negative, a corrected quantification indication notification may be presented that may notify the user of the circumstance creating the notification and/or preclude determination of particle titer results 1010. For instance, as shown in FIG. 16 a data notification indicator 928 may also be provided in the titer assay screen 1000 in the event of a data notification being present in relation to the operation of the titer assay module 370. While not shown, a data notification detailed listing like the one described in relation to FIG. 14 may also be provided upon selection of the data notification indicator 926 for the titer assay screen 1000. The data notification detailed listing in the titer assay screen 1000 may provide data notification details for the operation of the titer assay module 270.

In addition, the titer assay module 370 may verify that a dilution factor for all of the optimized control set 1008 and optimized target set 1006 are within the optimal dilution range established by the screening assay module 360. In the event a result is outside the optimized dilution factor range, a dilution factor notification may be presented in relation to a member of either of the optimized control set 1008 or optimized target set 1006 outside the optimized dilution factor range, and the data notification indicator 926 may be displayed. Also, the value that is outside the acceptable range may be highlighted or the font color, size, or formatting may be changed to indicate the data notification as described above. Furthermore, an absolute limit on dilution may be established that may be a broader range than the optimized target range. A dilution factor notification may also be presented if any of the optimized control set 1008 or optimized target set 1006 are outside the absolute dilution factor range.

Furthermore, it may be appreciated that the average titer result 1012 may be based on a dilution factor of the optimized target set 1006 (e.g., in relation to extrapolation of particle quantification indications from the diluted sample to the particle results in the undiluted target sample fluid stock 394). In this regard, the titer assay module 370 may determine or calculate an effective dilution factor 1028 to determine the average titer 1012. The effective dilution factor may be automatically populated based on the dilution factors for the optimized control set 1006.

The titer results portion 1010 may also include a calculated sample qualification limit (SQL) 1018. The SQL 1018 may be determined based on the flow cytometry results for the optimized target set 1006 and the optimized control set 1008. The SQL 1018 may correspond to a limit at which a sample result can be determined with suitable precision and accuracy in a given matrix of sample results. The SQL 1018 may be determined based on the average result of the optimized control set 1008, the observed variability of the optimized target set 1006 (e.g., as reflected in the standard deviation of the optimized control set), and the desired degree of confidence 1020. The desired degree of confidence 1012 may be selectable by the user in the titer results portion 1010. In this regard, the SQL 1018 may be used to determine if the sample result is statistically significantly greater than a background signal from the sample matrix. The SQL 1018 may be calculated based upon the average of the optimized control set results 1008. Specifically, a standard deviation of the optimized control set 1008 may be calculated. A confidence interval may also be calculated based on the standard deviation of the optimized control set 1008. The confidence interval may be the standard deviation of the optimized control set 1008 multiplied by an appropriate confidence value as determined from a t-distribution table. The confidence value may be determined based upon the degrees of freedom of the data (e.g. a value of one less than the number of replicates of the optimized control set 1008) and based upon the selected degree of confidence 1020. The resulting confidence value may be added to the mean value of measurements of the optimized control set to define the SQL 1018.

Figure 17:
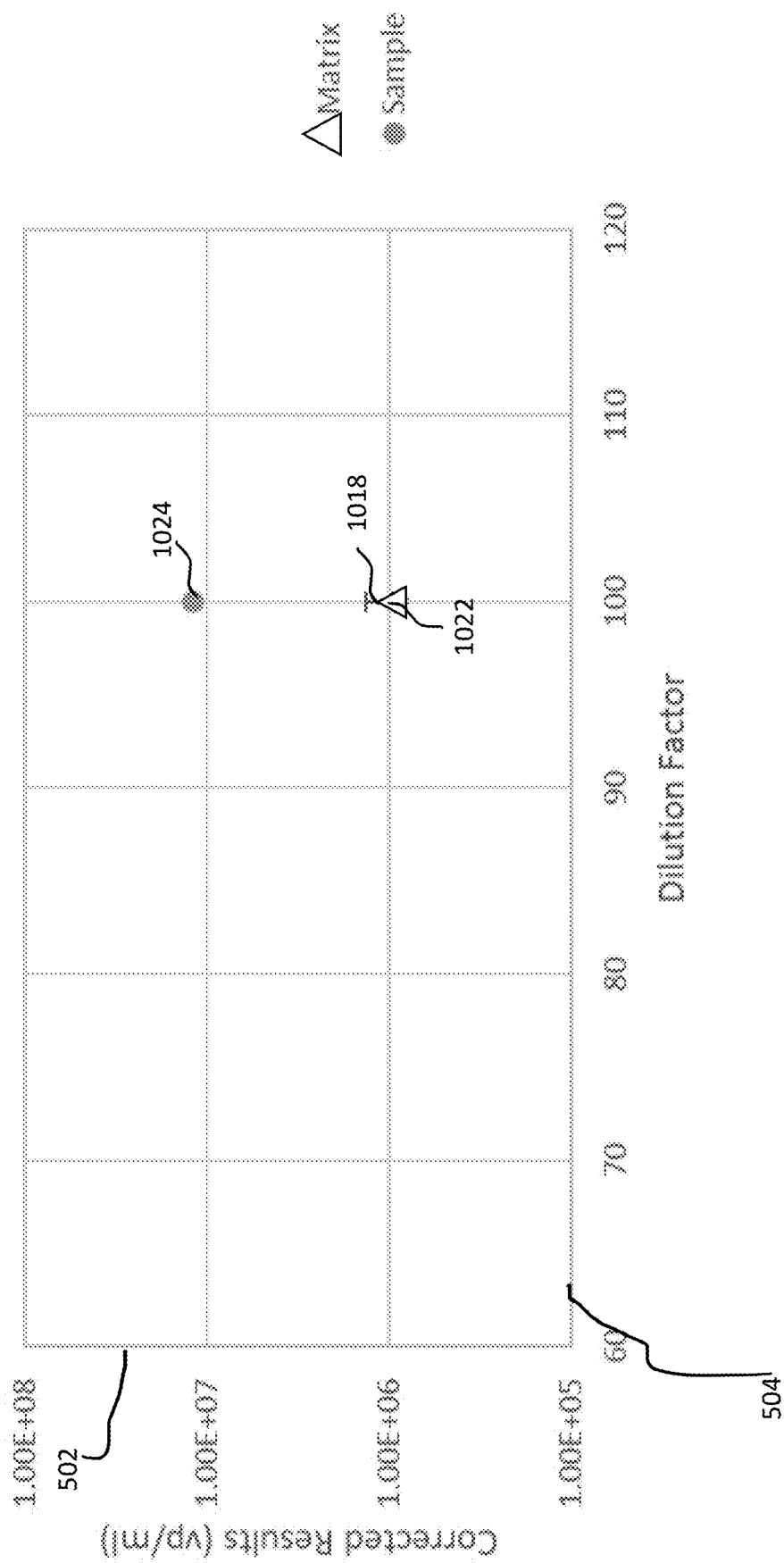
FIG. 17 is a plot depicting a relationship of a sample qualification limit relative to flow cytometry results.

As depicted in FIG. 17, the SQL 1018 is depicted as an error bar in relation to an optimized blank control fluid sample result 1022 in a plot. As can be appreciated, the optimized target fluid sample result 1024 corresponding to the optimized blank control fluid sample result 1022 depicted in FIG. 12 is provided outside of the SQL 1018 as shown in relation to the optimized blank control fluid sample result 1022. However, if an optimized target fluid sample result 1024 is not outside of the SQL 1018 defined relative to a corresponding optimized blank control fluid sample result 1022, a SQL notification may be provided on the graphical user interface 380. In addition, the SQL notification may preclude calculation of the average particle titer in the particle titer result portion.

The titer assay module 370 may perform other confirmation of data used to calculate the particle titer results and/or the particle titer results themselves. In the later regard, a titer notification may be provided if any of the particle titer results 1010 are outside of a defined acceptable limit, which may be provided or definable by a user for any of the average titer 1012 of the target sample stock 394, a standard deviation 1014 of the flow cytometry results of the optimized target set 1006, and a coefficient of variation 1016 for the particle titer results.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

EXAMPLE IMPLEMENTATION COMBINATIONS

Some other contemplated embodiments of implementation combinations for various aspects of this disclosure, with or without additional features as disclosed above or elsewhere herein, are summarized in the exemplary numbered combinations presented below:

1. A flow cytometry method for quantification of target particles with particular particle attributes in a target sample fluid stock using a flow cytometer operable to flow a fluid sample through a flow cytometry investigation zone subjected to investigation excitation radiation and to detect and measure response radiation from the investigation zone and to determine and output a flow cytometry result including a quantification indication for target particles in each said fluid sample, the method comprising:

subjecting to first flow cytometry evaluation a screening target set of screening target fluid samples comprising a dilution series of screening sample fluid stock diluted at a plurality of dilution factors, and optionally with only one said screening target fluid sample at each said dilution factor, wherein the subjecting to first flow cytometry evaluation comprises:

flowing each said screening target fluid sample through the investigation zone of the flow cytometer and in the investigation zone subjecting each said screening target fluid sample to the investigation excitation radiation, detecting the response radiation from the investigation zone and generating for each said screening target fluid sample a flow cytometry result including a said quantification indication for the target particles for the screening target fluid sample, and storing the flow cytometry results for the screening target set in computer memory, the memory having stored therein a screening assay module accessible and executable by a processor and a titer assay module accessible and executable by the processor;

executing the screening assay module by the processor, wherein said executing the screening assay module comprises:

calculating a corrected quantification indication for each of at least a plurality portion of the screening target fluid samples, comprising comparison of first selected flow cytometry results of the screening target set from the memory with corresponding second selected flow cytometry results of a screening control set selected from the memory, the screening control set including at least one screening blank control fluid sample corresponding to the screening target set and based at least in part on the comparison adjusting the quantification indications for the first selected flow cytometry results to the corrected quantification indications, and determining, based on analysis of the corrected quantification indications, an optimized sample dilution factor range for the screening stock fluid sample and saving the optimized sample dilution factor range in the memory;

subjecting to second flow cytometry evaluation an optimized target set of optimized target fluid samples each comprising the target sample fluid stock diluted to an optimized sample dilution factor within the optimized sample dilution factor range, wherein the subjecting to second flow cytometry evaluation comprises:

flowing each said optimized target fluid sample through the investigation zone of the flow cytometer and in the investigation zone subjecting each said optimized target fluid sample to the investigation excitation radiation, detecting the response radiation from the investigation zone and generating for each said optimized target fluid sample a said flow cytometry result including a said quantification indication for the target particles for the optimized target fluid sample, and storing the flow cytometry results for the optimized target set in the memory;

executing the titer assay module with the processor, wherein said executing the titer assay module comprises:

accessing the flow cytometry results for the optimized target set in the memory, and calculating, using the flow cytometry results for the optimized target set, particle titer results for the target sample fluid stock, optionally including a calculated concentration of the target particles in the target sample fluid stock; and storing the particle titer results for the target sample fluid stock in the memory.

2. The method of example combination 1, further comprising:

displaying on a display of a graphical user interface a results listing corresponding to the flow cytometry results stored in the memory, optionally the graphical user interface having a user input device.

3. The method of example combination 2, further comprising:

receiving a first screening selection from a user by the user input device of the graphical user interface, the first screening selection comprising the first selected flow cytometry results for the plurality portion of the screening target fluid samples from the results listing.

4. The method of example combination 3, wherein the executing the screening assay module further comprises:

accessing the memory to retrieve the first selected flow cytometry results for the plurality portion of the screening target fluid samples based on the first screening section that is selected by the user from the results listing.

5. The method of any one of example combinations 2-4, further comprising:

receiving a first titer selection from the user by the user input device of the graphical user interface, the first titer selection comprising the flow cytometry results for the optimized target fluid samples that is selected by the user from the results listing.

6. The method of example combination 5, wherein the executing the titer assay module further comprises:

accessing the memory to retrieve the flow cytometry results for the optimized target fluid samples based on the first titer selection that is selected by the user from the results listing.

7. The method of either one of example combinations 5 or example combination 6, further comprising:

storing the flow cytometry results for the at least one screening blank control fluid sample of the screening control set in the memory.

8. The method of any one of example combinations 1-7, further comprising:

subjecting to third flow cytometry evaluation the screening control set comprising the at least one screening blank control fluid sample, the subjecting to third flow cytometry evaluation comprising:
- flowing each said screening blank control fluid sample through the flow cytometer investigation zone and in the investigation zone subjecting each said screening blank control fluid sample to the investigation excitation radiation, and
- detecting the response radiation from the investigation zone and generating for each said screening blank control fluid sample a said flow cytometry result including a said quantification indication for the target particles for the screening blank control fluid sample.

9. The method of example combination 8, further comprising:
receiving a second screening selection from a user by a user input device of a graphical user interface, the second screening selection comprising the flow cytometry results for the at least one screening blank control fluid sample from a results listing displayed on the graphical user interface.

10. The method of example combination 9, wherein the executing the screening assay module further comprises:
accessing the memory to retrieve the second selected flow cytometry results for the at least one screening blank control fluid sample based on the second screening section that is selected by the user from the results listing.

11. The method of any one of example combinations 1-10, wherein the executing the titer assay module further comprises:
calculating the particle titer results for the target sample fluid stock using the flow cytometry results for the optimized target set and an optimized control set comprising at least one optimized blank control fluid sample corresponding to the optimized target set.

12. The method of example combination 11, wherein the executing the titer assay module further comprises:
- determining a sample qualification limit (SQL) for the flow cytometry results for the optimized target set based on the flow cytometry results for the optimized control set; and
- providing, optionally on a graphical user interface, an indication of an SQL notification if the flow cytometry result for any one of the optimized target set does not exceed the SQL.

13. The method of either one of example combination 11 or example combination 12, further comprising:
storing the flow cytometry results for the at least one optimized blank control fluid sample of the optimized control set in the memory.

14. The method of any one of example combinations 11-13, further comprising:
subjecting to fourth flow cytometry evaluation the optimized control set comprising the at least one optimized blank control fluid sample, the subjecting to fourth flow cytometry evaluation comprising:
- flowing each said optimized blank control fluid sample through the investigation zone and in the investigation zone subjecting each said optimized blank control fluid sample to the investigation excitation radiation, and
- detecting the response radiation from the investigation zone and generating for each said optimized blank control fluid sample a said flow cytometry result including a said quantification indication of the target particles for the optimized blank control fluid sample.

15. The method of any one of example combinations 11-14, further comprising:
receiving a second titer selection from a user by a user input device of a graphical user interface, the second titer selection comprising the flow cytometry results for the at least one optimized blank control fluid sample from a results listing displayed on the graphical user interface.

16. The method of example combination 15, wherein the executing the titer assay module further comprises:
accessing the memory to retrieve the flow cytometry results for the at least one optimized blank control fluid sample based on the second titer section that is selected by the user from the results listing.

17. The method of any one of example combinations 1-16, wherein the executing the screening assay module further comprises:
- first determining whether or not there is a first condition in which there is a said flow cytometry result for a said screening blank control fluid sample corresponding to each said screening target fluid sample of the plurality portion of the screening target fluid samples; and
- providing a correspondence notification, optionally on a graphical user interface, when it is determined that there is not such a first condition during the first determining.

18. The method of any one of example combinations 1-17, wherein the executing the screening assay module further comprises:
- second determining whether or not there is a second condition that each said quantification indication of the second selected flow cytometry results of the screening control set is greater than a corresponding said quantification indication of the first selected flow cytometry results of the screening control set; and
- providing an indication of a quantification correction notification, optionally on a graphical user interface, when it is determined that there is not such a second condition during the second confirming.

19. The method of any one of example combinations 1-18, wherein in the executing the screening assay module the determining an optimized sample dilution factor further comprises:
calculating a fit of the corrected quantification indications relative to multiple dilution factors, wherein the plurality portion of the screening target fluid samples of the first selected flow cytometry results represent the multiple dilution factors.

20. The method of example combination 19, wherein the executing the screening assay module further comprises:
displaying on a graphical user interface a plot of the fit of the corrected quantification indications relative to said corresponding multiple dilution factors optionally with the plotted fit displayed in the plot relative to plotted points of the corrected quantification indications, and optionally the fit is plotted as a linear trendline.

21. The method of example combination 20, wherein the executing the screening assay module further comprises:
displaying on the graphical user interface an idealized trendline on the plot.

22. The method of either one of example combination 20 or example combination 21, wherein the executing the screening assay module further comprises:

providing an indication of a graphing notification if the plurality portion of the screening target fluid samples do not generate a plottable result.

23. The method of any one of example combinations 19-22, wherein the executing the screening assay module further comprises:
comparing the fit relative to one or more dilution quality parameters, wherein the optimized sample dilution factor range is determined after the fit conforms to acceptable dilution quality parameters.

24. The method of example combination 23, wherein the executing the screening assay module further comprises:
providing an indication of a fit notification if the fit for a said plurality portion of the screening target fluid samples does not conform to acceptable dilution quality parameters.

25. The method of either one of example combination 22 or example combination 23, wherein the calculating the fit comprises determining a linear regression fit relative to log conversions of the corrected quantification indications and the multiple dilution factors.

26. The method of example combination 25, wherein the one or more dilution quality parameters comprise a quantitative characterization of the linear regression fit.

27. The method of either one of example combination 25 or example combination 26, wherein the executing the screening assay module further comprises:
representing the linear regression fit as a trendline relative to the log conversions of the corrected quantification indications and the multiple dilution factors, and wherein the dilution quality parameters comprise a slope and a coefficient of determination of the trendline.

28. The method of any one of example combinations 23-27, wherein said acceptable dilution quality parameters comprise an acceptable slope value of a linear trendline and an acceptable coefficient of determination of the linear trendline.

29. The method of example combination 28, wherein the acceptable slope value is in a predetermined range of acceptable slope values and the acceptable coefficient of determination value is in a predetermined range of acceptable coefficients of determination.

30. The method of either one of example combination 28 or example combination 29, wherein the optimized sample dilution factor range is within a sub-range within a range of the multiple dilution factors of a said plurality portion of the screening target fluid samples in which the slope value is within a predetermined range of acceptable slope values and the coefficient of determination is within a predetermined range of acceptable coefficient of fit determination values.

31. The method of any one of example combinations 28-30, wherein the optimized sample dilution factor range is defined between an upper optimized dilution factor bound and a lower optimized dilution factor bound, wherein the upper optimized dilution factor bound corresponds to a dilution value on the linear trendline corresponding to a lower optimized performance concentration bound and the lower optimized dilution factor bound corresponds to a dilution value on the linear trendline corresponding to an upper optimized performance concentration bound; and
optionally the lower optimized performance concentration bound is at least $10^{6.5}$ particles per milliliter, preferably at least $10^{6.7}$ particles per milliliter, more preferably at least $10^{6.9}$ particles per milliliter and even more preferably at least about $10^{7.0}$ particles per milliliter and the upper optimized concentration bound is no larger than $10^8$ particles per milliliter, preferably no larger than $10^{7.9}$ particles per milliliter, more preferably no larger than $10^{7.8}$ particles per milliliter and even more preferably no larger than about $10^{7.7}$ particles per milliliter.

32. The method of example combination 31, wherein the lower optimized performance concentration bound and the upper optimized performance concentration bound define an optimized performance sub-range within a dynamic range of the flow cytometer for particle concentration determinations; and
optionally, the upper optimized concentration bound is no more than 10 times the lower optimized concentration bound, preferably no more than $10^{0.8}$ times the lower optimized concentration bound and more preferably no more than $10^{0.5}$ times the lower optimized concentration bound.

33. The method of any one of example combinations 23-31, wherein the comparing the fit further comprises presenting a review prompt to a user to prompt the user to confirm the dilution quality parameters of the fit, and optionally the presentation comprises a visual indication appearing on a graphical user interface.

34. The method of any one of example combinations 23-33, wherein the executing the screening assay module further comprises:
receiving an acceptable dilution quality parameter input from a user that define the acceptable dilution quality parameters, and optionally through a user input device of a graphical user interface.

35. The method of any one of example combinations 23-34, wherein the calculating the fit further comprises:
removing from determination of the fit at least one said screening target fluid sample at a maximum said dilution factor or a minimum said dilution factor of the plurality of dilution factors, wherein the fit is determined excluding any said corrected quantification indication for each said removed screening target fluid sample, and optionally the removing is a consequence of a prior proposed fit not conforming to one or more acceptable dilution quality parameters.

36. The method of example combination 35, wherein the removing is in response to a user input.

37. The method of any one of example combinations 19-24, wherein the calculating the fit further comprises:
removing from determination of the fit at least one said screening target fluid sample at a maximum said dilution factor or a minimum said dilution factor of the plurality of dilution factors, wherein the fit is determined excluding any said corrected quantification indication for each said removed screening target fluid sample, and optionally the removing is in response to a user input.

38. The method of any one of example combinations 19-24 and 37, wherein the optimized sample dilution factor range is defined between an upper optimized dilution factor bound and the lower optimized dilution factor bound, wherein the upper optimized dilution factor bound corresponds to a dilution value on the fit corresponding to a lower optimized performance concentration bound in the lower optimized dilution factor bound corresponds to a dilution value on the fit corresponding to an upper optimized performance concentration bound.

39. The method of example combination 38, wherein the lower optimized performance concentration bound is at least $10^{6.5}$ particles per milliliter, preferably at least $10^{6.7}$ particles per milliliter, more preferably at least $10^{6.9}$ particles per milliliter and even more preferably at least about $10^{7.0}$ particles per milliliter.

40. The method of either one of example combination 38 or example combination 39, wherein the upper optimized concentration bound is no larger than $10^8$ particles per milliliter, preferably no larger than $10^{7.9}$ particles per milliliter, more preferably no larger than $10^{7.8}$ particles per milliliter and even more preferably no larger than about $10^{7.7}$ particles per milliliter.

41. The method of any one of example combinations 38-40, wherein:
the lower optimized performance concentration bound in the upper optimized performance concentration bound defining optimized performance sub-range is within a dynamic range for the flow cytometer for particle concentration determination; and
the upper optimized concentration bound is no more than 10 times the lower optimized concentration bound, preferably no more than $10^{0.8}$ times the lower optimized concentration bound and more preferably no more than $10^{0.5}$ times the lower optimized concentration bound.

42. The method of any one of example combinations 1-41, wherein the executing the screening assay module further comprises:
providing an indication of a dilution factor notification if the optimized sample dilution factor range is outside of an absolute dilution factor range of the flow cytometer, and optionally the indication of a dilution factor error comprises a visual indication on a graphical user interface.

43. The method of any one of example combinations 1-42, wherein the executing the screening assay module further comprises:
providing an indication of the optimized sample dilution factor range to a user, and optionally as a visual indication on a graphical user interface.

44. The method of example combination 43, wherein the providing the indication of the optimized sample dilution factor range comprises highlighting an upper bound and a lower bound of the optimized sample dilution factor range on a display of a graphical user interface.

45. The method of either one of example combination 43 or example combination 44, wherein the providing the indication of the optimized sample dilution factor range includes providing at least one optimized dilution factor value comprising a rounded dilution value within the optimized sample dilution factor range, optionally on a graphical user interface.

46. The method of any one of example combinations 1-45, wherein the executing the screening assay module further comprises:
generating dilution instructions to prepare the optimized target set of the plurality of optimized target fluid samples within the optimized sample dilution factor range.

47. The method of example combination 46, wherein the executing the screening assay module further comprises:
presenting the dilution instructions to a user for preparation of the optimized target set, optionally on a graphical user interface.

48. The method of any one of example combinations 1-47, wherein the executing the titer assay module further comprises:
calculating one or more titer parameters regarding the particle titer results.

49. The method of example combination 48, wherein the one or more titer parameters comprise a standard deviation of the particle titer results, and optionally a standard deviation of multiple said concentrations corresponding to multiple said optimized target fluid samples.

50. The method of either one of example combination 48 or example combination 49, wherein the one or more titer parameters comprise a coefficient of variation of the particle titer results, and optionally a coefficient of variation of multiple said concentrations corresponding to multiple said optimized target fluid samples.

51. The method of any one of example combinations 48-50, wherein the executing the titer assay module further comprises:
providing an indication, optionally on a graphical user interface, of a titer notification if a said titer parameter is determined to be outside a corresponding acceptable titer parameter value range.

51A. The method of any one of example combinations 1-50, wherein the executing the titer assay module further comprises:
confirming that each said optimized target fluid sample of the optimized target set comprises an acceptable dilution factor.

52. The method of example combination 51A, wherein the acceptable dilution factor is within the optimized dilution factor range.

53. The method of either one of example combination 51A or example combination 52, wherein the executing the titer assay module further comprises:
providing an indication of a titer dilution notification when any one or more of the flow cytometry results for the optimized target fluid samples of the optimized target set do not comprise a said acceptable dilution factor.

54. The method of any one of example combinations 1-53, wherein the screening control set comprises a plurality of said screening blank control fluid samples, with at least one said screening blank control fluid sample corresponding to each said dilution factor of the plurality of dilution factors of the screening target fluid samples, and optionally with only one said screening blank control fluid sample corresponding to each said dilution factor of the plurality of dilution factors sample corresponding to each said dilution factor of the plurality of dilution factors of the screening target fluid samples.

55. The method of example combination 54, wherein the plurality of screening blank control fluid samples comprise blank fluid matrix of screening sample fluid stock, in the absence of the target particles.

56. The method of any one of example combinations 1-53, wherein the at least one screening blank control fluid sample comprises a screening buffer solution, in the absence of the target particles, and optionally the screening control set includes only a single said screening blank control fluid sample.

57. The method of any one of example combinations 1-56, wherein the target sample fluid stock comprises the fluid matrix of the screening sample fluid stock.

58. The method of any one of example combinations 1-57, wherein the screening sample fluid stock is the same as the target sample fluid stock.

59. The method of any one of example combinations 1-58, wherein the screening target set comprises a serial ten-fold dilution series of the screening sample fluid stock.

60. The method of any one of example combinations 1-59, wherein the calculated concentration of the target particles in the target sample fluid stock is at least in part based on adjustment for a said dilution factor of the optimized target set.

61. The method of example combination 60, wherein the executing the titer assay module comprises:
   automatically retrieving a said dilution factor of the optimized target set to determine the particle titer results.

62. The method of any one of example combinations 1-61, wherein the screening control set includes only a single said screening blank control fluid sample at each said dilution factor of the plurality of dilution factors.

63. The method of any one of example combinations 1-62, wherein the optimized target set includes a plurality of said optimized target fluid sample at a single said optimized dilution factor within the optimized sample dilution factor range, optionally the plurality of said optimized fluid samples include, at least 3 said optimized target fluid samples, preferably not more than 10 said optimized target fluid samples, and more preferably 3 said optimized target fluid samples.

64. The method of any one of example combinations 1-63, wherein the optimized sample dilution factor range is bounded by an upper optimized dilution factor bound and a lower optimized dilution factor bound, neither of which is at a dilution factor of the plurality of dilution factors of the screening target set.

65. The method of any one of example combinations 1-64, wherein the target particles are particles of biological material.

66. The method of any one of example combinations 1-65, wherein the target particles have a particle size of smaller than 2 microns, preferably smaller than 1 micron, more preferably smaller than 600 nanometers and even more preferably smaller than 300 nanometers.

67. The method of example combination 66, wherein the particle size is at least 10 nanometers, preferably at least 20 nanometers, and even more preferably at least 30 nanometers.

68. The method of any one of example combinations 1-67, wherein:
   each said screening target fluid sample, screening blank control fluid sample, optimized target fluid sample and optimized blank control fluid sample is fluorescently stained to provide a at least one fluorescent label on the target particles; and
   each said flow cytometry evaluation comprises detecting the response radiation from the investigation zone for fluorescent emission response from a said fluorescent label on the target particles.

69. The method of example combination 68, wherein each said flow cytometry evaluation comprises detecting only for fluorescent emission response from the investigation zone and not detecting for light scatter.

70. The method of either one of example combination 68 or example combination 69, wherein the at least one fluorescent label comprises a non-specific nucleic acid label provided by a fluorogenic dye.

71. The method of any one of example combinations 68-70, wherein the at least one fluorescent label comprises a non-specific protein label provided by a second fluorogenic dye.

72. The method of any one of example combinations 68-71, wherein the at least one fluorescent label comprises an antibody stain specific for binding to an epitope of the target particles.

73. The method of any one of example combinations 68-71, wherein the target particles comprise fluorescently-labeled virions.

74. The method of any one of example combinations 68-71, wherein the target particles comprise fluorescently-labeled virus-like particles.

75. The method of any one of example combinations 68-71, wherein the target particles comprise fluorescently-labeled exosomes.

76. The method of any one of example combinations 68-71, wherein the target particles comprise microvesicles.

77. The method of any one of example combinations 68-76, wherein the at least one fluorescent label includes a plurality of fluorescent labels and each said flow cytometry evaluation comprises detecting for a separate fluorescent emission response from each of the said plurality of fluorescent labels.

78. The method of example combination 77, wherein each said generating a said flow cytometry result comprises identifying coincidental fluorescent emission responses from at least two said fluorescent labels indicative of passage through the investigation zone of a said target particle including the at least two said fluorescent labels.

79. The method of example combination 78, wherein each said generating a said flow cytometry result comprises counting as a target particle each said identified coincidental fluorescent emission response.

80. The method of any one of example combinations 68-79, wherein the excitation radiation is provided from a single excitation radiation source.

81. The method of any one of example combinations 68-80, wherein the excitation radiation is provided from a plurality of different excitation radiation sources each providing radiation to the investigation zone in a different radiation wavelength range.

82. The method of either one of example combination 80 or example combination 81, wherein each said excitation radiation source is a light source, and optionally comprising a laser or light-emitting diode (LED).

83. The method of any one of example combinations 1-82, wherein each said flow cytometry evaluation comprises flowing the respective fluid sample through the investigation zone at a flow rate in a range of from 600 nanoliters per minute to 3000 nanoliters per minute, and preferably 600 nanoliters per minute to 2000 nanoliters per minute, while subjecting the said respective fluid sample to the investigation excitation radiation.

84. A flow cytometry system for quantification of particles in a target sample fluid stock, the flow cytometry system comprising:
   a flow cytometer operable to flow a fluid sample through a flow cytometry investigation zone subjected to investigation excitation radiation and to detect and measure response radiation from the investigation zone and to determine and output a flow cytometry result including a quantification indication of target particles with particular particle attributes in each said fluid sample;
   a memory to receive and store the flow cytometry results and including a said flow cytometry result for each of a screening target set of a plurality of screening target fluid samples, each said screening target fluid sample comprising a screening sample fluid stock for flow cytometry evaluation for the target particles and the plurality of screening target fluid samples comprising a dilution series of the screening sample fluid stock diluted at a plurality of dilution factors;

a graphical user interface comprising a display to present to a user a results listing corresponding to the flow cytometry results stored in the memory and a user input device to receive from a user a selection of the flow cytometry results from the results listing;

a screening assay module executable by a processor to configure the processor to:

access the memory to retrieve the flow cytometry results for the screening target set based on a first screening selection that is selected by the user from the results listing, calculate corrected quantification indications of the target particles for at least a plurality portion of the screening target fluid samples of the first screening selection representing multiple dilution factors, calculate a fit of the corrected quantification indications relative to the multiple dilution factors, determine an optimized sample dilution factor range for flow cytometry investigation of the screening sample fluid stock using the flow cytometer instrument based on an analysis of the fit of the corrected quantification indications, and present an indication of the optimized sample dilution factor range on the display of the graphical user interface;

wherein the memory is further operative to receive and store a said flow cytometry result for each of an optimized target set of a plurality of optimized target fluid samples each comprising target sample fluid stock for flow cytometry evaluation for the target particles with the particular particle attributes, wherein the plurality of optimized target fluid samples of the optimized target set comprise a dilution factor of the target sample fluid stock diluted to within the optimized sample dilution factor range; and a titer assay module executable by a processor to configure the processor to:

access the memory to retrieve the flow cytometry results for the optimized target set based on a first titer selection that is selected by the user from the results listing, and determine particle titer results for the target sample fluid stock based on the flow cytometry results of the optimized target set of the first titer selection and present the particle titer results on the display of the graphical user interface.

85. The flow cytometry system of example combination 84, wherein the memory receives and stores a said flow cytometry result for a screening control set with at least one screening blank control fluid sample corresponding to the screening target set.

86. The flow cytometry system of example combination 85, wherein the screening assay module is further operative to:

retrieve the flow cytometry result for the screening control set based on a second screening selection that is selected by the user from the results listing.

87. The flow cytometry system of example combination 86, wherein the screening assay module is further operative to:

confirm that the second screening selection comprises a said flow cytometry result for a said screening blank control fluid sample corresponding to each of the plurality portion of the screening target fluid samples of the first screening selection 88. The flow cytometry system of either one of example combination 86 or example combination 87, wherein the screening assay module is further operative to:

confirm whether or not the quantification indication of the target particles of each said screening target fluid sample of the first screening selection is greater than a corresponding said quantification indication of the target particles of the screening control set of the second screening selection.

89. The flow cytometry system of example combination 88, wherein the plurality portion of the screening target fluid samples are confirmed to have a said quantification indication of the target particles greater than the corresponding said quantification indication of the target particles of the screening control set of the second screening selection.

90. The flow cytometry system of any one of example combinations 84-89, wherein the memory receives and stores a said flow cytometry result for an optimized control set with at least one optimized blank control fluid sample corresponding to the optimized target set 91. The flow cytometry system of example combination 90, wherein the titer assay module is further operative to:

retrieve the flow cytometry results for the optimized control set based on a second titer selection that is selected by the user from the results listing.

92. The flow cytometry system of example combination 91, wherein the particle titer results for the target sample fluid stock is based on the flow cytometry results of the optimized target set of the first titer selection and the optimized control set of the second titer selection.

93. The flow cytometry system of any one of example combinations 84-92, wherein the screening assay module is further operative to:

compare one or more dilution quality parameters of the fit to one or more acceptable dilution quality parameters.

94. The flow cytometry system of example combination 93, wherein the optimized sample dilution factor range is based on an identified said plurality portion of the screening target fluid samples of the first screening selection having acceptable dilution quality parameters.

95. A flow cytometry system for quantification of particles in a target sample fluid stock, the flow cytometry system comprising:

a flow cytometer operable to flow a fluid sample through a flow cytometry investigation zone subjected to investigation excitation radiation and to detect and measure response radiation from the investigation zone and to determine and output a flow cytometry result including a quantification indication of target particles with particular particle attributes in the fluid samples;

a memory to receive and store the flow cytometry results and including a said flow cytometry result for each of a screening target set of a plurality of screening target fluid samples and for each of a screening control set with at least one screening blank control fluid sample corresponding to the screening target set, each said screening target fluid sample comprising a screening sample fluid stock for flow cytometry evaluation for the target particles and the plurality of screening target fluid samples comprising a dilution series of the screening sample fluid stock diluted at a plurality of dilution factors;

a graphical user interface comprising a display to present to a user a results listing corresponding to the flow cytometry results stored in the memory and a user input device to receive from a user a selection of the flow cytometry results from the results listing;

a screening assay module executable by a processor to configure the processor to:
  access the memory to retrieve the flow cytometry results for the screening target set based on a first screening selection that is selected by the user from the results listing and to retrieve the flow cytometry results for the screening control set based on a second screening selection that is selected by the user from the results listing,
  confirm that the second screening selection comprises a said flow cytometry result for a said screening blank control fluid sample corresponding to each of the plurality of screening target fluid samples of the first screening selection and whether or not the quantification indication of the target particles of each said screening target fluid sample of the first screening selection is greater than a corresponding said quantification indication of the target particles of the screening control set of the second screening selection,
  calculate corrected quantification indications of the target particles for at least a plurality portion of the screening target fluid samples of the first screening selection representing multiple dilution factors that are confirmed to have a said quantification indication of the target particles greater than the corresponding said quantification indication of the target particles of the screening control set of the second screening selection,
  calculate a fit of the corrected quantification indications relative to the multiple dilution factors,
  compare the fit relative to one or more acceptable dilution quality parameters,
  determine an optimized sample dilution factor range for flow cytometry investigation of the screening sample fluid stock using the flow cytometer instrument based on an identified said plurality portion of the screening target fluid samples of the first screening selection having acceptable dilution quality parameters, and
  present an indication of the optimized sample dilution factor range on the display of the graphical user interface;
wherein the memory is further operative to receive and store a said flow cytometry result for each of an optimized target set of a plurality of optimized target fluid samples each comprising target sample fuid stock for flow cytometry evaluation for the target particles with the particular particle attributes and a said flow cytometry result for an optimized control set with at least one optimized blank control fluid sample corresponding to the optimized target set, wherein the plurality of optimized target fluid samples of the optimized target set comprise a dilution factor of the titer sample fluid stock diluted to within the optimized sample dilution factor range; and
a titer assay module executable by a processor to configure the processor to:
  access the memory to retrieve the flow cytometry results for the optimized target set based on a first titer selection that is selected by the user from the results listing and to retrieve the flow cytometry results for the optimized control set based on a second titer selection that is selected by the user from the results listing, and
  determine particle titer results for the target sample fluid stock based on the flow cytometry results for the optimized target set of the first titer selection and the optimized control set of the second titer selection and present the particle titer results on the display of the graphical user interface.

96. The flow cytometry system of any one of example combinations 84-95, wherein the titer assay module is further operative to:
  calculate one or more titer parameters regarding the particle titer results, and
  present the one or more titer parameters on the display of the graphical user interface.

97. The flow cytometry system of example combination 96, wherein the one or more titer parameters comprise a standard deviation of the particle titer results.

98. The flow cytometry system of either one of example combinations 96 or example combination 97, wherein the one or more titer parameters comprise a coefficient of variation of the particle titer results.

99. The flow cytometry system of any one of example combinations 96-98, wherein the titer assay module is further operative to:
  provide an indication of a titer notification if the one or more titer parameters are outside a corresponding acceptable titer parameter.

100. The flow cytometry system of any one of example combinations 86 and 95-99, wherein the titer assay module is further operative to:
  determine a sample qualification limit (SQL) for the flow cytometry results for the optimized target set of the first titer selection based on the flow cytometry results for a said the optimized control set of a said second titer selection; and
  provide an indication of an SQL notification if the flow cytometry result for any one of the said optimized target set does not exceed the SQL.

101. The flow cytometry system of any one of example combinations 94-100, wherein the screening assay module is further operative to:
  provide an indication of a fit notification if the fit for a said plurality portion of the screening target fluid samples of the first screening selection does not provide a said fit having dilution quality parameters conforming to said acceptable dilution quality parameters.

102. The flow cytometry system of example combination 101, wherein the fit comprises a linear regression fit calculated relative to log conversions of the set of the corrected quantification indications and the multiple dilution factors.

103. The flow cytometry system of example combination 102, wherein the one or more dilution quality parameters comprise a quantitative characterization of the linear regression fit.

104. The flow cytometry system of either one of example combination 102 or example combination 103, wherein the linear regression fit is represented as a trendline relative to the log conversions of the corrected quantification indications and the multiple dilution factors, and wherein the dilution quality parameters comprise a slope and a coefficient of determination of the trendline.

105. The flow cytometry system of example combination 104, wherein the log conversions of the set of the corrected quantification indications are displayed in a plot relative to said corresponding multiple dilution factors on the display of the graphical user interface, and wherein the trendline is displayed in the plot relative to the corrected quantification indications.

106. The flow cytometry system of example combination 105, wherein an idealized trendline is displayed in the plot.

107. The flow cytometry system of either one of example combination 105 or example combination 106, wherein the screening assay module is further operative to:
provide an indication of a graphing notification if said plurality portion of the screening target fluid samples do not generate a plottable result.

108. The flow cytometry system of any one of example combinations 104-107, wherein said acceptable quality parameters comprise an acceptable slope value of the trendline and an acceptable coefficient of determination of the trendline.

109. The flow cytometry system of example combination 108, wherein the acceptable slope value comprises a range of acceptable slope values and the acceptable coefficient of determination comprises a range of acceptable coefficients of fit determination.

110. The flow cytometry system of example combination 109, wherein the optimized sample dilution factor range is within a range of the multiple dilution factors of a said plurality portion of the screening target fluid samples of the first screening selection in which the slope value is within the acceptable slope value and the coefficient of determination is within the range of acceptable coefficients of fit determination.

111. The flow cytometry system of any one of example combinations 104-110, wherein the optimized sample dilution factor range is defined between an upper optimized dilution factor bound and a lower optimized dilution factor bound, wherein the upper optimized dilution factor bound corresponds to a dilution value of the trendline corresponding to a lower performance concentration bound and the lower optimized dilution factor bound corresponds to a dilution value of the trendline corresponding to an upper performance concentration bound.

112. The flow cytometry system of any one of example combinations 94-111, wherein the screening assay module is further operative to present a verification prompt on the display of the graphical user interface that prompts to the user to confirm the dilution quality parameters of the fit.

113. The flow cytometry system of any one of example combinations 94-112, wherein said determining the optimized sample dilution factor range comprises removing the flow cytometry results corresponding to either one of or both of a maximum dilution factor or a minimum dilution factor from a first plurality portion of the screening target fluid samples of the first screening selection that does not provide said acceptable quality dilution parameters of a corresponding said fit for said first plurality portion.

114. The flow cytometry system of example combination 113, wherein the graphical user interface comprises a removal input corresponding to the flow cytometry result for the maximum dilution factor or the minimum dilution factor.

115. The flow cytometry system of any one of example combinations 89 and example combinations 95-114, wherein the screening assay module is further operative to:
provide an indication of a corrected quantification indication notification if a said quantification of particles of the target fluid sample of the first screening selection is not greater than a said corresponding quantification of particles of the screening control set of the second screening selection.

116. The flow cytometry system of any one of example combinations 84-115, wherein the screening assay module is further operative to:
provide an indication of a dilution factor notification if the optimized sample dilution factor range is outside of an absolute acceptable dilution factor of the flow cytometer.

117. The flow cytometry system of any one of example combinations 84-116, wherein the indication of the optimized sample dilution factor range comprises highlighting an upper bound and a lower bound of the optimized sample dilution factor range on the display of the graphical user interface.

118. The flow cytometry system of any one of example combinations 84-117, wherein the indication of the optimized sample dilution factor range comprises at least one optimized dilution value comprising a rounded dilution value within the optimized sample dilution factor range.

119. The flow cytometry system of any one of example combinations 84-118, wherein the screening assay module is further operative to generate dilution instructions to prepare the optimized target set of the plurality of optimized target fluid samples within the optimized sample dilution factor range and present the dilution instructions to the user on the display of the graphical user interface.

120. The flow cytometry system of any one of example combinations 84-119, wherein the titer assay module is further operative to confirm that the flow cytometry results of the plurality of samples of the first titer selection comprises an acceptable dilution factor.

121. The flow cytometry system of example combination 120, wherein the acceptable dilution factor is within the optimized sample dilution factor range.

122. The flow cytometry system of any one of example combinations 84-121, wherein the titer assay module is further operative to:
provide an indication of a titer dilution notification on the display of the graphical user interface when any one of the flow cytometry results of the plurality of samples of the first titer selection do not comprise a said acceptable dilution factor.

123. The flow cytometry system of any one of example combinations 94-122, wherein the acceptable quality parameters are definable by the user.

124. The flow cytometry system of example combination 123, wherein the graphical user interface includes an acceptable quality parameter input for use in defining the acceptable quality parameters by the user.

125. The flow cytometry system of any one of example combinations 84 and 95-124, wherein the screening control set comprises a plurality of screening blank control fluid samples corresponding to the plurality of dilution factors of the screening target fluid samples.

126. The flow cytometry system of example combination 125, wherein the plurality of screening blank control fluid samples comprise blank matrix in the absence of the target particles with particular particle attributes of the screening sample fluid stock.

127. The flow cytometry system of any one of example combinations 84 and 95-124, wherein the dilution series of the plurality of screening target fluid samples are diluted using a screening buffer solution, and wherein the at least one screening blank control fluid sample comprises the screening buffer solution in the absence of the target particles with particular particle attributes of the screening sample fluid stock.

128. The flow cytometry system of any one of example combinations 84-127, wherein the target sample fluid stock comprises the screening sample fluid stock.

129. The flow cytometry system of any one of example combinations 84-127, wherein the screening sample fluid stock is an equivalent approximation of the target sample fluid stock.

130. The flow cytometry system of any one of example combinations 84-127, wherein the target sample screening set comprises a serial ten-fold dilution series of the screening sample fluid stock.

131. The flow cytometry system of any one of example combinations 84-130, wherein the particle titer result is at least in part based on a said dilution factor of the optimized target set.

132. The flow cytometry system of any one of example combinations 84-131, wherein the titer assay module is operative to automatically retrieve a said dilution factor of the optimized target set to determine the particle titer results.

133. The flow cytometry system of any one of example combinations 84-132, wherein the particle titer results include a calculated concentration of the target particles in the target sample fluid stock.

134. The flow cytometry system of any one of example combinations 84-133, wherein the target particles are particles of biological material.

135. The flow cytometry system of any one of example combinations 1-134 wherein the target particles have a particle size of smaller than 2 microns, preferably smaller than 1 micron, more preferably smaller than 600 nanometers and even more preferably smaller than 300 nanometers.

136. The flow cytometry system of example combination 135, wherein the particle size is at least 10 nanometers, preferably at least 20 nanometers, and even more preferably at least 30 nanometers.

137. The flow cytometry system of any one of example combinations 84-136, wherein:
each said screening target fluid sample, screening blank control fluid sample, optimized target fluid sample and optimized blank control fluid sample is fluorescently stained to provide a at least one fluorescent label on the target particles; and
the flow cytometer is operable to detect the response radiation from the investigation zone for fluorescent emission response from a said fluorescent label on the target particles.

138. The flow cytometry system of example combination 137, wherein the flow cytometer is operable to detect only for fluorescent emission response from the investigation zone and not to detecting for light scatter.

139. The flow cytometry system of either one of example combination 137 or 138, wherein the at least one fluorescent label comprises a non-specific nucleic acid label provided by a fluorogenic dye.

140. The flow cytometry system of any one of example combinations 137-139, wherein the at least one fluorescent label comprises a non-specific protein label provided by a second fluorogenic dye.

141. The flow cytometry system of any one of example combinations 137-140, wherein the at least one fluorescent label comprises an antibody stain specific for binding to an epitope of the target particles.

142. The flow cytometry system of any one of example combinations 137-140, wherein the target particles comprise fluorescently-labeled virions.

143. The flow cytometry system of any one of example combinations 137-141, wherein the target particles comprise fluorescently-labeled virus-like particles.

144. The flow cytometry system of any one of example combinations 137-141, wherein the target particles comprise fluorescently-labeled exosomes.

145. The flow cytometry system of any one of example combinations 137-141, wherein the target particles comprise microvesicles.

146. The flow cytometry system of any one of example combinations 137-145, wherein the at least one fluorescent label includes a plurality of fluorescent labels and the flow cytometer is operable to detect for a separate fluorescent emission response from each of the said plurality of fluorescent labels.

147. The flow cytometry system of example combination 146, wherein the flow cytometer is operable to identify coincidental fluorescent emission responses from at least two said fluorescent labels indicative of passage through the investigation zone of a said target particle including the at least two said fluorescent labels and to determine the particle titer results based at least in part on identified said coincidental fluorescent emission responses.

148. The flow cytometry system of example combination 147, wherein the flow cytometer is operable to count as a target particle an occurrence of an identified said coincidental fluorescent emission response.

149. The flow cytometry system of any one of example combinations 137-148, wherein the excitation radiation is provided from a single excitation radiation source of the flow cytometer.

150. The flow cytometry system of any one of example combinations 137-148, wherein the excitation radiation is provided from a plurality of different excitation radiation sources of the flow cytometer each providing radiation to the investigation zone in a different radiation wavelength range.

151. The flow cytometry system of either one of example combination 149 or 150, wherein each said excitation radiation source is a light source, and optionally comprising a laser or light-emitting diode (LED).

152. The flow cytometry system of any one of example combinations 84-151, wherein the flow cytometer is operable to flow the respective fluid sample through the investigation zone at a controlled flow rate in a range of from 600 nanoliters per minute to 3000 nanoliters per minute, and preferably from 600 nanoliters per minute to 2000 nanoliters per minute, while subjecting the said respective fluid sample to the investigation excitation radiation.

153. The flow cytometry system of any one of example combinations 84-151, configured to perform the method of, or any feature of a method of, any one of example combinations 1-83.

154. Use of the flow cytometry system of any one of example combinations 84-151 to perform the method of any one of example combinations 1-83.

155. Use of the flow cytometry system of any one of example combinations 84-151 to determine a titer results for target particles in a target sample fluid stock, optionally including a calculated concentration of the target in the target sample fluid stock.

The description of a feature or features in a particular combination do not exclude the inclusion of an additional feature or features in a variation of the particular combination. Processing steps and sequencing are for illustration only, and such illustrations do not exclude inclusion of other steps or other sequencing of steps to an extent not necessarily incompatible. Additional steps may be included between any illustrated processing steps or before or after any illustrated processing step to an extent not necessarily incompatible.

The terms "comprising", "containing", "including" and "having", and grammatical variations of those terms, are intended to be inclusive and nonlimiting in that the use of such terms indicates the presence of a stated condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or any appropriate grammatical variation of such narrower terms). For example, a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. As used herein, a range for a feature refers to one or more values for that feature within an upper limit and lower limit, inclusive of the upper and lower limits, and includes situations in which the upper limit and the lower limit are the same, that is when the range includes a single value represented by the equal upper and lower limits.

What is claimed is:

1. A flow cytometry method for quantification of target particles with particular particle attributes in a target sample fluid stock using a flow cytometer operable to flow a fluid sample through a flow cytometry investigation zone subjected to investigation excitation radiation and to detect and measure response radiation from the investigation zone and to determine and output a flow cytometry result including a quantification indication for target particles in each said fluid sample, the method comprising:
　subjecting to first flow cytometry evaluation a screening target set of screening target fluid samples comprising a dilution series of screening sample fluid stock diluted at a plurality of dilution factors, wherein the subjecting to first flow cytometry evaluation comprises:
　　flowing each said screening target fluid sample through the investigation zone of the flow cytometer and in the investigation zone subjecting each said screening target fluid sample to the investigation excitation radiation,
　　detecting the response radiation from the investigation zone and generating for each said screening target fluid sample a flow cytometry result including a said quantification indication for the target particles for the screening target fluid sample, and
　　storing the flow cytometry results for the screening target set in computer memory, the memory having stored therein a screening assay module accessible and executable by a processor and a titer assay module accessible and executable by the processor;
　executing the screening assay module by the processor, wherein said executing the screening assay module comprises:
　　calculating a corrected quantification indication for each of at least a plurality portion of the screening target fluid samples, comprising comparison of first selected flow cytometry results of the screening target set from the memory with corresponding second selected flow cytometry results of a screening control set selected from the memory, the screening control set including at least one screening blank control fluid sample corresponding to the screening target set and based at least in part on the comparison adjusting the quantification indications for the first selected flow cytometry results to the corrected quantification indications, and
　　determining, based on analysis of the corrected quantification indications, an optimized sample dilution factor range for the screening stock fluid sample and saving the optimized sample dilution factor range in the memory;
　subjecting to second flow cytometry evaluation an optimized target set of optimized target fluid samples each comprising the target sample fluid stock diluted to an optimized sample dilution factor within the optimized sample dilution factor range, wherein the subjecting to second flow cytometry evaluation comprises:
　　flowing each said optimized target fluid sample through the investigation zone of the flow cytometer and in the investigation zone subjecting each said optimized target fluid sample to the investigation excitation radiation,
　　detecting the response radiation from the investigation zone and generating for each said optimized target fluid sample a said flow cytometry result including a said quantification indication for the target particles for the optimized target fluid sample, and
　　storing the flow cytometry results for the optimized target set in the memory;
　executing the titer assay module with the processor, wherein said executing the titer assay module comprises:
　　accessing the flow cytometry results for the optimized target set in the memory, and
　　calculating, using the flow cytometry results for the optimized target set, particle titer results for the target sample fluid stock; and
　storing the particle titer results for the target sample fluid stock in the memory.

2. The method of claim 1, further comprising:
displaying on a display of a graphical user interface a results listing corresponding to the flow cytometry results stored in the memory: and
receiving a first titer selection from the user by the user input device of the graphical user interface, the first titer selection comprising the flow cytometry results for the optimized target fluid samples that is selected by the user from the results listing.

3. The method of claim 1, further comprising:
subjecting to third flow cytometry evaluation the screening control set comprising the at least one screening blank control fluid sample, the subjecting to third flow cytometry evaluation comprising:
　flowing each said screening blank control fluid sample through the flow cytometer investigation zone and in the investigation zone subjecting each said screening blank control fluid sample to the investigation excitation radiation,
　detecting the response radiation from the investigation zone and generating for each said screening blank control fluid sample a said flow cytometry result including a said quantification indication for the target particles for the screening blank control fluid sample;

receiving a second screening selection from a user by a user input device of a graphical user interface, the second screening selection comprising the flow cytometry results for the at least one screening blank control fluid sample from a results listing displayed on the graphical user interface; and accessing the memory to retrieve the second selected flow cytometry results for the at least one screening blank control fluid sample based on the second screening section that is selected by the user from the results listing.

4. The method of claim 1, wherein the executing the titer assay module further comprises:

calculating the particle titer results for the target sample fluid stock using the flow cytometry results for the optimized target set and an optimized control set comprising at least one optimized blank control fluid sample corresponding to the optimized target set.

5. The method of claim 4, wherein the executing the titer assay module further comprises:

determining a sample qualification limit (SQL) for the flow cytometry results for the optimized target set based on the flow cytometry results for the optimized control set; and providing on a graphical user interface an indication of an SQL notification if the flow cytometry result for any one of the optimized target set does not exceed the SQL.

6. The method of claim 4, further comprising:

subjecting to fourth flow cytometry evaluation the optimized control set comprising the at least one optimized blank control fluid sample, the subjecting to fourth flow cytometry evaluation comprising:

flowing each said optimized blank control fluid sample through the investigation zone and in the investigation zone subjecting each said optimized blank control fluid sample to the investigation excitation radiation, and detecting the response radiation from the investigation zone and generating for each said optimized blank control fluid sample a said flow cytometry result including a said quantification indication of the target particles for the optimized blank control fluid sample.

7. The method of claim 1, wherein the executing the screening assay module further comprises:

first determining whether or not there is a first condition in which there is a said flow cytometry result for a said screening blank control fluid sample corresponding to each said screening target fluid sample of the plurality portion of the screening target fluid samples; and providing a correspondence notification, when it is determined that there is not such a first condition during the first determining.

8. The method of claim 1, wherein the executing the screening assay module further comprises:

second determining whether or not there is a second condition that each said quantification indication of the first selected flow cytometry results of the screening target set is greater than a corresponding said quantification indication of the second selected flow cytometry results of the screening control set; and providing an indication of a quantification correction notification when it is determined that there is not such a second condition during the second determining.

9. The method of claim 1, wherein in the executing the screening assay module the determining an optimized sample dilution factor further comprises:

calculating a fit of the corrected quantification indications relative to multiple dilution factors, wherein the plurality portion of the screening target fluid samples of the first selected flow cytometry results represent the multiple dilution factors.

10. The method of claim 9, wherein the executing the screening assay module further comprises:

comparing the fit relative to one or more dilution quality parameters, wherein the optimized sample dilution factor range is determined after the fit conforms to acceptable dilution quality parameters; and providing an indication of a fit notification if the fit for a said plurality portion of the screening target fluid samples does not conform to acceptable dilution quality parameters.

11. The method of claim 10, wherein the calculating the fit comprises determining a linear regression fit relative to log conversions of the corrected quantification indications and the multiple dilution factors; and.

the one or more dilution quality parameters comprise a quantitative characterization of the linear regression fit.

12. The method of claim 9, wherein the calculating the fit further comprises:

removing from determination of the fit at least one said screening target fluid sample at a maximum said dilution factor or a minimum said dilution factor of the plurality of dilution factors, wherein the fit is determined excluding any said corrected quantification indication for each said removed screening target fluid sample.

13. The method of claim 9, wherein the optimized sample dilution factor range is defined between an upper optimized dilution factor bound and a lower optimized dilution factor bound, wherein the upper optimized dilution factor bound corresponds to a dilution value on the fit corresponding to a lower optimized performance concentration bound and the lower optimized dilution factor bound corresponds to a dilution value on the fit corresponding to an upper optimized performance concentration bound.

14. The method of claim 13, wherein the lower optimized performance concentration bound is at least $10^{6.5}$ particles per milliliter;

the upper optimized concentration bound is no larger than $10^8$ particles per milliliter;

the lower optimized performance concentration bound and the upper optimized performance concentration bound define an optimized performance sub-range within a dynamic range for the flow cytometer for particle concentration determination; and the upper optimized concentration bound is no more than 10 times the lower optimized concentration bound.

15. The method of claim 13, wherein the executing the screening assay module further comprises:

providing an indication of the optimized sample dilution factor range to a user.

16. The method of claim 1, wherein:

the particle titer results comprise a calculated concentration of the target particles in the target sample fluid stock;

the executing the titer assay module further comprises calculating one or more titer parameters regarding the particle titer results;

the one or more titer parameters comprise a standard deviation of multiple said concentrations corresponding to multiple said optimized target fluid samples;

the one or more titer parameters comprise a coefficient of variation of multiple said concentrations corresponding to multiple said optimized target fluid samples; and the executing the titer assay module further comprises providing an indication on a graphical user interface of a titer notification if a said titer parameter is determined to be outside a corresponding acceptable titer parameter value range.

17. The method of claim 1, wherein the screening control set comprises a plurality of said screening blank control fluid samples, with at least one said screening blank control fluid sample corresponding to each said dilution factor of the plurality of dilution factors of the screening target fluid samples.

18. The method of claim 1, wherein;

the optimized target set includes at least 3 of said optimized target fluid sample at a single said optimized dilution factor within the optimized sample dilution factor range and the screening target set includes only one said screening target fluid sample at each said dilution factor of the plurality of dilution factors;

the target particles have a particle size in a range of from 20 nanometers to 600 nanometers;

each said screening target fluid sample, screening blank control fluid sample and optimized target fluid sample is fluorescently stained to provide a at least one fluorescent label on the target particles;

each said flow cytometry evaluation comprises detecting the response radiation from the investigation zone for fluorescent emission response from a said fluorescent label on the target particles; and each said flow cytometry evaluation comprises flowing the respective fluid sample through the investigation zone at a flow rate in a range of from 600 nanoliters per minute to 3000 nanoliters per minute while subjecting the said respective fluid sample to the investigation excitation radiation.

19. A flow cytometry system for quantification of particles in a target sample fluid stock, the flow cytometry system comprising:

a flow cytometer operable to flow a fluid sample through a flow cytometry investigation zone subjected to investigation excitation radiation and to detect and measure response radiation from the investigation zone and to determine and output a flow cytometry result including a quantification indication of target particles with particular particle attributes in each said fluid sample;

a memory to receive and store the flow cytometry results and including a said flow cytometry result for each of a screening target set of a plurality of screening target fluid samples, each said screening target fluid sample comprising a screening sample fluid stock for flow cytometry evaluation for the target particles and the plurality of screening target fluid samples comprising a dilution series of the screening sample fluid stock diluted at a plurality of dilution factors;

a graphical user interface comprising a display to present to a user a results listing corresponding to the flow cytometry results stored in the memory and a user input device to receive from a user a selection of the flow cytometry results from the results listing;

a screening assay module executable by a processor to configure the processor to:

access the memory to retrieve the flow cytometry results for the screening target set based on a first screening selection that is selected by the user from the results listing, calculate corrected quantification indications of the target particles for at least a plurality portion of the screening target fluid samples of the first screening selection representing multiple dilution factors, calculate a fit of the corrected quantification indications relative to the multiple dilution factors, determine an optimized sample dilution factor range for flow cytometry investigation of the screening sample fluid stock using the flow cytometer based on an analysis of the fit of the corrected quantification indications, and present an indication of the optimized sample dilution factor range on the display of the graphical user interface;

wherein the memory is further operative to receive and store a said flow cytometry result for each of an optimized target set of a plurality of optimized target fluid samples each comprising target sample fluid stock for flow cytometry evaluation for the target particles with the particular particle attributes, wherein the plurality of optimized target fluid samples of the optimized target set comprise a dilution factor of the target sample fluid stock diluted to within the optimized sample dilution factor range; and a titer assay module executable by a processor to configure the processor to:

access the memory to retrieve the flow cytometry results for the optimized target set based on a first titer selection that is selected by the user from the results listing, and determine particle titer results for the target sample fluid stock based on the flow cytometry results of the optimized target set of the first titer selection and present the particle titer results on the display of the graphical user interface.

20. A flow cytometry system for quantification of particles in a target sample fluid stock, the flow cytometry system comprising:

a flow cytometer operable to flow a fluid sample through a flow cytometry investigation zone subjected to investigation excitation radiation and to detect and measure response radiation from the investigation zone and to determine and output a flow cytometry result including a quantification indication of target particles with particular particle attributes in each said fluid sample;

a memory to receive and store the flow cytometry results and including a said flow cytometry result for each of a screening target set of a plurality of screening target fluid samples and for each of a screening control set with at least one screening blank control fluid sample corresponding to the screening target set, each said screening target fluid sample comprising a screening sample fluid stock for flow cytometry evaluation for the target particles and the plurality of screening target fluid samples comprising a dilution series of the screening sample fluid stock diluted at a plurality of dilution factors;

a graphical user interface comprising a display to present to a user a results listing corresponding to the flow cytometry results stored in the memory and a user input device to receive from a user a selection of the flow cytometry results from the results listing;

a screening assay module executable by a processor to configure the processor to:
  access the memory to retrieve the flow cytometry results for the screening target set based on a first screening selection that is selected by the user from the results listing and to retrieve the flow cytometry results for the screening control set based on a second screening selection that is selected by the user from the results listing,
  confirm that the second screening selection comprises a said flow cytometry result for a said screening blank control fluid sample corresponding to each of the plurality of screening target fluid samples of the first screening selection and whether or not the quantification indication of the target particles of each said screening target fluid sample of the first screening selection is greater than a corresponding said quantification indication of the target particles of the screening control set of the second screening selection,
  calculate corrected quantification indications of the target particles for at least a plurality portion of the screening target fluid samples of the first screening selection representing multiple dilution factors that are confirmed to have a said quantification indication of the target particles greater than the corresponding said quantification indication of the target particles of the screening control set of the second screening selection,
  calculate a fit of the corrected quantification indications relative to the multiple dilution factors,
  compare the fit relative to one or more acceptable dilution quality parameters,
  determine an optimized sample dilution factor range for flow cytometry investigation of the screening sample fluid stock using the flow cytometer based on an identified said plurality portion of the screening target fluid samples of the first screening selection having acceptable dilution quality parameters, and
  present an indication of the optimized sample dilution factor range on the display of the graphical user interface;

wherein the memory is further operative to receive and store a said flow cytometry result for each of an optimized target set of a plurality of optimized target fluid samples each comprising target sample fluid stock for flow cytometry evaluation for the target particles with the particular particle attributes and a said flow cytometry result for an optimized control set with at least one optimized blank control fluid sample corresponding to the optimized target set, wherein the plurality of optimized target fluid samples of the optimized target set comprise a dilution factor of the titer sample fluid stock diluted to within the optimized sample dilution factor range; and a titer assay module executable by a processor to configure the processor to:
  access the memory to retrieve the flow cytometry results for the optimized target set based on a first titer selection that is selected by the user from the results listing and to retrieve the flow cytometry results for the optimized control set based on a second titer selection that is selected by the user from the results listing, and
  determine particle titer results for the target sample fluid stock based on the flow cytometry results for the optimized target set of the first titer selection and the optimized control set of the second titer selection and present the particle titer results on the display of the graphical user interface.

21. The flow cytometry system of claim 20, wherein the titer assay module is further operative to:
  calculate one or more titer parameters regarding the particle titer results,
  present the one or more titer parameters on the display of the graphical user interface;
provide an indication of a titer notification if the one or more titer parameters are outside a corresponding acceptable titer parameter.

22. The flow cytometry system of claim 21, wherein the titer assay module is further operative to:
  determine a sample qualification limit (SQL) for the flow cytometry results for the optimized target set of the first titer selection based on the flow cytometry results for the optimized control set of the second titer selection; and
  provide an indication of an SQL notification if the flow cytometry result for any one of the said optimized target set does not exceed the SQL.

23. The flow cytometry system of claim 20, wherein the screening assay module is further operative to:
  provide an indication of a fit notification if the fit for a said plurality portion of the screening target fluid samples of the first screening selection does not provide a said fit having dilution quality parameters conforming to said acceptable dilution quality parameters.

24. The flow cytometry system of claim 23, wherein;
  the fit comprises a linear regression fit calculated relative to log conversions of the set of the corrected quantification indications and the multiple dilution factors;
  the one or more dilution quality parameters comprise a quantitative characterization of the linear regression fit;
  the linear regression fit is represented as a trendline relative to the log conversions of the corrected quantification indications and the multiple dilution factors, and wherein the dilution quality parameters comprise a slope and a coefficient of determination of the trendline; and
  the optimized sample dilution factor range is defined between an upper optimized dilution factor bound and a lower optimized dilution factor bound, wherein the upper optimized dilution factor bound corresponds to a dilution value of the trendline corresponding to a lower performance concentration bound and the lower optimized dilution factor bound corresponds to a dilution value of the trendline corresponding to an upper performance concentration bound.

25. The flow cytometry system of claim 20, wherein the titer assay module is further operative to:
  confirm that the flow cytometry results of the optimized target fluid samples of the first titer selection comprises an acceptable dilution factor within the optimized sample dilution factor range: and
  provide an indication of a titer dilution notification on the display of the graphical user interface when any one of the flow cytometry results of the optimized target fluid samples of the first titer selection do not comprise a said acceptable dilution factor.

* * * * *